(12) United States Patent
Zhan et al.

(10) Patent No.: US 10,670,783 B2
(45) Date of Patent: *Jun. 2, 2020

(54) LOW-CONTRAST METASURFACES

(71) Applicant: University of Washington, Seattle, WA (US)

(72) Inventors: Alan Zhan, Seattle, WA (US); Shane Colburn, Seattle, WA (US); Arka Majumdar, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,868

(22) Filed: Jul. 26, 2019

(65) Prior Publication Data

US 2020/0057182 A1 Feb. 20, 2020

Related U.S. Application Data

(63) Continuation of application No. 15/758,686, filed as application No. PCT/US2016/050793 on Sep. 8, 2016, now Pat. No. 10,365,416.

(Continued)

(51) Int. Cl.
*G02B 5/18* (2006.01)
*G02B 1/00* (2006.01)

(52) U.S. Cl.
CPC ........... *G02B 5/1871* (2013.01); *G02B 1/002* (2013.01); *G02B 5/1814* (2013.01);

(Continued)

(58) Field of Classification Search
CPC .. G02B 5/1871; G02B 5/1814; G02B 5/1828; G02B 5/1876; G02B 2005/1804

(Continued)

(56) References Cited

U.S. PATENT DOCUMENTS 3,305,294 A 2/1967 Alvarez
3,507,565 A 4/1970 Alvarez et al.
(Continued)

FOREIGN PATENT DOCUMENTS

CN 103975266 A 8/2014
WO 2008/122941 A1 10/2008
(Continued)

OTHER PUBLICATIONS

Aieta, F., et al., "Aberration-Free Ultrathin Flat Lenses and Axicons at Telecom Wavelengths Based on Plasmonic Metasurfaces," Nano Letters 12(9):4932-4936, Sep. 2012.

(Continued)

*Primary Examiner* — Wen Huang
(74) *Attorney, Agent, or Firm* — Christensen O'Connor Johnson Kindness PLLC

(57) ABSTRACT

Disclosed herein are metasurfaces formed on a substrate from a plurality of posts. The metasurfaces are configured to be optically active at one or more wavelengths and in certain embodiments are configured to form lenses having unexpectedly strong focusing power. In particular, the metasurfaces are formed from "low-contrast" materials, including CMOS-compatible materials such as silicon dioxide or silicon nitride. Accordingly, the disclosed metasurfaces are generally CMOS compatible and therefore embody a new paradigm in metasurface design and manufacturing.

16 Claims, 43 Drawing Sheets

US 10,670,783 B2

Page 2

Related U.S. Application Data

(60) Provisional application No. 62/342,121, filed on May 26, 2016, provisional application No. 62/215,518, filed on Sep. 8, 2015.

(52) U.S. Cl.
CPC ......... *G02B 5/1828* (2013.01); *G02B 5/1876* (2013.01); *G02B 2005/1804* (2013.01)

(58) Field of Classification Search
USPC ....................................................... 359/566
See application file for complete search history.

(56) References Cited

U.S. PATENT DOCUMENTS

| 7,453,643 | B2 | 11/2008 | Kleemann |
| 8,905,559 | B2 | 12/2014 | Kawauchi et al. |
| 2005/0281524 | A1 | 12/2005 | Mouli |
| 2011/0261441 | A1 | 10/2011 | Zheludev et al. |
| 2013/0155359 | A1 | 6/2013 | Wu et al. |
| 2014/0085693 | A1 | 3/2014 | Mosallaei et al. |
| 2015/0063750 | A1 | 3/2015 | Fattal et al. |
| 2015/0219806 | A1 | 8/2015 | Arbabi et al. |
| 2015/0362641 | A1 | 12/2015 | Boyraz |

FOREIGN PATENT DOCUMENTS

| WO | 2014/189507 A1 | 11/2014 |
| WO | 2015/090351 A1 | 6/2015 |

OTHER PUBLICATIONS

Aieta, F., et al., "Multiwavelength Achromatic Metasurfaces by Dispersive Phase Compensation," Science 347(6228:1342-1345, Mar. 2015.
Arbabi, A., et al., "Dielectric Metasurfaces for Complete Control of Phase and Polarization With Subwavelength Spatial Resolution and High Transmission," Nature Nanotechnology 10(11):937-943, Nov. 2015.
Arbabi, A., et al., "Subwavelength-Thick Lenses With High Numerical Apertures and Large Efficiency Based on High-Contrast Transmitarrays," Nature Communications 6:7069, May 2015.
Arbabi, E., et al., "Multiwavelength Polarization Insensitive Lenses Based on Dielectric Metasurfaces With Meta-Molecules," Optica 3(6):628-633, Jan. 2016.
Astilean, S., et al., "High-Efficiency Subwavelength Diffractive Element Patterned in a High-Refractive-Index Material for 633 nm," Optics Letters 23(7):552-554, Apr. 1998.
Barbero, S., "The Alvarez and Lohmann Refractive Lenses Revisited," Optics Express 17(11):9376-9390, May 2009.
Barton, I.M., et al., "Diffractive Alvarez Lens," Optics Letters 25(1):1-3, Jan. 2000.
Bingham, A.L., and D.R. Grischkowsky, "Terahertz 2-D Photonic Crystal Waveguides," IEEE Microwave and Wireless Components Letters 18(7):428-430, Jul. 2008.
Bradburn, S., et al., "Realizations of Focus Invariance in Optical—Digital Systems With Wave-Front Coding," Applied Optics 36(35):9157-9166, Dec. 1997.
Cakmakci, O., et al., "Optical Free-Form Surfaces in Off-Axis Head-Worn Display Design," Proceedings of the 7th IEEE/ACM International Symposium on Mixed and Augmented Reality, Cambridge, UK, Sep. 15-18, 2008, 4 pages.
Dowski, E.R., and W.T. Cathey, "Extended Depth of Field Through Wave-Front Coding," Applied optics 34(11):1859-1866, Apr. 1995.
Duerr, F., et al., "Potential Benefits of Free-Form Optics in On-Axis Imaging Applications With High Aspect Ratio," Optics Express 21(25):31072-31081, Dec. 2013.
Ee, H.-S., and R. Agarwal, "Tunable Metasurface and Flat Optical Zoom Lens on a Stretchable Substrate," Nano Letters 16(4):2818-2823, Apr. 2016.

European Search Report dated May 17, 2019, issued in corresponding European Application No. 16845056.7, filed Sep. 8, 2016, 11 pages.
Fattal, D., et al., "Flat Dielectric Grating Reflectors With Focusing Abilities," Nature Photonics 4(7):466-470, Jul. 2010.
Fuerschbach, K., et al., "Assembly of a Freeform Off-Axis Optical System Employing Three φ-Polynomial Zemike Mirrors," Optics Letters 39(10):2896-2899, May 2014.
Fuerschbach, K., et al., "Theory of Aberration Fields for General Optical Systems With Freeform Surfaces," Optics Express 22(22):26585-26606, Nov. 2014.
Gill, P.R., "Enabling a Computer to Do the Job of a Lens," SPIE Newsroom, Sep. 2013, 2 pages.
Gutruf, P., et al., "Mechanically Tunable Dielectric Resonator Metasurfaces at Visible Frequencies," ACS Nano 10(1):133-141, Jan. 2016.
Hua, H., "Sunglass-Like Displays Become a Reality With Free-Form Optical Technology," SPIE Newsroom, 2012, 3 pages.
International Search Report and Written Opinion dated Jan. 13, 2017, issued in corresponding International Application No. PCT/US2016/50793, filed Sep. 8, 2016, 9 pages.
International Preliminary Report on Patentability dated Mar. 13, 2018, issued in corresponding International Application No. PCT/US2016/050793, filed Sep. 8, 2016, 1 page.
Kaya, I., et al., "Comparative Assessment of Freeform Polynomials as Optical Surface Descriptions," Optics Express 20(20):22683-22691, Sep. 2012.
Kildishev, A.V., et al., "Planar Photonics With Metasurfaces," Science 339(6125):1232009, Mar. 2013, 8 pages.
Lecoq, P., et al., "Progress on Photonic Crystals," Proceedings of the 2010 IEEE Nuclear Science Symposium, Medical Imaging Conference, Oct. 30-Nov. 6, 2010, Knoxville, Tenn., USA, pp. 1970-1975.
Li, L. et al. "Fabrication of Microinjection-Molded Miniature Freeform Alvarez Lenses," Applied Optics 53(19):4248-4255, Jul. 2014.
Lin, D., et al., "Dielectric Gradient Metasurface Optical Elements," Science 345(6194):298-302, Jul. 2014.
Mirotznik, M.S., et al., "Design of Cubic-Phase Optical Elements Using Subwavelength Microstructures," Optics Express 16(2):1250-1259, Jan. 2008.
Nie, Y., et al., "Direct Design Approach to Calculate a Two-Surface Lens With an Entrance Pupil for Application in Wide Field-Of-View Imaging," Optical Engineering 54:015102-1-015102-8, Jan. 2015.
Rege, S.S., et al., "Application of the Alvarez-Humphrey Concept to the Design of a Miniaturized Scanning Microscope," Optics Express 12(12):2574-2588, Jun. 2004.
Thompson, K.P., and J.P. Rolland, "Freeform Optical Surfaces: A Revolution in Imaging Optical Design," Optics and Photonics News 23(6):30-35, Jun. 2012.
Wilt, B.A., et al., "Advances in Light Microscopy for Neuroscience," Annual Review of Neuroscience 32:435-506, Jul. 2009.
Yu, C.L., et al., "Stretchable Photonic Crystal Cavity With Wide Frequency Tunability," Nano Letters 13(1):248-252, Jan. 2013.
Yu, N., and F. Capasso, "Flat Optics With Designer Metasurfaces," Nature Materials 13(2):139-150, Feb. 2014.
Yu, N., et al., "Light Propagation with Phase Discontinuities: Generalized Laws of Reflection and Refraction," Science 334(6054):333-337, Oct. 2011.
Yu, N., et al., "A Broadband, Background-Free Quarter-Wave Plate Based on Plasmonic Metasurfaces," Nano Letters 12(12):6328-6333, Dec. 2012.
Zeng, B. et al., "Tunable Dark Modes in One-Dimensional 'Diatomic' Dielectric Gratings," Optics Express 23(10):12478-12487, May 2015.
Zhan, A., et al., "Low-Contrast Dielectric Metasurface Optics," ACS Photonics 3(2):209-214, Feb. 2016.
Zhou, G. et al., "Microelectromechanically-Driven Miniature Adaptive Alvarez Lens," Optics Express 21(1):1226-1233, Jan. 2013.
Zhu, L., et al., "Flexible Photonic Metastructures for Tunable Coloration," Optica 2(3):255-258, Mar. 2015.
Chinese Office Action dated Jan. 2, 2020, issued in corresponding Chinese Application No. 201680060823.0, filed Sep. 8, 2016, 8 pages.

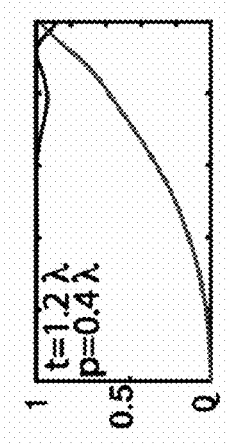
FIG. 2A
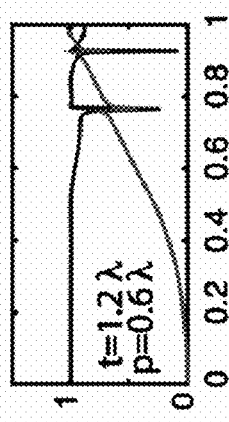
FIG. 2D
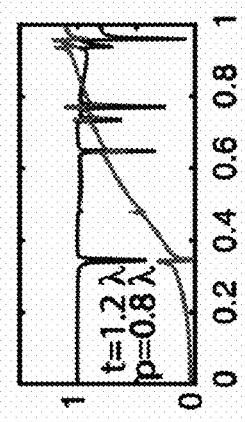
FIG. 2G
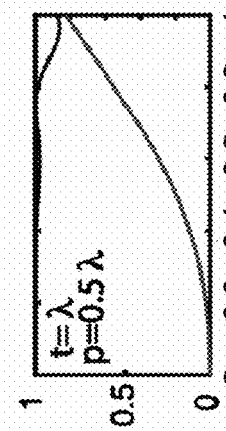
FIG. 2B
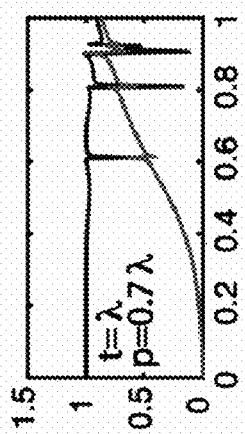
FIG. 2E
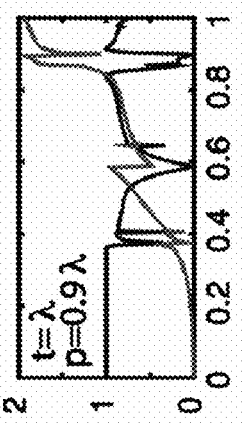
FIG. 2H
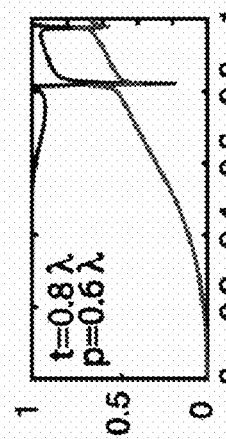
FIG. 2C
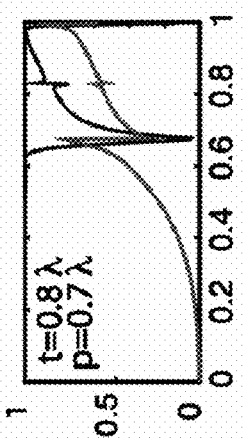
FIG. 2F
FIG. 2I

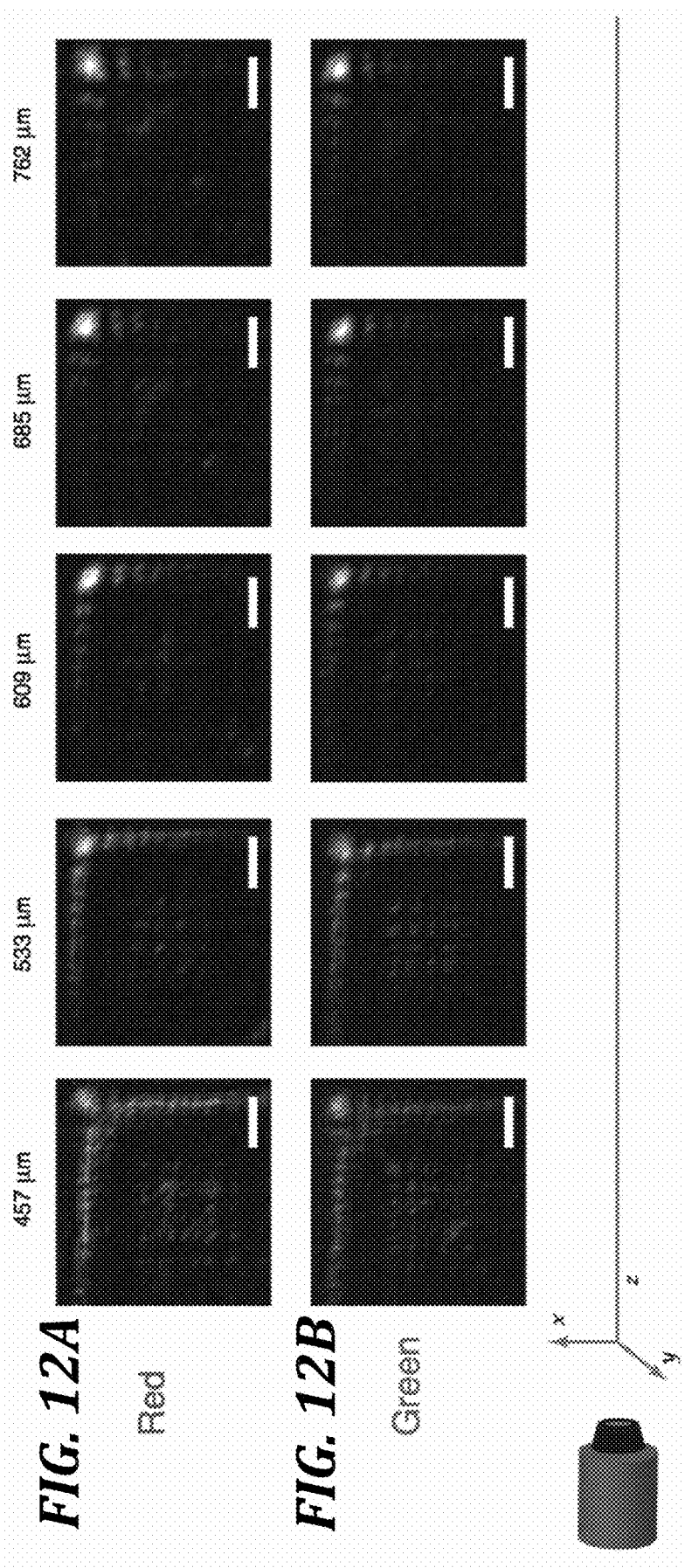
FIG. 12A Red
FIG. 12B Green

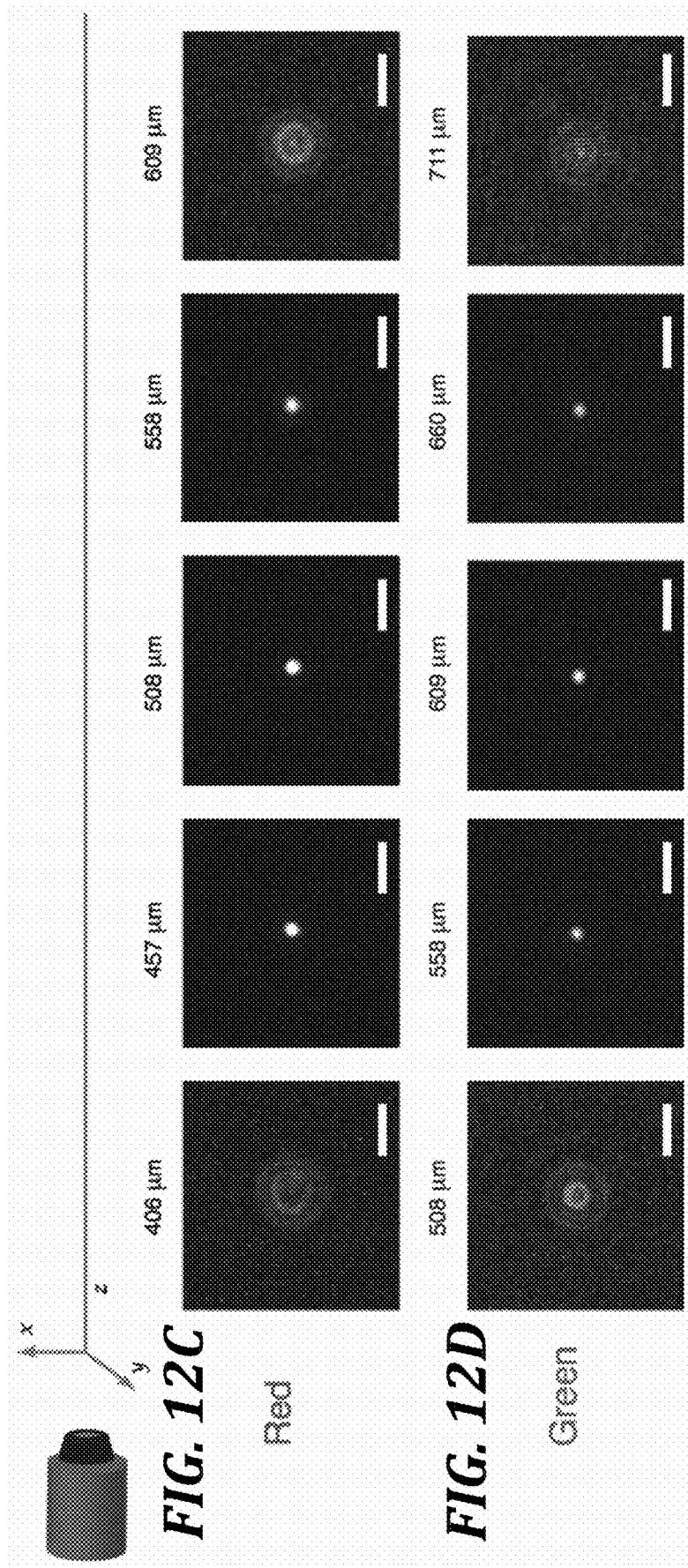
FIG. 12C Red
FIG. 12D Green

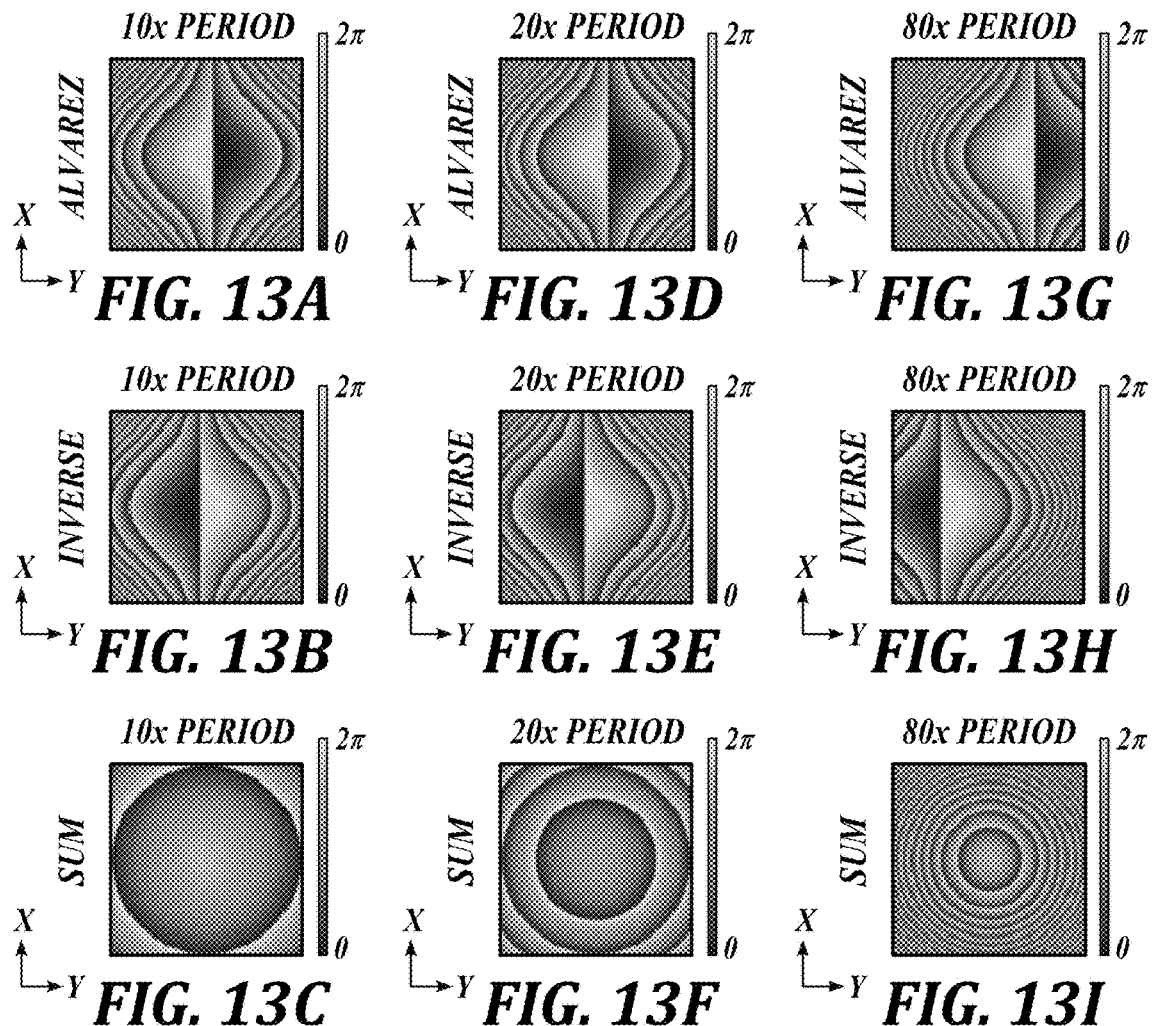
FIG. 13A  FIG. 13D  FIG. 13G
FIG. 13B  FIG. 13E  FIG. 13H
FIG. 13C  FIG. 13F  FIG. 13I
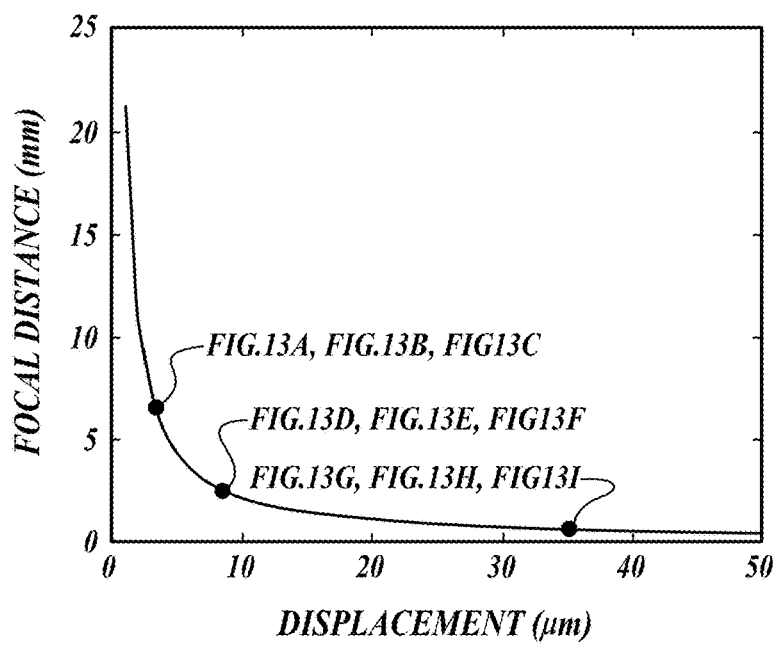
FIG. 13J

LOW-CONTRAST METASURFACES

CROSS-REFERENCES TO RELATED APPLICATIONS

This application is a continuation of U.S. patent application Ser. No. 15/758,686, filed Mar. 8, 2018, which is a National Stage of International Application No. PCT/US2016/050793, filed Sep. 8, 2016, which claims the benefit of U.S. Patent Application No. 62/215,518, filed Sep. 8, 2015, and of U.S. Patent Application No. 62/342,121, filed May 26, 2016, the disclosures of which are hereby incorporated by reference in their entirety.

BACKGROUND

Conventional transmissive macroscopic optical elements primarily depend on refraction to control the propagation of light. Refraction relies heavily upon the exact curvature of the surface, and the spatial extent of the element in order to achieve gradual phase accumulation. This imposes a fundamental limitation on the miniaturization of optical sensors and elements, which is necessary for various applications such as the Internet of Things, bio-photonics and two photon absorption microscopy. Metasurfaces, two-dimensional quasi-periodic arrays of sub-wavelength structures, present a method of miniaturizing optical elements. Rather than relying on gradual phase accumulation through light propagation, each sub-wavelength structure imparts a discrete, abrupt change in the phase of incoming light. This has motivated the design of metasurface-based optical elements including lenses, focusing mirrors, vortex beam generators, holographic masks, and polarization optics.

Thus far, high quality metasurface optical elements based on metals, titanium oxide, and amorphous silicon have been demonstrated. Unfortunately, metals are significantly lossy at optical frequencies, titanium oxide lacks CMOS compatibility, and amorphous silicon absorbs light in the visible and near-infrared spectrum (~400-900 nm). This wavelength range is of particular interest for many applications due to ubiquitous, low-cost silicon detectors, motivating the development of high band gap material based metasurfaces. However, high band gap CMOS-compatible materials such as silicon nitride and silicon dioxide, which are transparent over the aforementioned wavelength range, have a low refractive index. Due to the low refractive indices of these materials, conventional metasurface design principles fail to apply when forming optical elements.

Accordingly, new metasurface designs and compositions are needed in order to access high band gap CMOS-compatible materials as elements of metasurface-based optics.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a low-contrast metasurface having optical activity at a first wavelength is provided. In one embodiment, the low-contrast metasurface includes:

a plurality of cylindrical posts formed from a first material and arranged on a substrate in a square pattern, wherein the plurality of cylindrical post are formed from a material having a first refractive index of 2.1 or less;

interstices between individual posts of the plurality of cylindrical post comprising an interstitial substance with a second refractive index that is 0.6 to 1.1 less than the first refractive index;

wherein the individual posts of the plurality of cylindrical posts have a diameter in a range of ⅛ of the first wavelength to ⅔ of the first wavelength;

wherein the plurality of cylindrical posts have a periodicity in a range of 0.4 times the first wavelength to 1.0 times the first wavelength; and wherein the plurality of cylindrical posts have a thickness in a range of 0.5 times the first wavelength to 1.0 times the first wavelength.

In another aspect, an Alvarez lens is provided. In one embodiment, the Alvarez lens includes:

a first lens having a first low-contrast metasurface as described herein; and a second lens;

wherein the first lens and the second lens are arranged along an optical axis and configured such that displacement between the first lens and the second lens along a transverse axis in relation to the optical axis will produce a non-linear change in focus.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2I: Phase and transmission behavior for representative low-contrast metasurfaces with different diameters, periodicities, and thicknesses: Phase delay and transmission amplitude for gratings as a function of the duty cycles for varying periodicity and thickness.

FIGS. 12A-12D: Dependence of cubic metasurface and metasurface lens point spread functions (PSF) upon displacement along the optical axis. (A) and (B) are the PSFs of the cubic element under coherent illumination by red and green light respectively. (C) and (D) are the PSFs of a 500 µm metasurface lens as described in Zhan, A. et al. Low-Contrast Dielectric Metasurface Optics. *ACS Photonics* 3, 209-214, doi:10.1021/acsphotonics.5b00660 (2016) under red and green illumination. All figures share the same 18 µm scale bar. While the intensity profiles at 558 µm seem similar for the quadratic lens (C) and (D) seem similar, analysis of their MTF shown in relation to FIG. 20 shows a significant difference.

FIGS. 13A-13J: Behavior of representative Alvarez lenses in response to x displacement. (A), (D), (G) represent the phase profiles of one Alvarez element for displacements of 10p, 20p, 80p respectively, (B), (E), (H) represent their inverses at displacements of −10p, −20p −80p respectively, and (C), (F), (I) are the sums of the displaced phase profiles. The phase profiles are displaced in units of the metasurface lattice periodicity p=443 nm, with (A)-(C) representing a 4.43 µm displacement, (D)-(F) representing 8.86 µm displacement, and (G)-(I) representing a 35.4 µm displacement. (J) Plot of focal length dependence on displacement based on equation 4. Larger displacements result in a more rapidly varying phase profile, corresponding to a lens with a smaller focal length. The dots indicate the focal lengths of lenses shown in (C), (F), (I). Parameters used are the same as for the fabricated device, L=150 µm, A=1.17×10$^7$ m$^{-2}$.

DETAILED DESCRIPTION

Disclosed herein are metasurfaces formed on a substrate from a plurality of posts. The metasurfaces are configured to be optically active at one or more wavelengths and in certain embodiments are configured to form lenses having unexpectedly strong focusing power. In particular, the metasurfaces are formed from "low-contrast" materials, including CMOS-compatible materials such as silicon dioxide or silicon nitride. Accordingly, the disclosed metasurfaces are generally CMOS compatible and therefore embody a new paradigm in metasurface design and manufacturing.

Low-Contrast Metasurfaces

In one aspect, a low-contrast metasurface having optical activity at a first wavelength is provided. In one embodiment, the low-contrast metasurface includes:
a plurality of cylindrical posts formed from a first material and arranged on a substrate in a square pattern, wherein the plurality of cylindrical post are formed from a material having a first refractive index of 2.1 or less;
interstices between individual posts of the plurality of cylindrical post comprising an interstitial substance with a second refractive index that is 0.6 to 1.1 less than the first refractive index;
wherein the individual posts of the plurality of cylindrical posts have a diameter in a range of ⅛ of the first wavelength to ⅔ of the first wavelength;
wherein the plurality of cylindrical posts have a periodicity in a range of 0.4 times the first wavelength to 1.0 times the first wavelength; and
wherein the plurality of cylindrical posts have a thickness in a range of 0.5 times the first wavelength to 1.0 times the first wavelength.

Figure 1A:
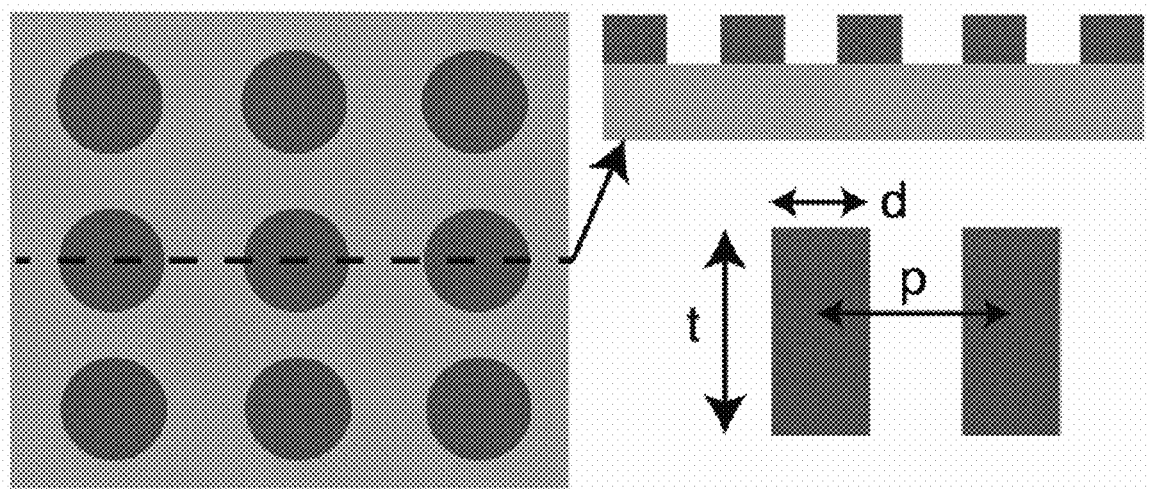
FIGS. 1A-1C: Low and high contrast metasurfaces: (A) Schematic of exemplary grating structures: a grating with periodicity p can be formed by using cylindrical posts (with diameter d) arranged in a square lattice. The thickness of the grating is denoted as t. Amplitude and phase $\phi$ of the transmitted light for (B) a high contrast ($n_{high}$=3.5) and (C) a low contrast ($n_{low}$=2.0) grating using parameters from (B) scaled by $n_{high}/n_{low}$.

A representative low-contrast metasurface is illustrated in FIG. 1A and comprises a plurality of cylindrical posts formed from a first material on a substrate in a square pattern. The substrate can be any material sufficient to support the plurality of posts and that does not adversely affect the optical effects of the metasurface. Glass is an exemplary substrate. In one embodiment the substrate is essentially flat. In another embodiment, the substrate is curved. By the nature of the metasurfaces, and the ease of their patterning, both flat and curved surfaces can be patterned with the metasurface.

The first material has a refractive index of 2.1 or less. This includes CMOS-compatible materials such as silicon dioxide (RI~1.5) and silicon nitride (RI~2.0). Interstices between the posts comprise an interstitial substance (e.g., a solid or a gas). The metasurface is "low-contrast" due to the relatively small difference in refractive indices between the posts and the interstitial substance. As noted above, in one embodiment, the interstitial substance (second) refractive index is 0.6 to 1.1 less than the post (first) refractive index. This relatively low contrast between the materials allows for CMOS compatible materials, such as silicon dioxide and silicon nitride to be used as the post material and, for example, air (RI~1.0), an inert gas (e.g., argon RI~1.0), and/or polymer (RI~1.3-1.8) to be used as the interstitial substance. Such CMOS compatible, low-contrast metasurfaces are attractive from the standpoint of manufacturing ease and cost, thereby offering the potential of a new paradigm in metasurface design and manufacture.

Each of the posts is defined by a diameter ("d" in FIG. 1A), a thickness ("t" in FIG. 1A; also referred to as the height of the post), and a periodicity ("p" in FIG. 1A; defined by the center-to-center distance, in the plane of the substrate, between adjacent posts).

In one embodiment the individual posts of the plurality of cylindrical posts have a diameter in a range of ⅛ of the first wavelength to ⅔ of the first wavelength. The diameter of the posts affects the wavelengths of light for which the metasurface is optically active. Therefore, the diameters of the posts are sometimes defined in relation to the first wavelength. In another embodiment, the individual posts of the plurality of cylindrical posts have a diameter in a range of ⅙ of the first wavelength to ⅓ of the first wavelength. In another embodiment, the individual posts of the plurality of cylindrical posts have a diameter in a range of ¼ of the first wavelength to ½ of the first wavelength.

The wavelengths of interest (e.g., for the first wavelength) are across the visible and IR spectrums. Accordingly, in one embodiment the first wavelength is in the range of 400 nm to 1550 nm. In another embodiment, the first wavelength is in the visible range of 400 nm to 700 nm. In another embodiment, the first wavelength is in the IR range of 701 nm to 1550 nm. In another embodiment, the first wavelength is in the range of 400 nm to 950 nm, which essentially spans the visible and near-IR spectra. In another embodiment, the first wavelength is in the range of 800 nm to 950 nm, which is an important band for machine vision applications. In another embodiment, the first wavelength is in the range of 1300 nm to 1550 nm, which is an important band for telecommunication applications.

The periodicity can also be proportionally defined by the affected wavelength. With regard to periodicity, in one embodiment, the plurality of cylindrical posts have a periodicity in a range of 0.25 times the first wavelength to 1.0 times the first wavelength. In another embodiment, the plurality of cylindrical posts have a periodicity in a range of 0.4 times the first wavelength to 1.0 times the first wavelength. In another embodiment, the plurality of cylindrical posts have a periodicity in a range of 0.25 times the first wavelength to 0.6 times the first wavelength. In another embodiment, the plurality of cylindrical posts have a periodicity in a range of 0.4 times the first wavelength to 0.6 times the first wavelength.

With regard to thickness, in one embodiment the plurality of cylindrical posts have a thickness in a range of 0.5 times the first wavelength to 1.0 times the first wavelength. The thickness can also be proportionally defined by the affected wavelength.

While the metasurfaces are described in relation to a single "first wavelength," it will be appreciated that a metasurface tuned to a particular wavelength will also affect a band of wavelengths surrounding the target wavelength. Therefore, in certain embodiments the first wavelength represents the target wavelength, which in certain embodiments is the wavelength most affected by the metasurface. However, for certain applications a very broad range of affected wavelengths are desired (e.g., the entire visible spectrum), in which case the dimensions and materials of the metasurface are selected to provide the desired coverage, to the extent possible.

The theoretical and practical methods for designing and fabricating the disclosed metasurfaces are set forth in more detail in EXAMPLES 1 and 2 below.

The optical activity arises when light of the first wavelength (or band comprising the first wavelength) impinges on the metasurface. In one embodiment, as disclosed in the EXAMPLES, the metasurface is configured to provide the desired optical activity when the light impinges on the metasurface perpendicular to the substrate. In other embodiments, non-perpendicular impingement angles also give rise to optical activity. Metasurfaces designed for non-perpendicular impingement have a different phase profile to account for the angle of incidence. The same pillar diameter (s) and thickness(es) can be used, it is only their orientation that is changed.

In one embodiment, the optical activity is selected from the group consisting of diffraction and reflection. As used herein, the term "optical activity" is primarily used to describe diffraction of light as it passes through the metasurface and is affected by the plurality of posts. In other embodiments, however, the optical activity is reflection, based on metasurfaces configured to reflect instead of diffract impinging light. Based on the parameters selected, particularly by varying thickness and periodicity a metasurface can be fabricated that will reflect instead of diffract light.

Turning again to the materials forming the metasurface, any two (or more) materials can be used that have the required refractive index properties and can be configured to meet the required design principles. As noted previously, CMOS-compatible materials are favored in certain applications. Accordingly, in one embodiment the first material (post material) is silicon nitride. In one embodiment the first material is silicon dioxide. In one embodiment the first material is silicon dioxide. In one embodiment the first material is a high-refractive-index polymer. In order to meet the required refractive index difference ("RI delta") of at least 0.6 a polymer used as the first material essentially must have a RI of at least 1.6 (assuming the interstitial substance is a gas with a RI of ~1.0).

The composition of the post material partially defines the affected wavelength(s) of light. As an example, silicon nitride as the post material allows for metasurfaces that can be configured to produce optical activity in both the visible and the IR ranges.

With regard to the interstitial substance, in one embodiment the interstitial substance is selected from the group consisting of a gas or a solid. As long as the RI delta criteria are met, any material can be used in the interstices. Representative interstitial solid materials include polymers, including polyimides, siloxanes (e.g., PDMS), PMMA (Poly (methyl methacrylate). Representative interstitial gases include argon, nitrogen, and air.

Optical Elements Incorporating a Metasurface

Optical elements ("devices") can be formed from the disclosed metasurfaces by defining the metasurface in such a way as to manipulate light as it passes through the metasurface. A representative example of such a device is a lens that diffracts light in order to produce an effect similar to a traditional refractive lens. The flat form factor of the disclosed metasurface lenses provide a strong advantage compared to the severe constraints the three-dimensional form of refractive lenses impose.

Figure 11A:
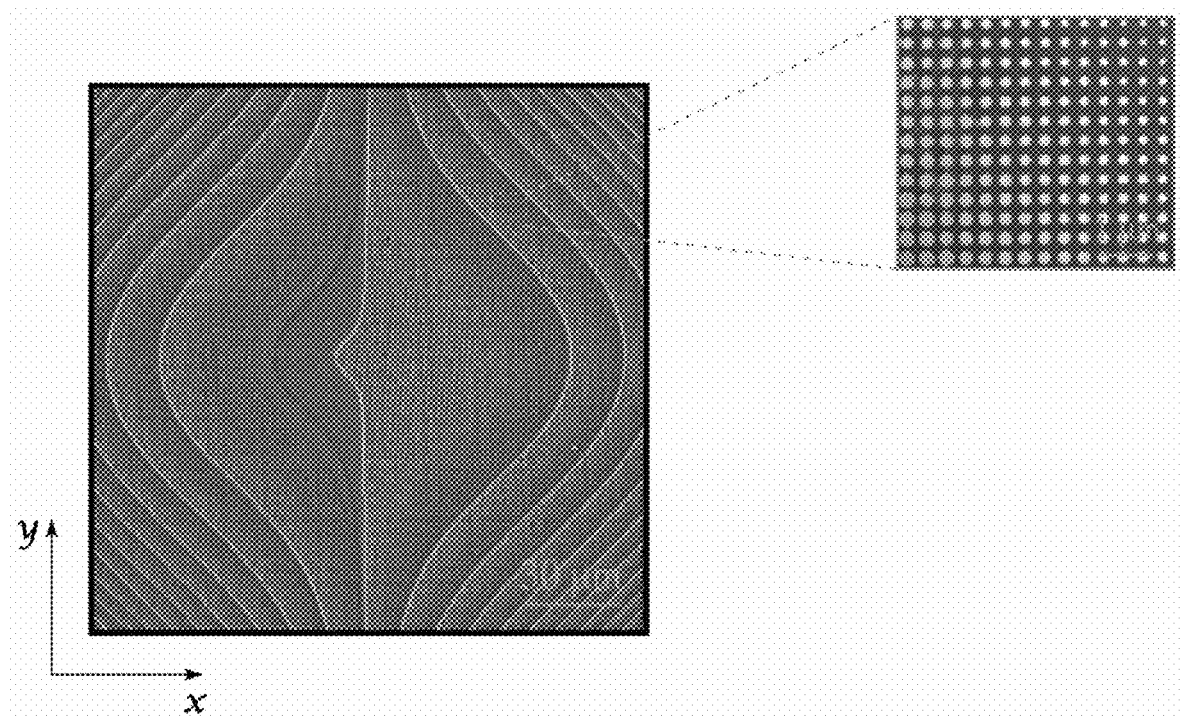
FIGS. 11A and 11B: Scanning electron micrographs of fabricated devices coated in gold. Half of the Alvarez lens is shown in (A), and the cubic phase plate is shown in (B). Insets are zooms of specific locations of the metasurface showing the gradient in pillar sizes.
Figure 11B:
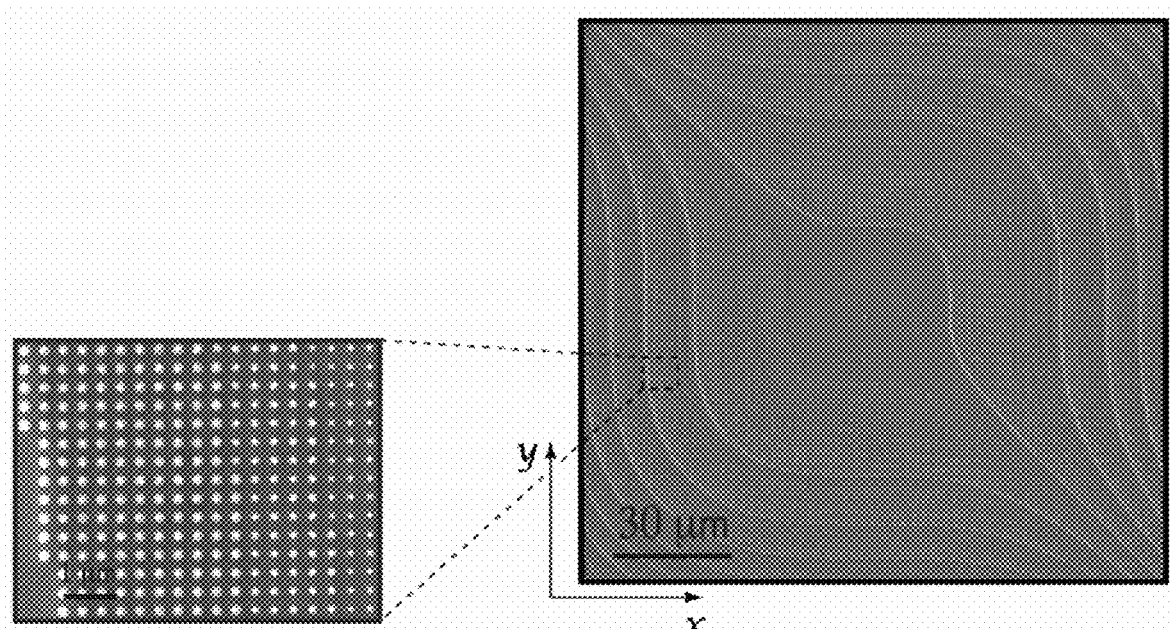

In one embodiment, at least a portion of the low-contrast metasurface defines an optical element comprising a first metasurface portion having a first optical activity at the first wavelength and a second metasurface portion having a second optical activity at the first wavelength, different than the first optical activity. The different optical activities produce diffraction and therefore allow a designer to engineer a surface to manipulate light of the impacted wavelengths. These designs can be as simple as lenses (see FIG. 3A) or as complex as vortex beam generators (see FIG. 3B) or free-form optics (half an Alvarez lens is shown in FIG. 11A and a cubic plate is shown in FIG. 11B).

Lenses formed using the metasurfaces are disclosed extensively herein, and particularly in the EXAMPLES. Functioning diffractive lenses were successfully formed from silicon nitride and produced excellent lenses in the visible and near-IR bands.

In one embodiment, the optical element is a lens defined by patterning the first metasurface portion and the second metasurface portion to be shaped so as to produce a lens effect based on a difference in diffraction at the first wavelength between the first metasurface portion and the second metasurface portion. The lens effect either concentrates light (bending towards the optical axis through the center of the lens) or disperses light (bending away from the optical axis).

In one embodiment, the lens has a numerical aperture of 0.1 to 0.7 when the first wavelength is in the visible range.

In one embodiment, the lens has a transmission efficiency of at least 90% when the first wavelength is in the visible range. In one embodiment, the lens has a transmission efficiency of at least 90% as measured for a light source with a bandwidth of 25 nm centered at 625 nm.

In one embodiment, the lens has a focusing efficiency of at least 40% when the first wavelength is in the visible range. In one embodiment, the lens has a focusing efficiency of at least 50% when the first wavelength is in the visible range. In one embodiment, the lens has a focusing efficiency of at least 40% as measured for a light source with a bandwidth of 25 nm centered at 625 nm. In one embodiment, the lens has a focusing efficiency of at least 50% as measured for a light source with a bandwidth of 25 nm centered at 625 nm.

In one embodiment, the lens has a transmission efficiency of 90% and a focusing efficiency of 30% at the first wavelength and an NA of 0.7. In a further embodiment, the first wavelength is in the visible range. In one embodiment, the lens has a transmission efficiency of 80% and a focusing efficiency of 10% at the first wavelength and an NA of 0.7. In a further embodiment, the first wavelength is in the visible range.

Figure 3A:
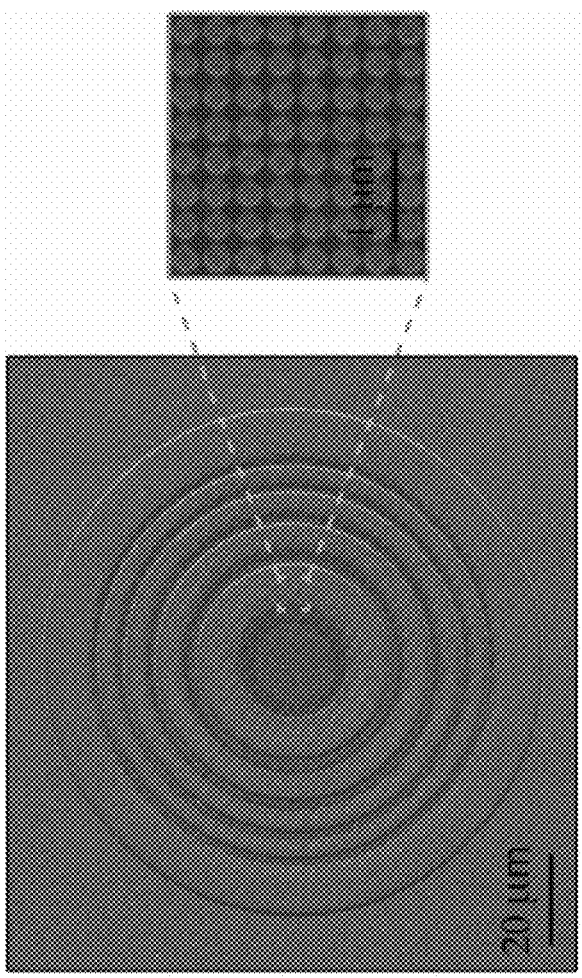
FIGS. 3A-3C: Metasurface lens and setup: (A) Scanning electron micrograph (SEM) of a f=0.5 mm lens. Zoom shows aluminum-capped silicon nitride pillars arranged on a square lattice. (B) SEM of a focusing vortex beam generator with l=1 and f=100 µm. (C) Microscopy setup for imaging the focal plane. The microscope can be translated along the optical axis.
Figure 3B:
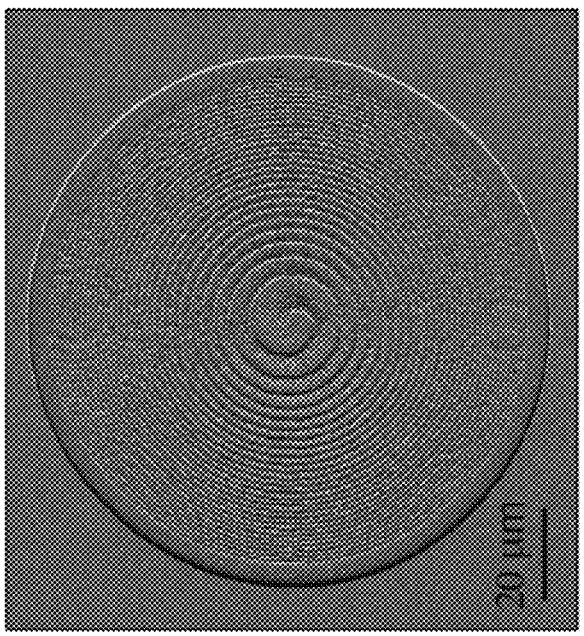

In other embodiments, the optical element is a vortex beam generator, as illustrated in FIG. 3B. In one embodiment, the optical element is a vortex beam generator defined by patterning and a difference in diffraction, at the first wavelength, between the first metasurface portion and the second metasurface portion. Vortex beam generators are known optical elements and, similar to the metasurface lenses disclosed herein, benefit from the ease of manufacture and relatively flat form factor afforded by metasurfaces. By patterning the metasurface posts to affect impinging light in the manner necessary to produce a vortex beam a vortex beam generator is produced.

In other embodiment, the optical element is a cubic phase plate, as illustrated in FIG. 11B. Cubic phase plates are useful in forming Alvarez lenses, as will be discussed in further detail below. EXAMPLE 2 extensively details the modeling and fabrication of both cubic phase plates and Alvarez lenses.

In one embodiment, the optical element is a cubic phase plate defined by patterning and a difference in diffraction, at the first wavelength, between the first metasurface portion and the second metasurface portion.

In general, the disclosed metasurfaces allow for the fabrication of free-form optics, which decouple optical elements from the rigid constraints of traditional refractive lenses. Accordingly, in one embodiment, low-contrast metasurface defines a freeform optical element.

Alvarez Lenses

In another aspect, an Alvarez lens is provided. In one embodiment, the Alvarez lens includes:

a first lens having a first low-contrast metasurface as described herein; and a second lens;

wherein the first lens and the second lens are arranged along an optical axis and configured such that displacement between the first lens and the second lens along a transverse axis in relation to the optical axis will produce a non-linear change in focus.

Alvarez lenses are attractive for their ability to dramatically change focus with relatively small movement between two lenses. Large changes in focal length occur for relatively small displacements between the two lenses along the transverse optical axis, therefore making fast and dramatic optical zoom possible. In an exemplary Alvarez lens pattern, the metasurfaces are patterned as a square grid of posts with differing diameters. The faster the pillars change in diameter, the larger the focal length tuning range.

Alvarez lenses are described in detail in EXAMPLE 2. One half of an Alvarez lens is illustrated in FIG. 11A.

The materials and design principles that apply to the low-contrast metasurfaces disclosed herein are equally applicable to Alvarez lens design. Essentially, an Alvarez lens incorporates at least one, if not two, metasurfaces of the type disclosed herein. The two lenses are designed so as to produce the required optical characteristics of an Alvarez lens. These design principles are generally known and the disclosed metasurfaces provide a new design choice for more readily forming cubic phase plates and Alvarez lenses formed therefrom.

In one embodiment, the Alvarez lens is incorporated into a variable focal length laser. In one embodiment, the Alvarez lens is incorporated into a camera. In a further embodiment, the camera is a mobile-phone camera. In one embodiment the Alvarez lens is incorporated into a vision-enhancing lens (e.g., glasses).

In one embodiment, the second lens comprises a second low-contrast metasurface. Accordingly, both lenses of the Alvarez lens are low-contrast metasurface lenses.

Figure 17:
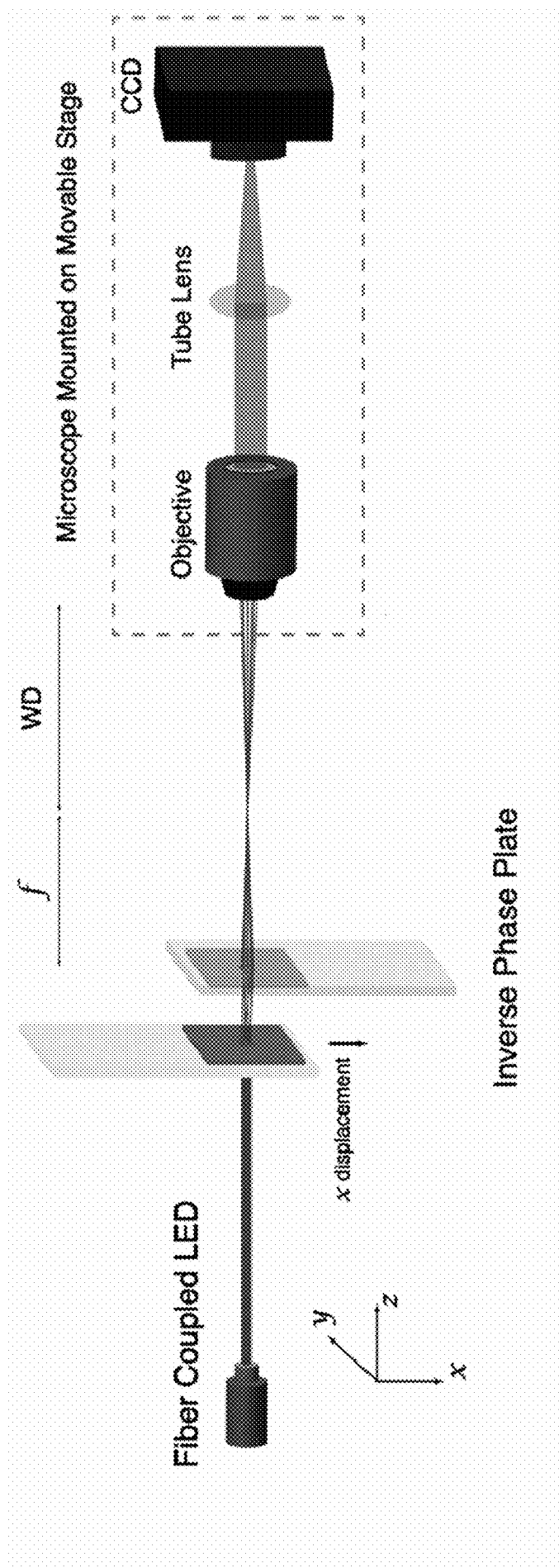
FIG. 17: Alvarez phase plate measurement setup: Schematic of the setup used to measure the performance of the Alvarez lens. Light is provided by a fiber-coupled red light-emitting diode (LED). The Alvarez phase plate is mounted on the LED side while the inverse phase plate is mounted on the microscope side. The Alvarez phase plate is allowed to move in the x direction. The microscope is free to move along the z axis, allowing us to image into and out of the focal plane for each displacement.

In one embodiment, the first low-contrast metasurface is the optical inverse of the second low-contrast metasurface. FIG. 17 in the context of EXAMPLE 2 describes the relationship between the two lenses forming an Alvarez lens.

The following examples are provided for the purpose of illustrating, not limiting, the disclosed embodiments.

Example 1: Low Contrast Dielectric Metasurface Optics

The miniaturization of current image sensors is largely limited by the volume of the optical elements. Using a sub-wavelength patterned quasi-periodic structure, also known as a metasurface, one can build planar optical elements based on the principle of diffraction. However, recent demonstrations of high quality metasurface optical elements are mostly based on high refractive index materials. Here, we present a design of low contrast metasurface-based optical elements. We validate our theory by fabricating and experimentally characterizing several silicon nitride based lenses and vortex beam generators. The fabricated lenses achieved beam spots of less than 1 μm with numerical apertures as high as ~0.75. A transmission efficiency of 90% and focusing efficiency of 40% in the visible regime was observed. Our results pave the way towards building low loss metasurface-based optical elements at visible frequencies using low contrast materials, and extend the range of prospective material systems for metasurface optics.

Conventional transmissive macroscopic optical elements primarily depend on refraction to control the propagation of light. Refraction relies heavily upon the exact curvature of the surface, and the spatial extent of the element in order to achieve gradual phase accumulation. This imposes a fundamental limitation on the miniaturization of optical sensors and elements, which is necessary for various applications such as the Internet of Things, bio-photonics and two-photon absorption microscopy. Metasurfaces, two-dimensional quasi-periodic arrays of sub-wavelength structures, present a novel method of miniaturizing optical elements. Rather than relying on gradual phase accumulation through light propagation, each sub-wavelength structure imparts a discrete, abrupt change in the phase of incoming light. This has motivated the design of metasurface-based optical elements including lenses, focusing mirrors, vortex beam generators, holographic masks, and polarization optics.

Thus far, high quality metasurface optical elements based on metals, titanium oxide, and amorphous silicon have been demonstrated. Unfortunately, metals are significantly lossy at optical frequencies, titanium oxide lacks CMOS compatibility, and amorphous silicon absorbs light in the visible and near-infrared spectrum (~400-900 nm). This wavelength range is of particular interest for many applications due to ubiquitous, low-cost silicon detectors, motivating the development of high band gap material based metasurfaces. However, high band gap CMOS-compatible materials such as silicon nitride and silicon dioxide, which are transparent over the aforementioned wavelength range, have a low refractive index. Although silicon dioxide metasurface lenses have been previously demonstrated, they had low numerical apertures, resulting in large beam spots. In this Example, we demonstrate operation of high quality metasurface lenses (NA~0.75) and vortex beam generators based on silicon nitride at visible wavelengths. Our results present a methodology for producing low-loss high quality metasurface optics that is compatible with both silicon detectors, and conventional CMOS fabrication technologies.

Figure 1B:
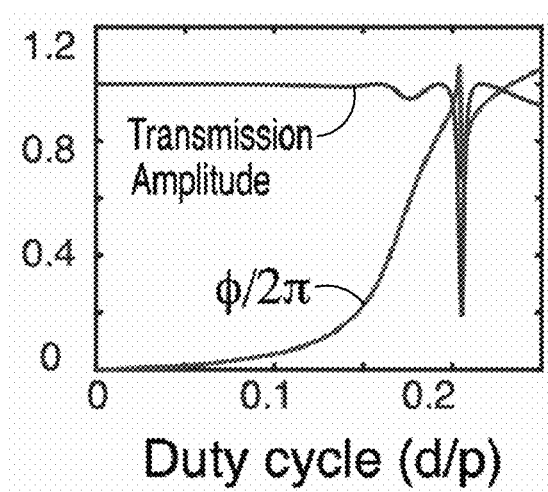
Figure 1C:
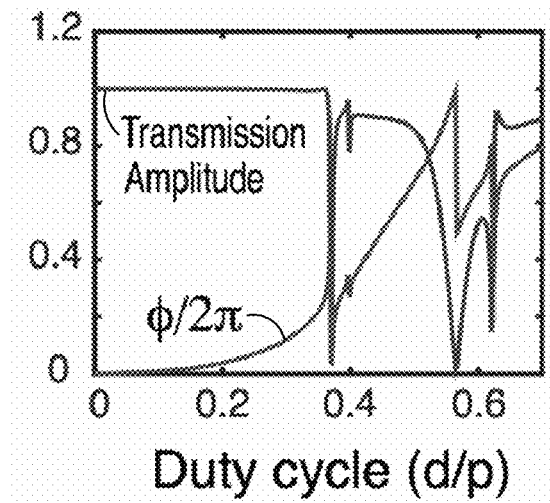

The main building block of a metasurface is a grating composed of scatterers arranged in a sub-wavelength periodic lattice (with a period p). In this Example, we focus on cylindrical posts as the scatterers, which are arranged on a square lattice (FIG. 1A). For such a grating, the higher order diffracted plane waves are evanescent and only the zeroth order plane wave propagates a significant distance from the grating. The complex transmission coefficient of this plane wave depends upon the grating periodicity p, scatterer dimensions (both the diameter d and thickness t), and refractive index n, as shown in FIG. 1A. The use of metasurfaces to build optical components is primarily motivated by the observation that the functionality of many such components, such as lenses and focusing mirrors is determined by a spatial phase profile imparted on an incident beam. Reproducing these devices using a metasurface involves selecting the correct parameters to achieve the desired spatial phase profile, arranging the scatterers on a sub-wavelength lattice, and spatially varying their dimensions. In order to design an arbitrary transmission phase profile, however, we must be capable of producing phase shifts spanning the whole 0 to $2\pi$ range while maintaining large transmission amplitudes. Such phase variations have been demonstrated earlier with high refractive index scatterers (FIG. 1B). Via numerical simulation using rigorous coupled wave analysis (RCWA), we found that it is possible to select grating parameters so as to achieve such a phase variation with a low contrast grating. In these simulations, we calculate the achievable phases and transmission amplitudes by varying the diameter d of the posts for a fixed periodicity p, substrate thickness ($t_{sub}=\lambda$), and refractive index of n~2. At first glance, one might assume that one can arrive at a low contrast grating refractive index of n~2. A possible procedure for arriving at a low contrast grating design is by simply scaling the high contrast grating inversely with the grating index. However, while such a simple scaling method can produce phase shifts spanning the whole 0 to $2\pi$ range, it also results in severe dips in the transmission amplitude due to the appearance of resonances (FIG. 1C). Note that, these resonances also appear in the high contrast case (FIG. 1B), but they are generally significantly narrower when compared to the low contrast case. The broad resonances in the low contrast design result in strongly varying transmission amplitudes, rendering it unsuitable for an efficient optical element.

These resonances can however, be engineered by choosing different grating parameters, such as thickness and periodicity. Specifically, by varying the thickness and periodicity of the low contrast grating, we can transition from a region with many resonances to a non-resonant regime. Simulation results with varying thicknesses and periodicities are shown in FIGS. 2A-2I. For t=1.2λ and p=0.4λ, the phase delay and transmission amplitude are both continuous for all the post-diameters, with only small variations in the transmission amplitude (FIG. 2G). This set of parameters can be considered to be fully within the non-resonant regime as it lacks any discontinuities in the phase or transmission amplitude. Unfortunately, this design has a large aspect ratio, making it difficult to fabricate. By increasing the thickness of the pillars, the resonances are narrowed for a given periodicity (FIG. 2C, I). Additionally, increasing the periodicity for a fixed thickness results in more resonances in all cases. Based on these simulations, we chose the parameters t=λ and p=0.7λ (FIG. 2H), to ensure a moderate aspect ratio for fabrication while maintaining near unity transmission amplitudes for the whole range of phases.

We can realize any arbitrary phase profile by arranging these scatterers in a lattice. We chose to fabricate aspheric lenses and a vortex beam generator due to their relatively simple phase profiles. The spatial phase profile of a lens is given by:

$$\Phi(x, y) = \frac{2\pi}{\lambda}\left(\sqrt{x^2 + y^2 + f^2} - f\right), \quad (1)$$

where f is the focal length of the lens, (x,y) are the in-plane coordinates, z is the propagation direction, and λ is the design wavelength. The spatial phase profile of a focusing vortex beam generator is:

$$\Phi(x, y) = \frac{2\pi}{\lambda}\left(\sqrt{x^2 + y^2 + f^2} - f\right) + l\theta, \quad (2)$$

which is a lens modified by the angular momentum term (lθ), where l is an integer specifying the orbital angular momentum state and θ is the azimuthal angle in the lens plane. In our design, we map the spatial phase profile onto a square lattice by discretizing the phase profile into six steps. For each discrete value of the phase profile, we find the radius of the pillar that most closely reproduces that phase. In our lens, the radii of the pillars vary from 96 nm to 221 nm, all with thickness equal to λ (633 nm) on a lattice with a periodicity of 0.72λ (443 nm) corresponding to FIG. 2E.

To validate our theory, we fabricated and characterized metasurface lenses and vortex beam generators in silicon nitride (n~2). FIGS. 3A and 3B show respectively, a scanning electron micrograph (SEM) of the fabricated lens and vortex beam generator. We prepared the wafer by depositing 633 nm of silicon nitride on a 500 μm thick quartz substrate using plasma enhanced chemical vapor deposition (PECVD). 50 nm of aluminum was then evaporated onto the silicon nitride, serving both as a hard mask and as a charge-dissipation layer necessary for electron beam lithography. The pattern was exposed on 160 nm ZEP 520A using a Jeol JBX-6300FS 100 kV electron beam lithography system. Following development in amyl acetate, the sample was dry etched with a $Cl_2$ and $BCl_3$ plasma to transfer the pattern on the aluminum layer, forming the hard mask. Finally, a $CHF_3$ and $O_2$ plasma was used to etch the 633 nm pillars, and the remaining aluminum was removed using sulfuric acid.

Figure 3C:
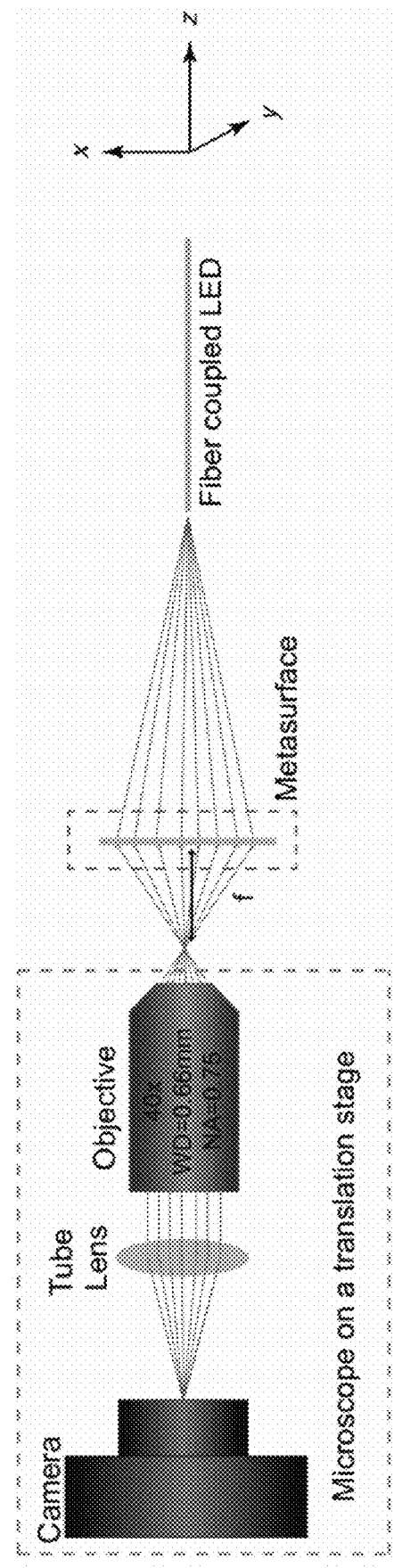

The schematic of the optical setup used to probe the structures is shown in FIG. 3C. The characterization setup utilizes a 40× objective (Nikon Plan Fluor) with a working distance of 0.66 mm and NA 0.75, and a tube lens (Thorlabs SM2A20) with a focal length of 20 cm as a microscope. The magnification of the setup was determined using known dimensions of the lens. We mount the metasurface on a glass slide with the front facing the microscope. The devices were illuminated with red (Thorlabs M625F1), green (Thorlabs M530F1), and blue (Thorlabs M455F1) light-emitting diodes (LEDs).

Figure 4A:
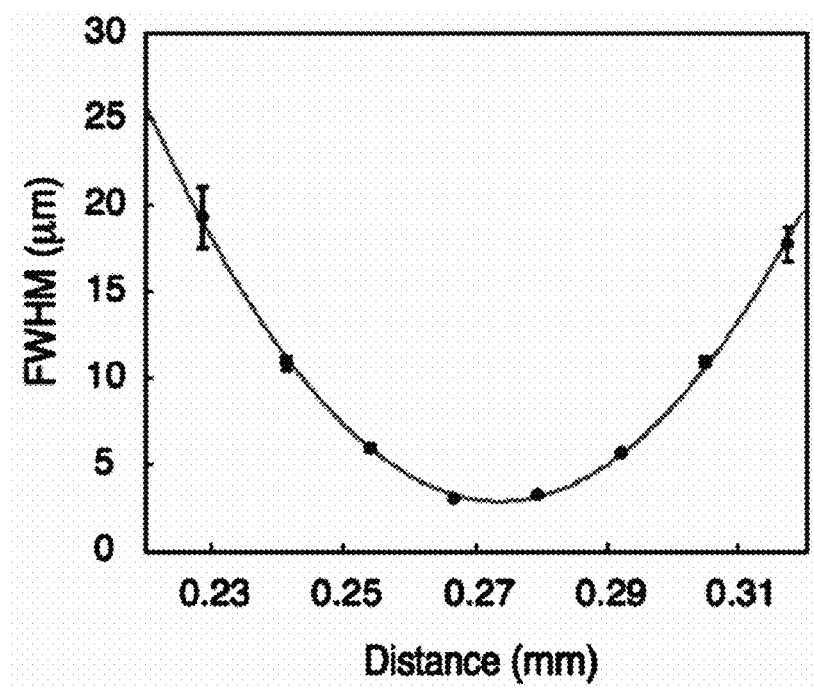
FIGS. 4A-4C: 250 µm focal length lens performance measured with a LED centered at 626 nm: (A) The FWHM is plotted as a function of the distance in the z-direction. The working distance of the objective has been subtracted. The error bars denote the 95% confidence interval for the Gaussian fits. The fit curve is an eye guide. (B) 2D intensity profile at the focal plane, the point just before 0.27 mm in (A). (C) A Gaussian function is fit to the cross-section data to estimate the beam size. Cross-section taken from dashed white line in (C). We use the FWHM as a measure for the beam size.
Figure 4B:
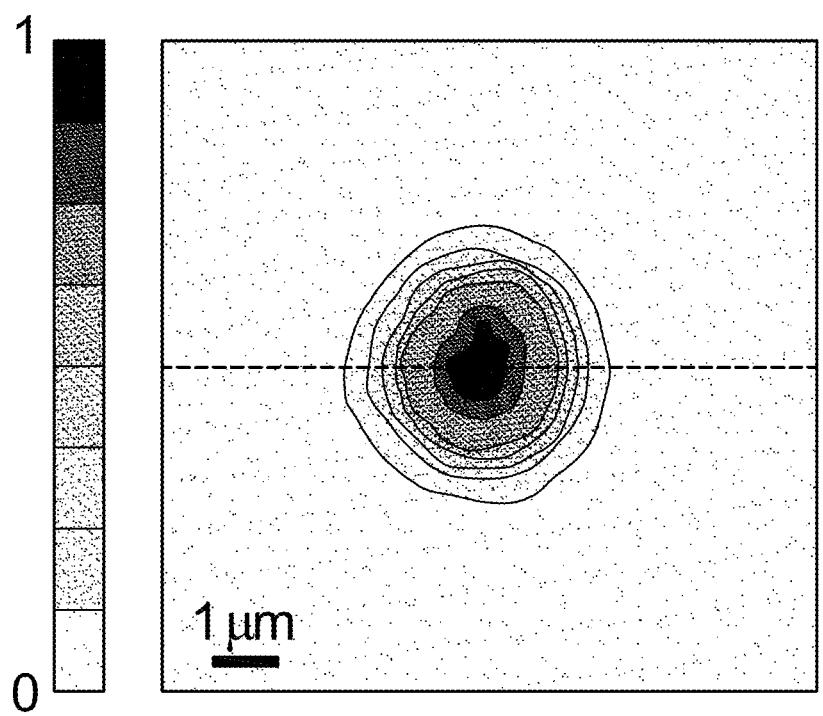
Figure 4C:
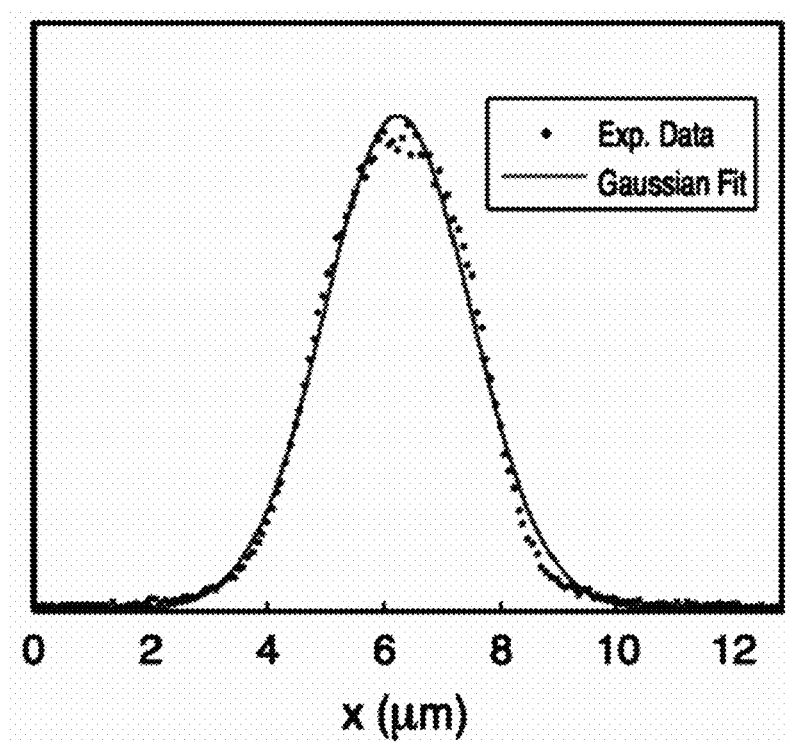

The intensity profiles were captured using the microscope and a Point Grey Chameleon camera. By translating the microscope and camera along the optical axis, we can move into and out of the focal plane and image the x-y plane intensity profile at varying z-distances. During characterization we can clearly see that the beam radius is changing as we translate into and out of the focus. The full-width half maxima (FWHM) values obtained by a Gaussian fit are plotted in FIG. 4A as a function of the distance in the z-direction. The increasing error bars away from the focal distance are due to the divergence of the single peak into two peaks as the microscope moves out of the focal plane. A typical example of the intensity profile near the focal point is shown in FIG. 4B. A Gaussian fit is shown in FIG. 4C.

We fabricated lenses with five different focal lengths between 50 μm and 1 mm with a lens radius of 56 μm. The measured FWHM of the focal spot sizes for all the lenses are plotted against the ratio of the lens focal length (f) to lens diameter (d) in FIG. 5A, where the dashed line is the FWHM of a diffracted limited spot of a lens with the given geometric parameters. The deviation from the diffraction limit is attributed mostly due to fabrication imperfection. The criterion for the diffraction limited FWHM spot is given below, and simulated spot sizes for low f/d lenses are provided below. The 50 μm lens achieves a spot size diameter of less than 1 μm. The measurement of the focal distance also agrees well with our design parameters.

Figure 5A:
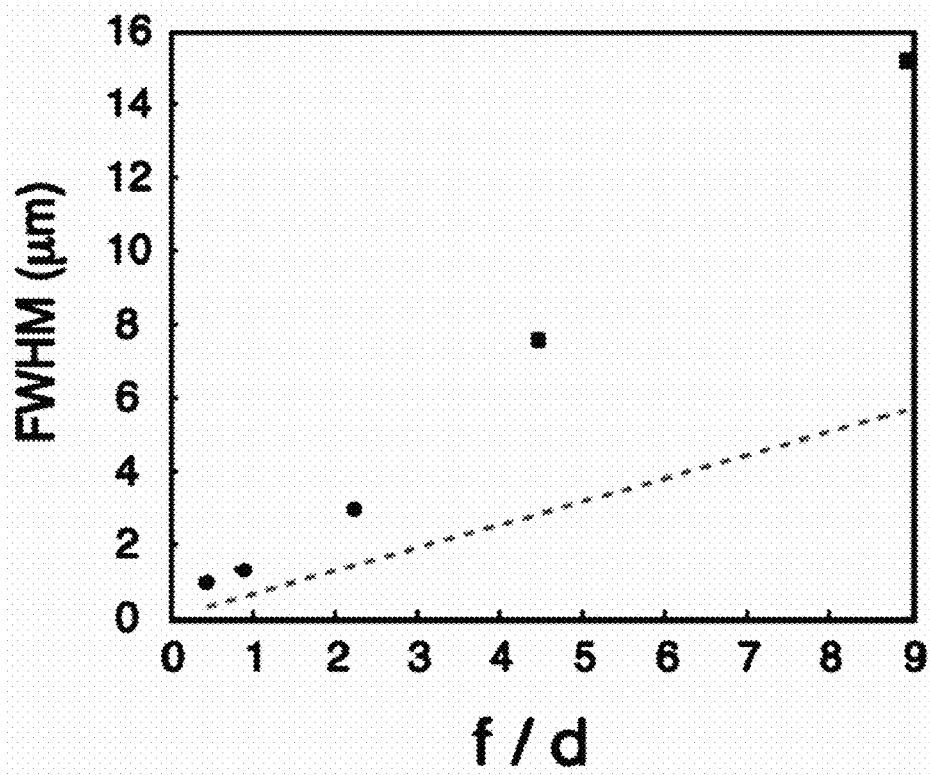
FIGS. 5A-5C: Performance of metasurface lenses plotted as a function of the ratio of their focal length to diameter: (A) Measured focal spot sizes for all fabricated lenses. The dashed line is the diffraction limited FWHM. The justification for the dashed line is disclosed below with reference to FIGS. 7a-7c. (B) Measured transmission and focusing efficiencies for all fabricated lenses. Error bars are obtained from the standard deviation of three measurements on each device. (C) Chromatic dispersion of the lens. Red, blue, green correspond to illumination with 625 nm, 530 nm, and 455 nm LEDs respectively. Plotted curves are eye guides, and error bars represent the 95% confidence intervals for the Gaussian fits.
Figure 5B:
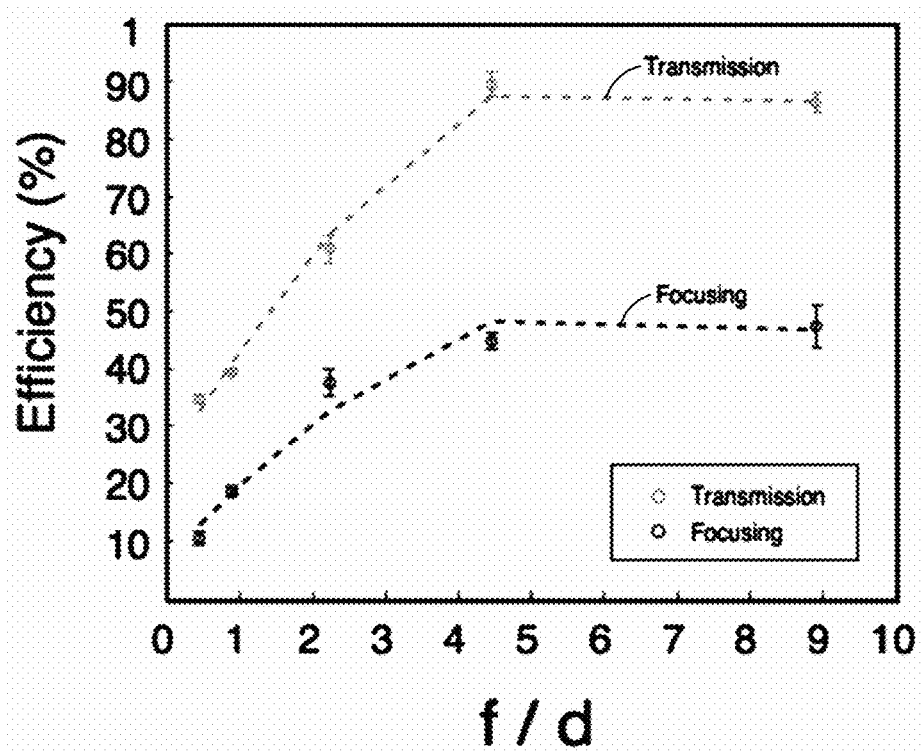
Figure 5C:
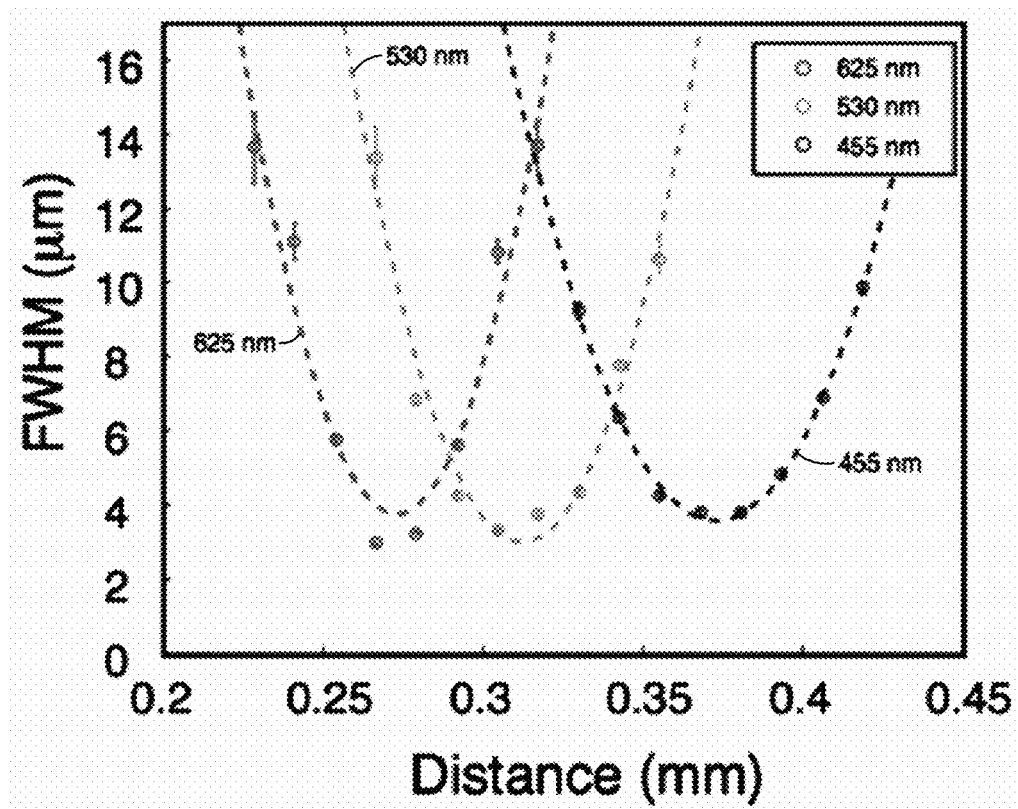
Figure 8A:
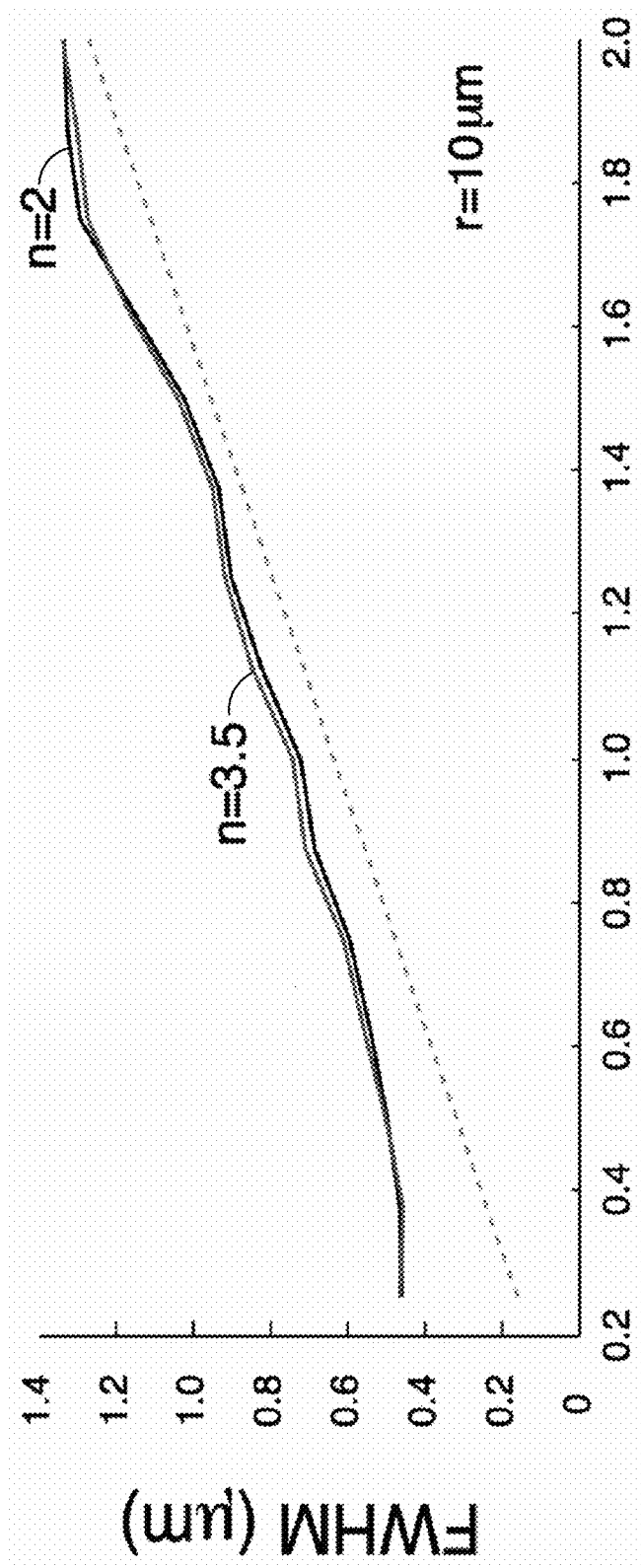
FIGS. 8A-8B: Simulated FWHM of low (n=2) and high contrast lenses (n=3.5) for lenses with radii (A) 10 µm and (B) 15 µm for operation at λ=633 nm. The focal length ranges from 5 µm to 40 µm. Parameters for the n=2 simulations are the same as the fabricated lenses. The n=3.5 set uses periodicity p=0.52λ and the pillar radii vary from 59 to 91 nm all with a thickness t=0.61λ. Simulations are run with a 40 nm mesh in FDTD. The dashed line represents the diffraction limited FWHM using the methodology presented in FIGS. 7A-7C.
Figure 8B:
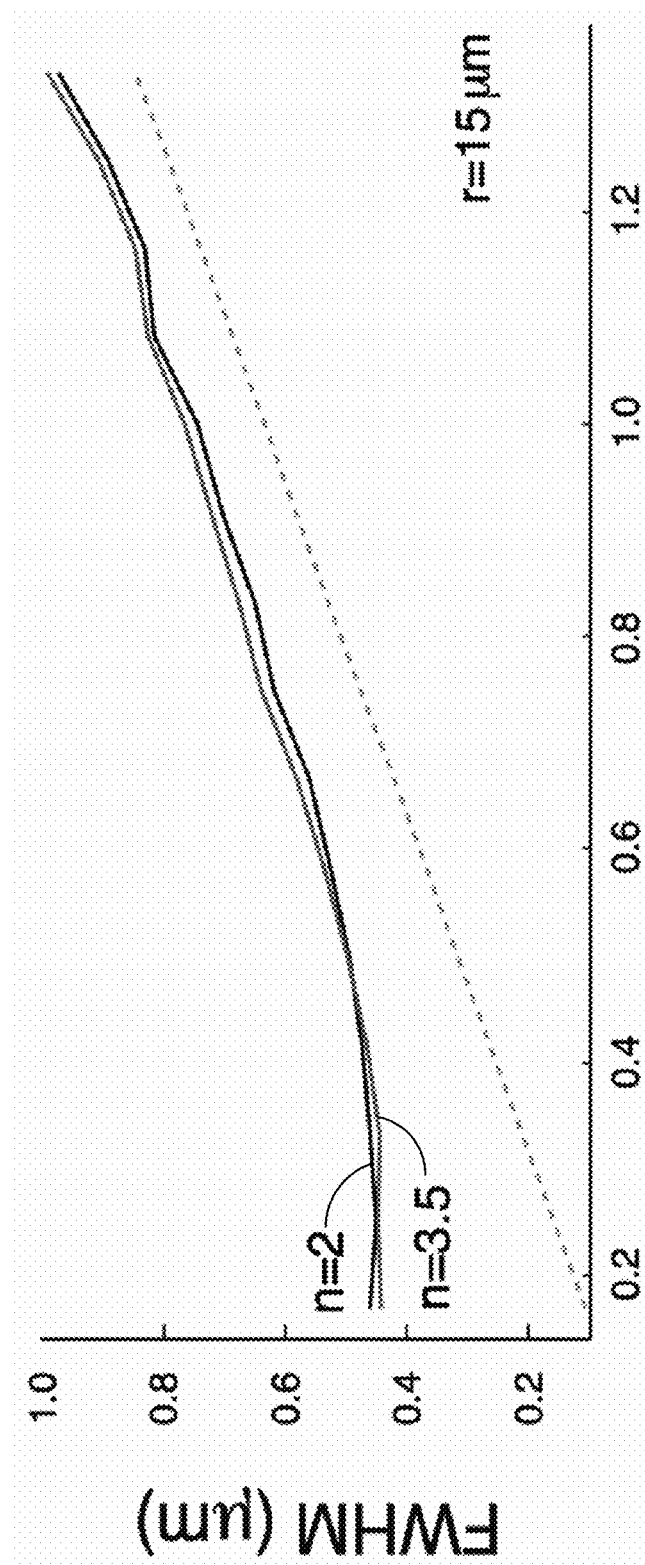
Figure 9A:
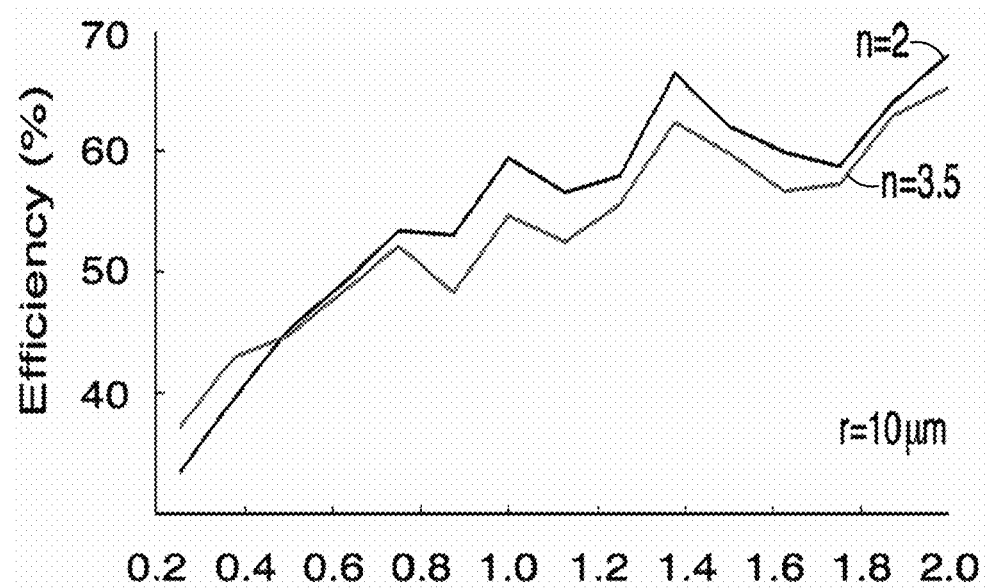
FIGS. 9A and 9B: Simulated efficiencies of low (n=2) and high contrast lenses (n=3.5) for lenses with radii (A) 10 µm and (B) 15 µm for operation at λ=633 nm. The focal length ranges from 2.5 µm to 40 µm. The efficiency is determined by the ratio of the power within a circle with a radius three times the FWHM from FIG. 7A and FIG. 7B to the power incident upon the lens.
Figure 9B:
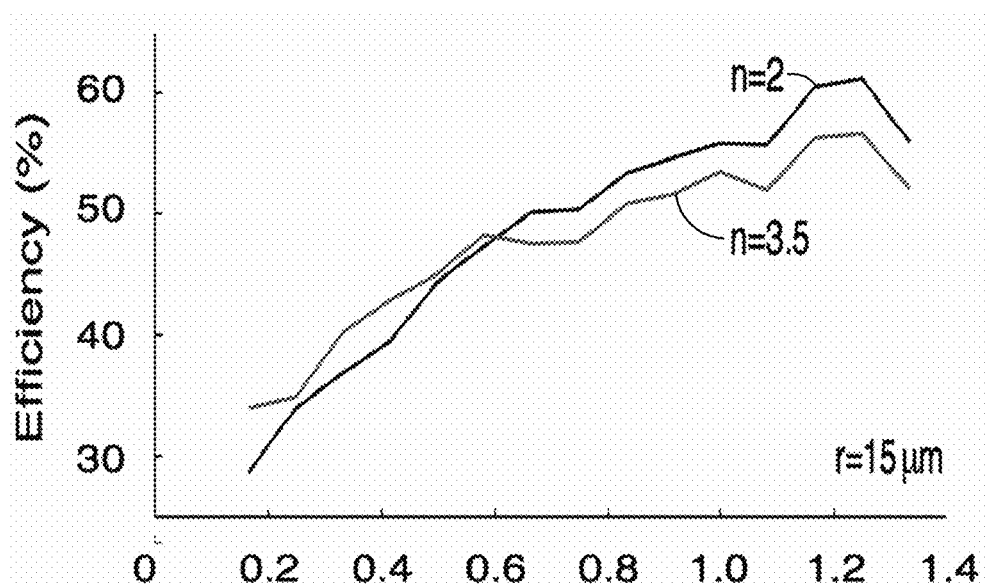

In order to measure the focusing efficiency of the lens we inserted a flip mirror before the camera to direct the beam to a power meter (Newport 1918-R). We then measure the incident power to the focus by using a pinhole to isolate a spot with radius three times the FWHM. The focusing efficiency was taken to be the ratio of the power incident on the focus to the power incident on the lens. The transmission efficiency was taken to be the ratio of the power incident on the detector through the lens to the power incident through a glass slide. Transmission and focusing efficiencies both show an increase as the focal length of the lens increases as shown in FIG. 5B. The focusing efficiency reaches a maximum of ~40% for the 1 mm lens and the transmission efficiency rises to near 90% for the 500 μm lens. These transmission efficiencies are significantly higher than other metasurfaces in the visible frequency range. Simulated efficiencies for both low and high contrast lenses with low f/d are provided below with regard to FIGS. 8A and 8B. In addition, we investigated the chromatic behavior of the lens for red, green, and blue light. The wavelength dependence of the 250 μm focal length lens is shown in FIG. 5C. The focal distance of our lens increases with decreasing wavelength, increasing from ~0.26 mm at 625 nm to ~0.35 mm at 455 nm. We also observe an increase in the size of the focal spot with decreasing wavelength, from a minimum of ~3 μm at 625 nm to a maximum of ~4 μm at 455 nm. We remark that the product of the experimentally measured focal length (f) and illumination wavelength (λ) is roughly constant for our design, as expected.

Figure 6A:
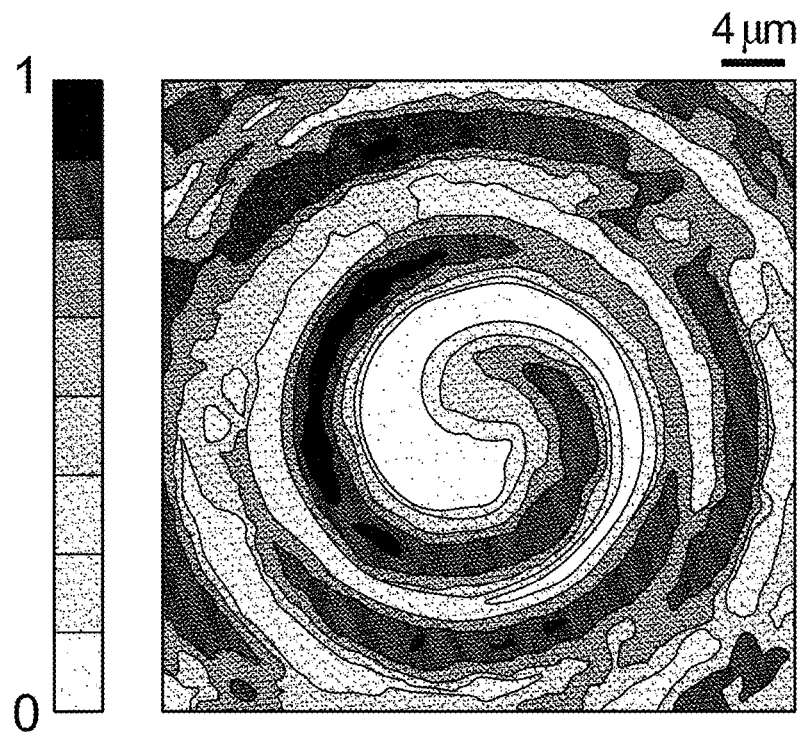
FIGS. 6A and 6B: Vortex beam generator normalized intensity field profiles for (A) l=1, and (B) l=2 showing the distinct helical wave fronts. Both figures share the same color bar.
Figure 6B:
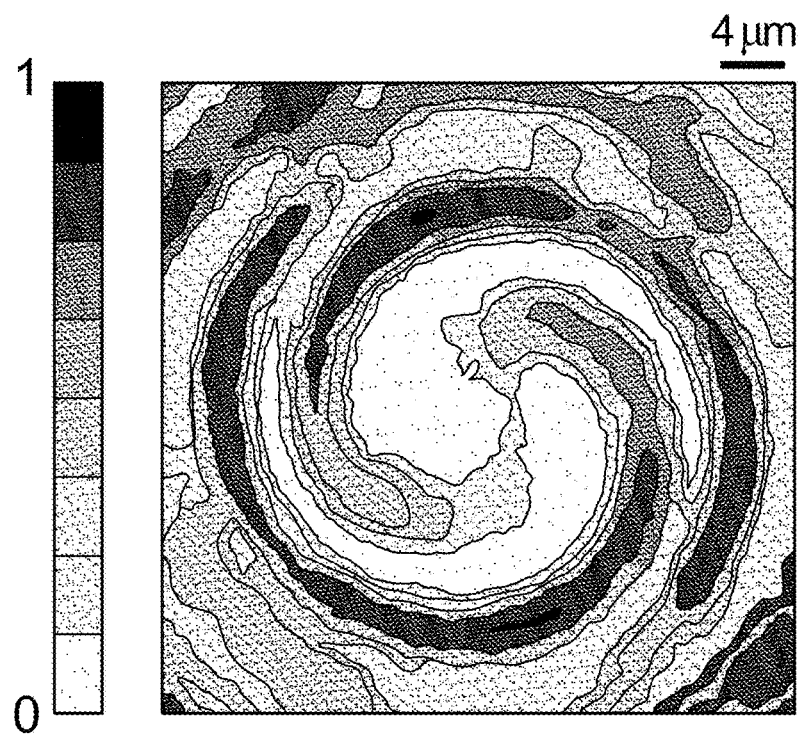

Finally, we characterized the vortex beam generators and imaged their intensity profiles as shown in FIGS. 6A and 6B. They were fabricated with a focal length of 100 μm, radius of 60 μm, and orbital angular momentum states l=1 (A), and l=2 (B). The experimentally measured spiral intensity profiles clearly show the two distinct orbital angular momentum states.

We have designed and fabricated low contrast high quality metasurface optical elements based on silicon nitride. Our lenses achieved transmission efficiencies of up to 90% and focusing efficiencies of up to 40%, in addition to a sub 1 μm spot size, with a numerical aperture of 0.75. The performance of these lenses is significantly better than previously reported results in the context of low contrast diffractive gratings. Recent demonstration of optical elements with similar performance employed high contrast materials such as metals and silicon that are incompatible with operation in the visible spectrum. The formalism we developed is applicable for the design of arbitrary spatial phase profiles in the same way as previous designs, and brings the field of metasurface optics fully into the visible spectrum. Additionally, by using silicon nitride as our metasurface material, we can leverage both CMOS compatibility and low visible absorption to design our lenses. We emphasize that our analysis is not limited to silicon nitride (n~2), but is also applicable to other low index materials such as transparent conducting oxides (TCO), organic polymers, transparent printable materials, and silicon dioxide. These materials, specifically TCOs and organic polymers, may provide an easier way to tune the metasurface elements due to their stronger electro-optic properties or strong free carrier dispersion.

Characterizing Focusing Performance

The size of the focal spot is an important figure of merit to assess the quality of the lens. The Rayleigh criterion is the physical limit to the size of the focal spot achievable by a perfect circular lens, and is defined by the first zero of the airy disk. This limit depends both on the geometry of the lens and the wavelength of light, and is given by:

$$\Delta x = 1.22 \lambda N \quad (3)$$

where $\Delta x$ is the radius of the diffraction limited spot, $\lambda$ is the wavelength of interest, and N is the f-number of the lens and is defined as the ratio f/d. N encompasses the entirety of the geometric component of the diffraction limit, and is a valid approximation for lenses with focal lengths much larger than their diameter. However, our low focal length lenses (50 and 100 μm) do not satisfy this requirement, and therefore require a different methodology for determining their focusing performance.

Figure 7A:
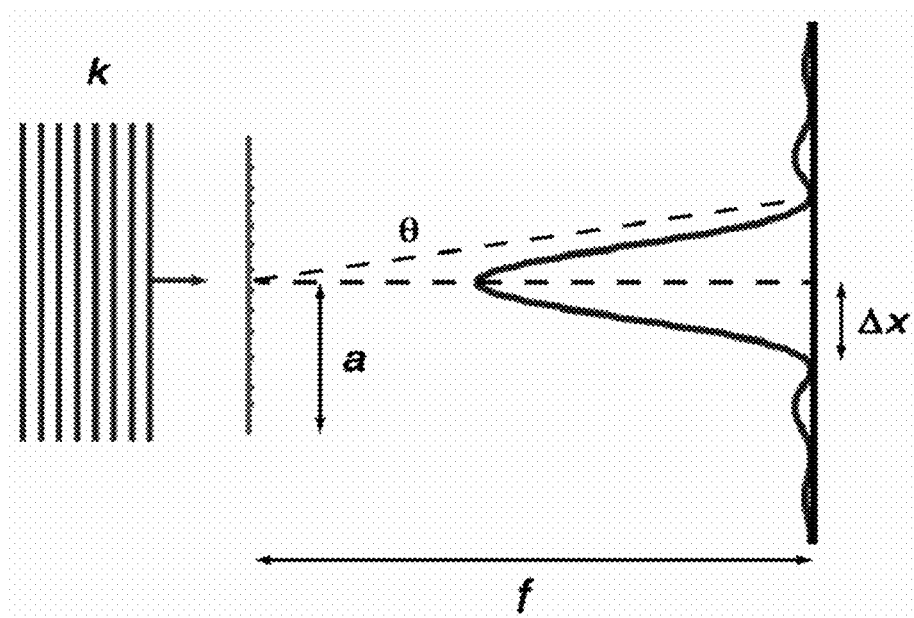
FIGS. 7A-7C: Fitting the Airy disk with a Gaussian. (A) Schematic of parameters used for calculation of Airy disk profile. Examples of a Gaussian fit to an Airy disk, which represents the intensity profile of an ideal (B) 50 µm and (C) 1 mm lens. (A) and (B) correspond to the first and last data points of FIG. 5A, respectively. The diffraction limited FWHM is obtained from the Gaussian fit.
Figure 7B:
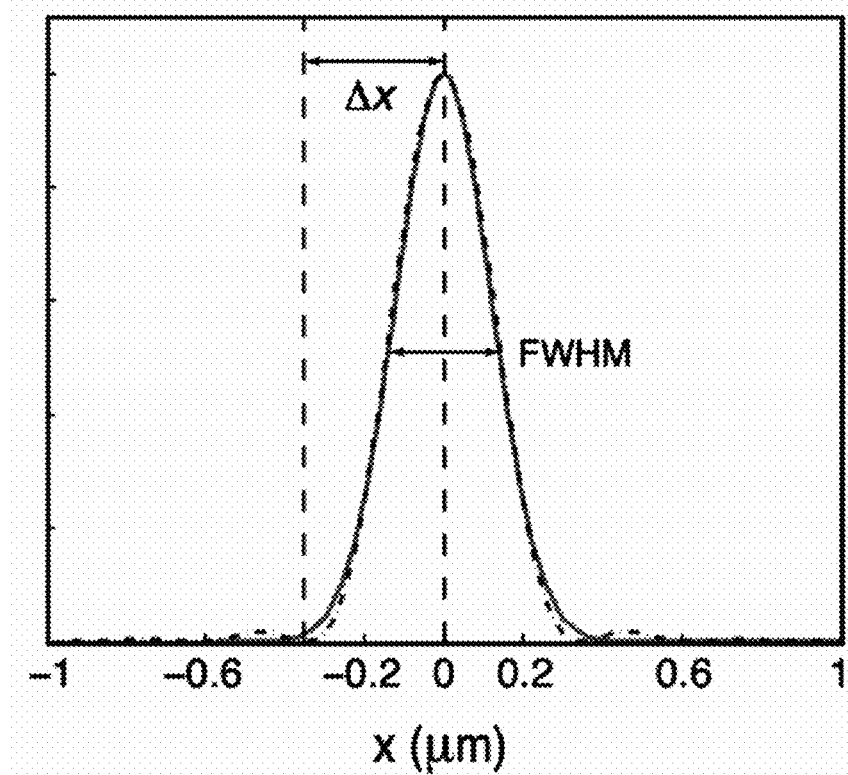
Figure 7C:
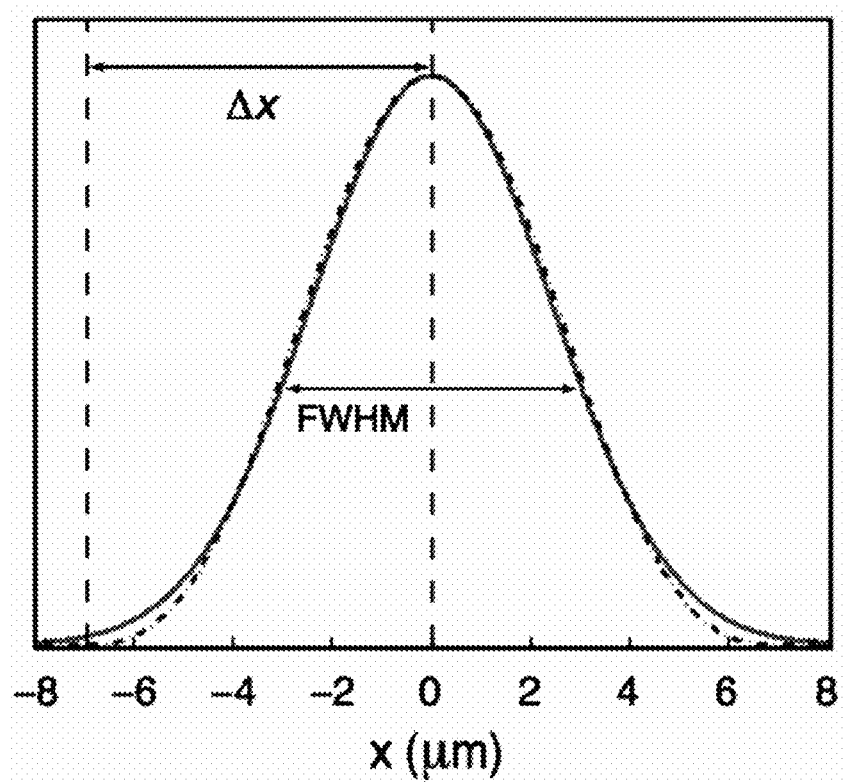

Here we present a consistent criterion for characterizing the focusing performance of a lens with any combination of geometric parameters. An ideal lens with a focal length f and radius a will produce an intensity profile given by the Airy disk:

$$I(\theta) = I_o \left( \frac{2 J_1(ka\sin\theta)}{ka\sin\theta} \right)^2 \quad (4)$$

where $I_o$ is the maximum intensity of the central peak, $J_1(x)$ is the first order Bessel function of the first kind, k is the free space wave vector of the incident light, a is the radius of the lens, and $\theta$ is the angular position as shown in a. We can then determine the diffraction limited FWHM for a lens with focal length f and radius a by fitting the Airy disk using a Gaussian as shown in FIGS. 7B and 7C. We then compare our experimentally measured FWHM against that of a perfect lens with the same geometric parameters as shown in FIG. 5A. We attribute our deviation from the diffraction limited spot size mainly to fabrication imperfection.

Simulated Focal Spot Sizes of Low and High Contrast Lenses

We simulated high and low contrast lenses with varying radii and focal distances in a finite difference time domain (FDTD) program. Note that here we consider only dielectric lenses, for high contrast we choose silicon (n~3.5) and for low contrast we use silicon nitride (n~3.5). The FWHM is based on a Gaussian fit to a slice of the intensity profile and the results for lenses with radii of 10 and 15 µm and focal distances varying from 5 to 40 µm are plotted in FIG. 8. We observe that both the high and low contrast lenses offer similar performance in terms of focal spot size. The high contrast lenses use material and geometric parameters analogous to those of silicon. It is also interesting to note that both sets of lenses fail to reach a diffraction-limited spot in simulation while it has been experimentally shown that metal based lenses are capable of reaching the diffraction limit. This is because metals provide a much larger index contrast, and hence can ultimately achieve a superior performance, albeit at the cost of reduced efficiency due to loss.

Simulated Efficiencies of Low and High Contrast Lenses

Based on simulations of both high and low contrast lenses with varying geometric parameters, we found negligible differences between the efficiencies of low and high contrast lenses. We note that in these simulations, we neglect the losses in silicon just to compare the performance of a high and low contrast lens The calculated efficiencies are plotted in FIGS. 8A and 8B, and should be understood as the product of the experimentally measured transmission and focusing efficiencies presented in FIG. 5B in the main text. In general, the efficiency increases with the ratio f/d and lenses with similar f/d show similar performance In particular, both the 10 and 15 µm lenses show a crossing between low and high contrast lenses at around f/d=0.5.

In conclusion, we have demonstrated a low contrast metasurface design allowing for the arbitrary shaping of an optical wavefront in the visible regime. The use of low contrast materials extends the range of materials available for metasurface optics. The wavelength-scale thickness and planar geometry of the optical elements allows the miniaturization of optical elements for integration on optical fibers for bio-photonics and use in small-scale optical systems. In addition, this approach greatly simplifies the design and fabrication process of complicated aspherical optical elements, including free-form optics.

Example 2: Metasurface Analogue of Freeform Optical Designs

Freeform optics aims to expand the toolkit of optical elements by allowing for more complex phase geometries beyond rotational symmetry. Complex, asymmetric curvatures are employed to enhance the performance of optical components while minimizing their weight and size. Unfortunately, these high curvatures and complex forms are often difficult to manufacture with current technologies, especially at the micron scale. Metasurfaces are planar sub-wavelength structures that can control the phase, amplitude, and polarization of incident light, and can thereby mimic complex geometric curvatures on a flat, wavelength-scale thick surface. We present a methodology for designing analogues of freeform optics using a low contrast dielectric metasurface platform for operation at visible wavelengths. We demonstrate a cubic phase plate with a point spread function exhibiting enhanced depth of field over 300 µm along the optical axis with potential for performing metasurface-based white light imaging, and an Alvarez lens with a tunable focal length range of over 2.5 mm with 100 µm of total mechanical displacement. The adaptation of freeform optics to a sub-wavelength metasurface platform allows for the ultimate miniaturization of optical components and offers a scalable route toward implementing near-arbitrary geometric curvatures in nano-photonics.

The function of an optical element is intrinsically tied to its geometry. While manufacturability has often constrained optical elements to have rotational invariance, the emerging field of freeform optics leverages more complex curvatures, often involving higher (>2) order polynomials of the spatial dimension, to enable novel functionalities and simplified compound optical systems. These elements have been shown to be capable of correcting aberrations, off-axis imaging, expanding field of view, and increasing depth of field. Recent interest in freeform optics has been driven by potential applications in near-eye displays as well as compact optical systems for medical, aerospace, and mobile devices where there are stringent constraints on the size and weight of the optical package. One surface of particular interest is the cubic profile, where the surface of the optical element is defined by a cubic function. These elements have been shown to exhibit increased depth of focus, and in tandem, they can form an aberration-correcting lens with adjustable focus called the Alvarez lens. Many methods of realizing freeform optical elements, and in particular cubic surfaces, have been suggested and implemented, including fluid-filled, custom single-point diamond turned polymer, and diffractive optical elements. Unfortunately, diffractive optics and single-point diamond turned elements often require complex and expensive fabrication, such as multistage lithography or machining procedures ill-suited for large-scale production. Additionally, the thickness of these optical elements is large, resulting in an increased overall volume. Unlike conventional optics, metasurface optical design is curvature agnostic, readily accepting both conventional spherical curvatures as well as complex freeform surfaces with no additional design difficulties, while maintaining a thickness on the order of the optical wavelength. Moreover, well-developed semiconductor nanofabrication technology can be readily employed to fabricate such structures.

Metasurfaces are two-dimensional arrays of sub-wavelength scale scatterers arranged to arbitrarily control the wavefront of incident electromagnetic waves. Rather than relying upon gradual phase accumulation, metasurfaces impart an abrupt, spatially varying phase profile on the incident light. This allows us to map complex curvatures onto a flat, wavelength scale thick surface by converting them into a discretized spatial phase profile. In addition to their compact size and weight, metasurfaces are fabricated using a single step lithography procedure with mature, highly scalable nanofabrication technology developed by the semiconductor industry. Numerous different metasurface material platforms have been demonstrated, including noble metals, high contrast dielectrics, and low contrast dielectrics. For visible wavelengths, low contrast dielectrics, such as silicon nitride, are desirable as they do not suffer from absorption losses due to their wide band gap and also exhibit similar performance to other material platforms. In recent years, all dielectric metasurfaces have been used to build many different optical components such as quadratic lenses, vortex beam generators, and holograms. However, there has been little research in realizing freeform optical elements in visible frequency for imaging applications utilizing a metasurface platform. While both vortex beam generators and holograms lack rotational symmetry, their spatial phase functions are not characterized by higher order polynomials, (>3) as is the case for most freeform optics. In this Example, we present a silicon nitride metasurface-based cubic phase optical element and an Alvarez lens operating at visible wavelengths. We observed an extended depth of focus (~300 µm), enough to ensure an identical point spread function (PSF) for red and green light at the same image plane, potentially enabling white light imaging. Additionally, we experimentally demonstrated a change in focal length of ~2.5 mm by a physical displacement of only 100 µm using the Alvarez lens. This is the highest reported focal length tuning range in metasurface optics, and most importantly, the change in the focal length is significantly larger (~25 times) than the actual physical displacement.

Figure 10A:
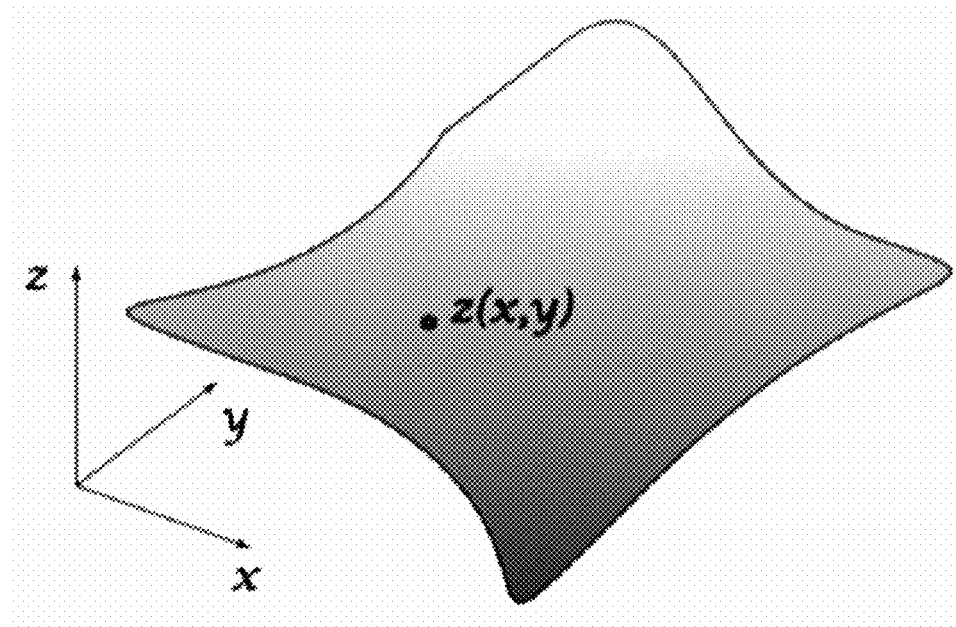
FIGS. 10A-10D: Mapping a freeform surface onto a metasurface: An arbitrary freeform surface is shown in (A). The corresponding height z(x,y) is converted into a discretized phase profile using the pillar parameters shown in (B). The parameters in (B) are capable of producing a full cycle of phase shifts and also maintain large regions of continuous, near unity transmission amplitude. (C) and (D) are simple schematics of a metasurface with thickness t, periodicity p, and diameter d.
Figure 10B:
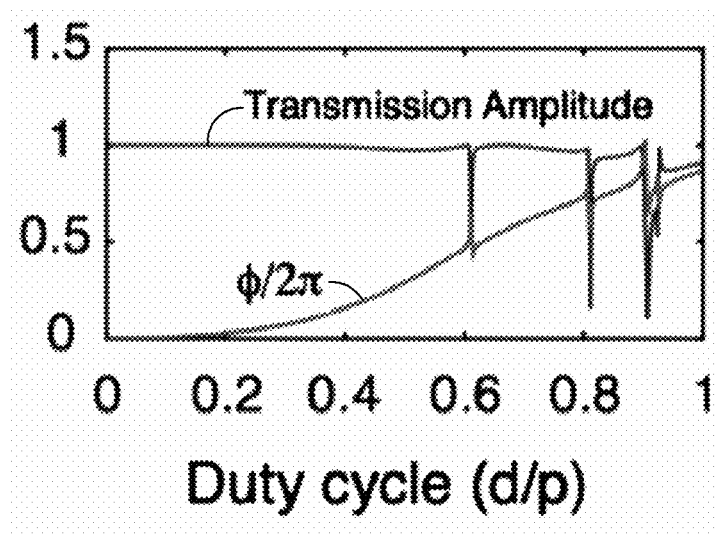
Figure 10C:
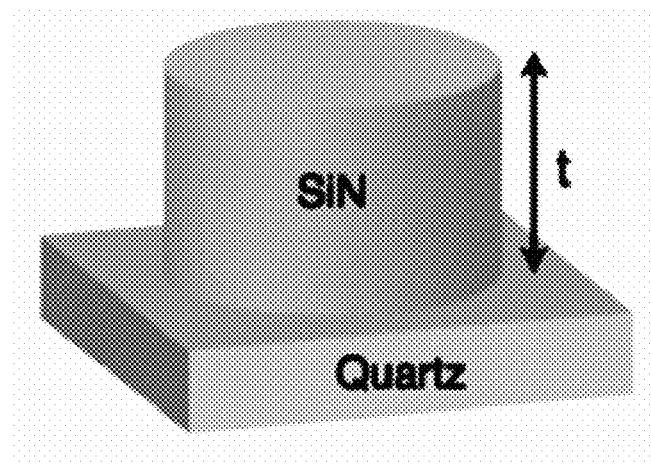
Figure 10D:
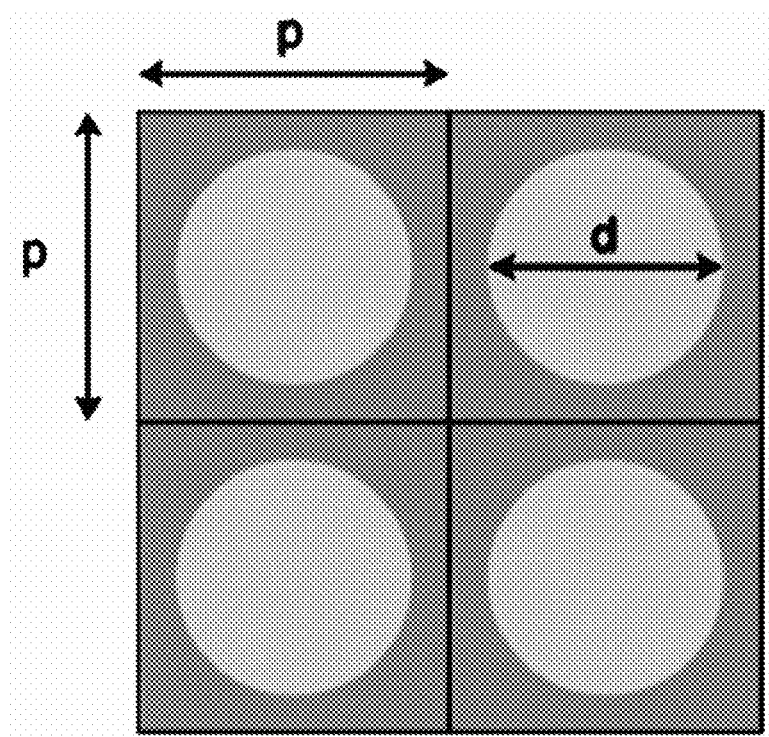

In our metasurface design process, we take the sag profile of an arbitrary freeform surface, described by its height (z) as a function of its in-plane coordinates (x, y) as in FIG. 10A, and convert it into a discrete phase profile. We then quantize the phase profile into six linear steps from 0 to 2π corresponding to cylindrical posts with diameters d ranging from 192 nm to 420 nm using the corresponding values shown in FIG. 10B. We choose a set of parameters for posts with thickness t=λ, in this case 633 nm, arranged on a square lattice with periodicity p=0.7λ, or 443 nm, (FIGS. 10C, 10D). Due to the discretization of the phase profile, there is a fundamental limitation on achievable curvatures for any specific sampling periodicity based on the Nyquist-Shannon sampling theorem:

$$\Lambda_s < \frac{\pi}{|\nabla \varphi(x, y)|_{max}}, \quad (5)$$

where $\Lambda_s$ is the sampling periodicity, and $\varphi(x,y)$ is the spatial profile to be sampled. This criterion ensures an accurate sampling of an arbitrary spatial phase profile. A derivation of this limitation, and its effect on device parameters is provided in relation to FIG. 19.

Cubic phase elements have been explored for wave-front coding as part of a focus-invariant imaging system. These cubic phase elements do not cause incident light to converge into single point; instead incident rays converge along an extended length of the optical axis, allowing the point spread function (PSF) of the element to remain relatively constant for a large range of displacements along the optical axis. The images produced by such systems are often unintelligible to the human eye, but they can be digitally post-processed using knowledge of the cubic element's PSF to recreate an image with enhanced depth of focus. More detail on the deconvolution process for the image is provided in relation to FIGS. 22A-22F. We design a cubic element with the phase profile:

$$\varphi(x, y) = \mathrm{mod}\left(\frac{\alpha}{L^3}(x^3 + y^3), 2\pi\right), \quad (6)$$

where (x,y) are the device's in plane coordinates, L is the width of the design, and α is a constant determining the rate of the phase variation on the metasurface. Larger values of α lead to better depth invariance at the expense of increased noise in the image while small values compromise the depth invariance. Motivated by previous designs, we choose a value of α=14π. For our choice of parameters, the sampling periodicity p is an order of magnitude smaller than that of the limit, satisfying the criterion in (5).

The Alvarez lens is a compound optical element consisting of two cubic phase plates with one obeying the phase profile:

$$\varphi_{alv}(x, y) = \mathrm{mod}\left(\frac{2\pi}{\lambda}A\left(\frac{1}{3}x^3 + xy^2\right), 2\pi\right), \quad (7)$$

and the other obeying its inverse such that $\varphi_{alv}(x,y)+\varphi_{inv}(x,y)=0$, where (x,y) are the device's in plane coordinates, and A is a constant determining the rate of phase variation on the metasurface. If the two elements are perfectly aligned, the Alvarez lens does not focus light, which can be interpreted as there being a focal length of infinity. Laterally displacing the elements relative to each other along the x-axis allows us to focus at finite lengths. Moreover, by controlling the extent of the lateral displacement along the x-axis we can change the focal length. Larger values of A increase the range of tunable focal lengths at the expense of image quality. The range focal length with respect to displacements is given by the expression:

$$f = \frac{1}{4Ad}, \quad (8)$$

where f is the focal length, A is the same constant as in the phase profile and 2d is the relative displacement of the two surfaces meaning the Alvarez lens is displaced by a distance d and the inverse lens is displaced by −d from the origin. A derivation of the focal length expression is provided in relation to FIG. 16. We emphasize that, unlike changing periodicity by stretching a metasurface lens, this method can provide a much larger change in the focal length. Our choice of parameters for the Alvarez lens is also within the limit of the criterion (5).

We fabricated a cubic metasurface with α=14π and L=150 µm, and a set of square Alvarez metasurfaces with A=1.17× $10^7$ m$^{-2}$, and length 150 µm. The devices are fabricated in 633 nm silicon nitride deposited on top of a 500 µm fused quartz substrate. Scanning electron micrographs (SEMs) of the finished devices coated in gold are shown in FIGS. 11A and 11B.

The cubic metasurface is characterized using a microscope free to translate along the optical axis. The device is mounted on a glass slide with the metasurface facing the microscope. Coherent illumination is provided using a red and a green laser sent through a pinhole. Note that the phase plates are designed to function with incoherent illumination, but the power of our LEDs was not high enough to determine the PSF. Intensity profiles were captured using the microscope and a CCD camera mounted on a translation stage. By translating the microscope and camera along the optical axis, we can image the x-y plane intensity profiles at varying z distances. To measure the PSF, a 5 µm diameter fixed pinhole was aligned with both lasers as an approximation of a point source. We use the microscope to image the PSF for varying displacements along the optical axis in order to characterize its afocal behavior. The measured PSFs are shown in FIGS. 12A-12D with respect to the z displacement. We see that indeed, the PSF of the element changes minimally with displacements along the optical axis of over 300 µm, confirming the depth-invariant behavior of the cubic phase plate. The slight discrepancy in the PSF is primarily due to experimental noise. Hence, in addition to the measurement of the PSF, we also calculated and compared the modulation transfer function (MTF), shown in relation to FIGS. 22A-22F. The calculated MTFs are very similar and for comparison, we also measured the PSF of a metasurface lens (quadratic phase profile) with a focal length of 500 µm shown in FIG. 12C, 12D. It is clear that the PSF of the lens is highly dependent upon displacements along the optical axis, changing substantially over a range of 100 µm, unlike that of the cubic phase plate. While the cubic metasurface exhibited a large range of displacements for which the PSFs were similar for the two illumination wavelengths (red and green), the metasurface lenses exhibit significant chromatic aberrations. With the understanding that an image is the convolution of an object with the imaging system's impulse response or PSF, this effect could be exploited for performing white light imaging. If the PSF is identical for a range of wavelengths, deconvolution of the image can be performed with a single digital filter obtained from the imaging system's PSF. For highly chromatic optical elements, this is not possible as shown in FIGS. 12C and 12D, but we can utilize the cubic element's increased depth of focus to find a point where the PSF is the same for a range of wavelengths. This may truly enable broadband operation, unlike previously reported results, where the lens only works for certain discrete wavelengths.

To characterize the Alvarez lens, we mount each metasurface on its own glass slide with the metasurfaces facing each other to minimize the axial separation between them. Simulation and experimental data on the axial separation between the plates is presented in relation to FIGS. 21A-21D. The metasurface close to the objective is mounted on a thinner glass slide in order to allow us to image short focal lengths, and then placed on a fine translation stage with steps as fine as 0.5 µm for displacements along the x direction. Illustrations of the behavior of the Alvarez phase profile for displacements along the x axis are shown in FIGS. 13A-13I. For small displacements, the resulting phase profile is slowly spatially varying, corresponding to a lens with a large focal length, while large displacements correspond to a highly varying phase profile, or a short focal length lens. The theoretical performance of the lens based on the previous formula for our design parameters is shown in the graph of FIG. 13J.

We have experimentally measured the focal lengths for displacements d of each metasurface from 2 to 50 µm and find the focal distances change from a minimum of 0.5 mm to a maximum of 3 mm as seen in FIG. 11A. This indicates that with a physical displacement of 100 µm, the focal length changes by 2.5 mm. While the experimentally measured change in the focal length is significantly smaller than the simple theoretical predictions in FIG. 13J, this change is still the largest among all the demonstrated changes in focal length by mechanically actuated metasurface-based tunable optical elements. In addition, we emphasize that the lens achieves most of its focal tuning range at a small range of physical displacement, in that we can tune the focal length by 2 mm using only around 30 µm of physical displacement. We performed a simple fit of the form:

$$f(d) = \frac{1}{4A(d+B)}, \qquad (9)$$

to generate the fit line shown in FIG. 11A. The best fitting parameters are $A=7.97 \times 10^6$ m$^{-2}$, similar to our design value of $1.17 \times 10^7$ m$^{-2}$ and $B=7.6$ µm, which indicates the extent of misalignment. We believe the major sources of the discrepancy between the measurement and the theoretical prediction are this small degree of misalignment (of order B) and also the discretized phase profile of the metasurface, in contrast to the continuous profile assumed in the theory. The effect of discretized phase is verified via FDTD simulations of a metasurface-based Alvarez lens presented below with regard to FIGS. 15A-15C. Previous focus-tunable metasurface lenses were based on stretchable substrates, which have a focal length dependence $f \propto (1+\in)^2$ in the paraxial limit where $\in$ is the stretching factor, corresponding to a change $\Delta f = (2\in+\in^2)f$. This change is linear to first order in $\in$ with the quadratic term dominating for greater than unity stretch factors, whereas the change in focal length of the Alvarez lens behaves nonlinearly as shown in the equation (3) (details provided in relation to FIG. 16), with the largest changes in focal length occurring for the smallest physical displacements. Another important quantity to assess the quality of a lens is the spot size, which we measure by calculating the full width at half maximum (FWHM) of a Gaussian fit to a 1D slice of the intensity data. The FWHM shows a similar dependence on lateral displacement as the focal length. The largest focal length of ~3 mm displays the largest FWHM of ~20 µm, while the smallest focal length of ~0.5 mm has a FWHM of ~5 µm (FIG. 11A). We find that our measured FWHM is near diffraction-limited using the methodology in ref 22 (FIG. 11B). In addition, we characterize the behavior of the lens as it moves into and out of the focal plane as shown in FIG. 11C, D. The FWHM of the lens is measured using a horizontal (x) and vertical (y) 1D cross-sections for FIG. 11C, D, respectively. Mirroring the results from our numerical simulations, illustrated in FIGS. 15A-15C and 18A-18C, the beam spot is wider along the x- than along the y-axis.

We have fabricated and demonstrated the performance of a metasurface-based cubic phase element and Alvarez lens in silicon nitride. To the best of our knowledge, these are the first metasurface-based optical elements designed using the principles of freeform optics. We believe this metasurface platform is near ideal for both adapting existing freeform optical elements, and also realizing new classes of arbitrary spatial phase profiles provided the Nyquist-Shannon sampling criterion is satisfied. This platform also has the unprecedented ability for the integration of freeform optical elements at the micron scale leading to ultra-miniature optical systems. For example, throughout tunable optical designs, we find that a mechanical change of x nm results in a change in focal length or in resonance wavelength of the order O(x) nm. In the case of the Alvarez lens no such limitations exist, and we demonstrated greater than 2 mm focal length tuning, with only tens of microns of physical displacement. Such a small displacement is beneficial, especially if the displacement is realized using integrated MEMS devices. Similarly, by using a non-quadratic phase profile, we can realize white light imaging in diffractive optics. In particular, our results indicate a depth-invariant point spread function for red and green lasers for the cubic phase-mask, resulting in the same PSF for both colors at the image plane. The reported metasurfaces involving cubic phase profiles represent a first step towards the promising new field of metasurface-enabled freeform optics, which will find applications in correcting aberrations, building compact optical systems or sensors, such as realizing near-eye displays or ultra-compact endoscopes. Additionally, by adapting existing semiconductor technologies, such as nano-imprint lithography, these devices can easily be fabricated in a scalable manner.

Methods:

Simulation and Design:

To arrive at the parameters shown in FIG. 1B, we calculate the scattering properties of different pillar configurations using rigorous coupled-wave analysis (RCWA) in order to obtain 0 to $2\pi$ phase shifts while maintaining near unity amplitude transmission coefficients. The calculation was done for wavelength $\lambda=633$ nm for silicon nitride pillars with index of refraction n=2, thickness t=$\lambda$, periodicity p=0.7$\lambda$, and diameter d varying from 0 to the period p (duty cycle varying from 0 to 1). The simulation was performed assuming a substrate of fused silica (n=1.5).

The Alvarez phase-plate obeys a sag profile:

$$z(x, y) = A\left(\frac{1}{3}x^3 + xy^2\right), \quad (10)$$

which is converted into a phase profile for operation at $\lambda=633$ nm by the multiplication of the corresponding free space wave vector, giving us equation (2). The resulting phase profile is discretized in x-y plane on a square grid of periodicity p=0.7$\lambda$ and then quantized in six linear steps between 0 and $2\pi$ using the geometric parameters shown in FIG. 1B. In order to test the compatibility of the Alvarez lens with adaptation to a metasurface, we performed finite-difference time-domain (FDTD) simulations with a design of A=$6.67 \times 10^9$ m$^{-2}$. The focal length and FWHM behavior is shown below with regard to FIGS. 15A-15C. We observed focusing between 8 µm and 40 µm for this lens. The actual lens design presented in this manuscript was not tested using FDTD simulations due to computational resource restrictions.

Sample Fabrication:

Both the devices shown in FIGS. 11A and 11B were fabricated in a 633 nm thick silicon nitride (SiNx) deposited on a 0.5 mm fused quartz substrate. We used plasma-enhanced chemical vapor deposition (PECVD) techniques to deposit the silicon nitride at a temperature of 350° C. Following PECVD, we evaporated 30 nm of aluminum to serve both as a charge-dissipation layer for electron beam lithography (EBL) and also as a hard mask. Electron beam resist (140 nm, ZEP 520A 1:1) was then spin-coated on top of the wafer. We wrote the pattern using a JEOL JBX-6300FS 100 kV EBL system. After development in amyl acetate, the sample was dry-etched using a Cl$_2$ and BCl$_3$ chemistry to transfer the pattern on the aluminum layer, forming a hard mask. Finally, a CHF$_3$ and O$_2$ chemistry was used to dry-etch 633 nm pillars, and the remaining aluminum was removed using AD-10 photoresist developer. For capturing the scanning electron micrographs in FIGS. 11A and 11B, the samples were coated in gold as a charging layer as both silicon nitride and the fused quartz substrate are insulators.

Figure 16:
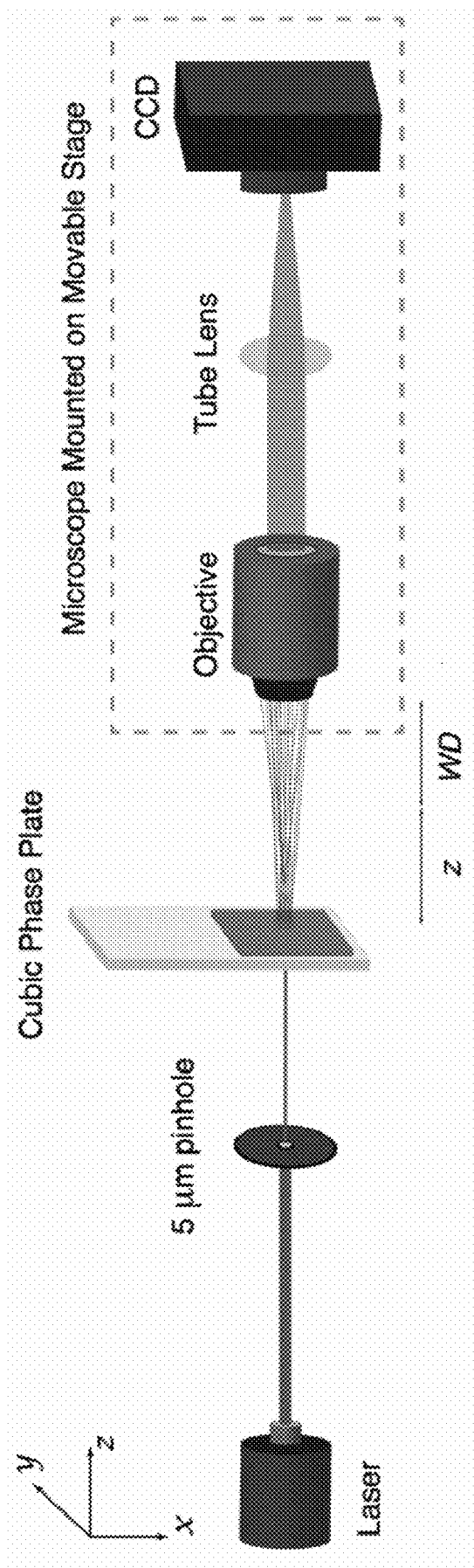
FIG. 16: Point spread function measurement setup: Schematic of the setup used to measure the point spread functions of the cubic metasurface phase plate and the metasurface lens. Illumination is provided either by a helium-neon laser for red or a 532 nm laser for green, and is passed through a 5 µm pinhole to approximate a point source. The microscope is free to move along the z axis.

Measurement Procedure:

The cubic phase plate measurements were performed on a setup shown in supplementary FIG. 16. Light from a helium-neon laser was coupled to a fiber for the red measurements, and light from a 532 nm laser was used for green measurements. The light was sent through a 5 µm fixed pinhole (Thorlabs P5S) before illuminating the sample mounted on a standard 1 mm glass microscope slide with the metasurface facing the microscope. The cubic PSFs were measured using 4 mW of power incident on the pinhole, and the lenses' PSFs were measured using 1.5 mW of incident power. A home-built microscope comprising of a 40× objective (Nikon Plan Fluor) with a working distance of 0.66 mm and NA 0.75 and a tube lens (Thorlabs ITL200) with a focal length of 20 cm is used to measure the field profiles. This microscope images the intensity profile generated by the cubic phase plate onto a Point Grey Chameleon CCD. The magnification of the setup was determined using known dimensions of the fabricated metasurface. By translating the microscope along the optical axis (z) we were able to image the intensity profile in steps of 25.4 µm to capture the images shown in FIGS. 11A and 11B.

The performance of the Alvarez lens was measured using a setup shown in supplementary FIG. 17. Red light is obtained from a fiber-coupled light-emitting diode (Thorlabs M625F1) and directed towards the sample. The Alvarez lens consists of the Alvarez phase plate and the inverse phase plate, and the two samples are mounted with the devices facing each other. The Alvarez phase plate is mounted on a standard 1 mm glass slide while the inverse phase plate is mounted on a thin glass coverslip with a thickness between 0.16 to 0.19 mm (Fisherbrand 12-544-E). The Alvarez phase plate is placed on the illumination side while the inverse phase plate is placed on the microscope side. Finally, the Alvarez phase plates were mounted on an x-z translation stage enabling control over the displacement between the twophase plates in the x and z directions. The x direction can move in increments as fine as 0.5 µm.

Figure 14A:
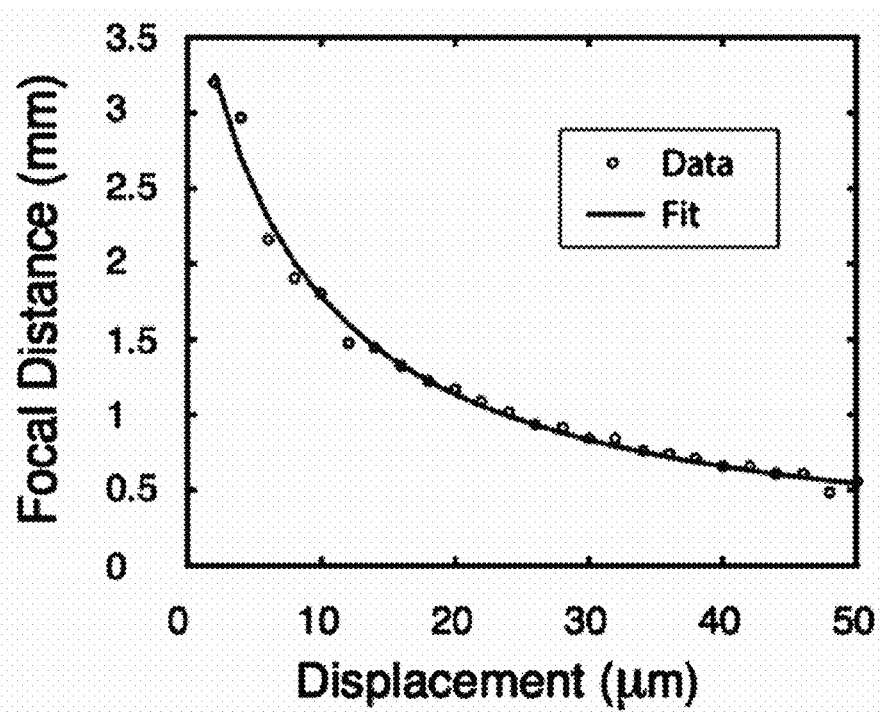
FIGS. 14A-14D: Alvarez lens performance. (A) Measured focal distance of the Alvarez lens pair plotted against x displacement. The red line is a theoretical fit to the focal length data. (B) Full width at half maximum (FWHM) measured along the x axis plotted against x displacement. The measured data are shown as points while the line is an eye guide. The diffraction-limited spot size FWHM is plotted in red. Error bars represent a 95% confidence interval of a Gaussian fit. For both (A) and (B) images were taken with a displacement step size of 2 µm. (C), (D) Behavior of the Alvarez lens FWHM for five displacements along x-axis. The FWHM of the spot-size in the sensor plane is plotted as the microscope moves into and out of the focal plane. The FWHMs are measured along the (C) x and (D) y axes. FWHM data is plotted as the points, and the lines are eye guides.
Figure 14B:
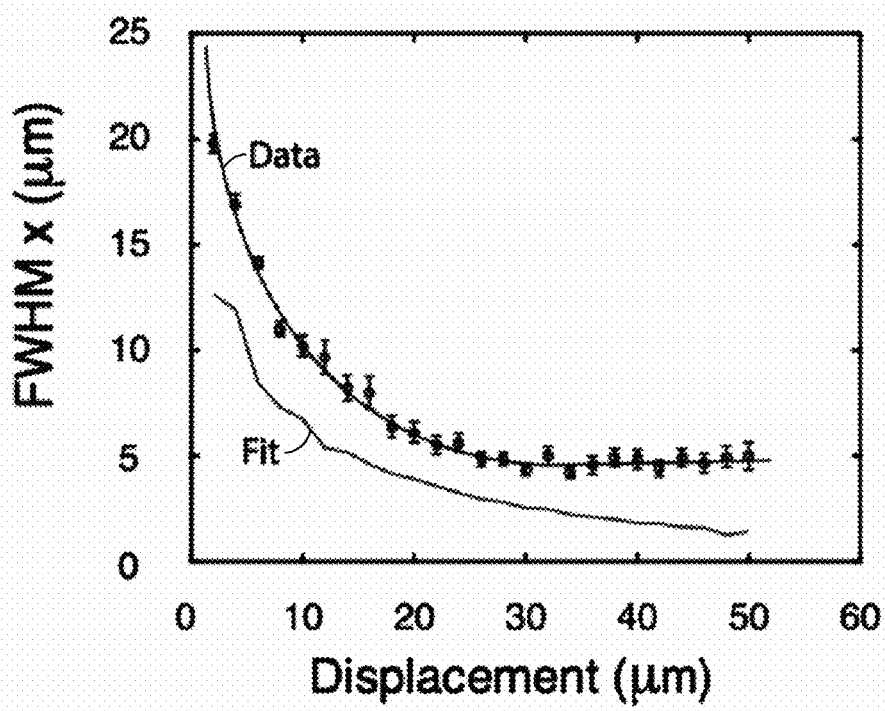
Figure 14C:
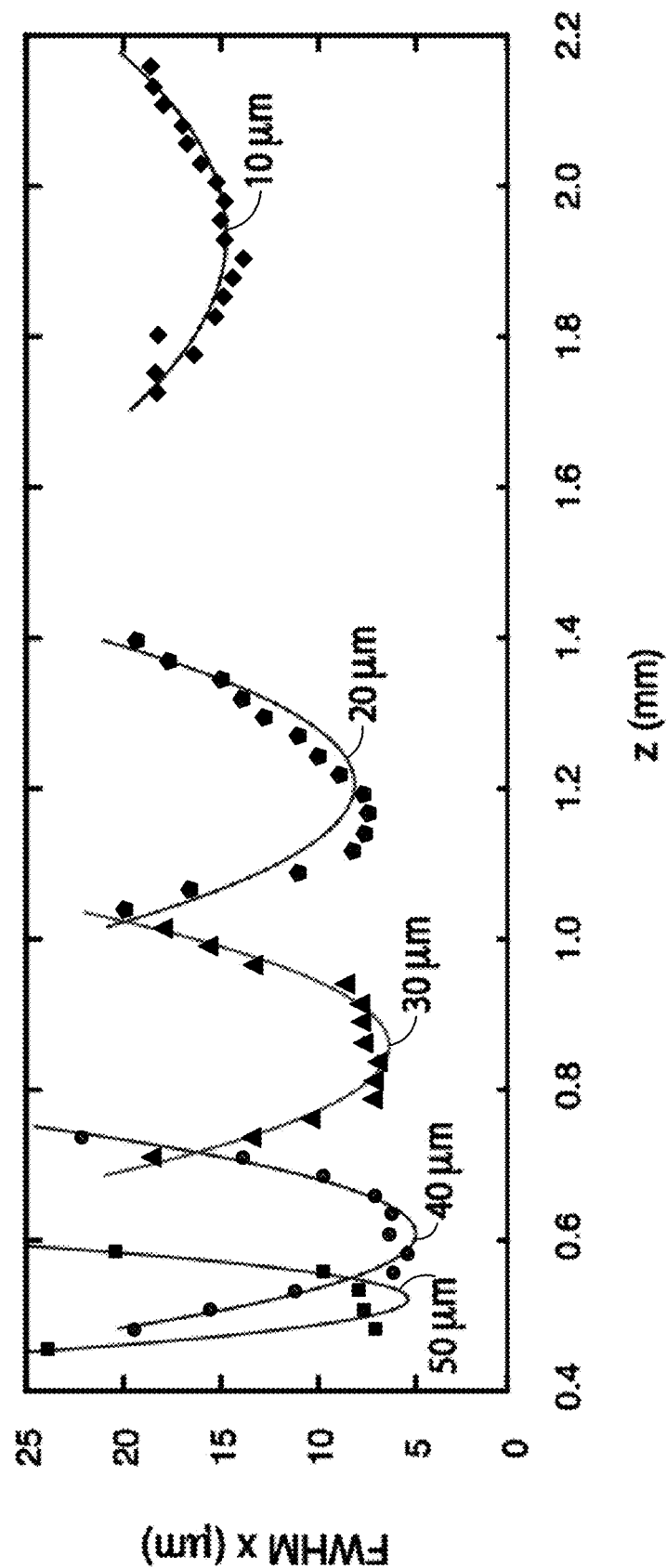
Figure 14D:
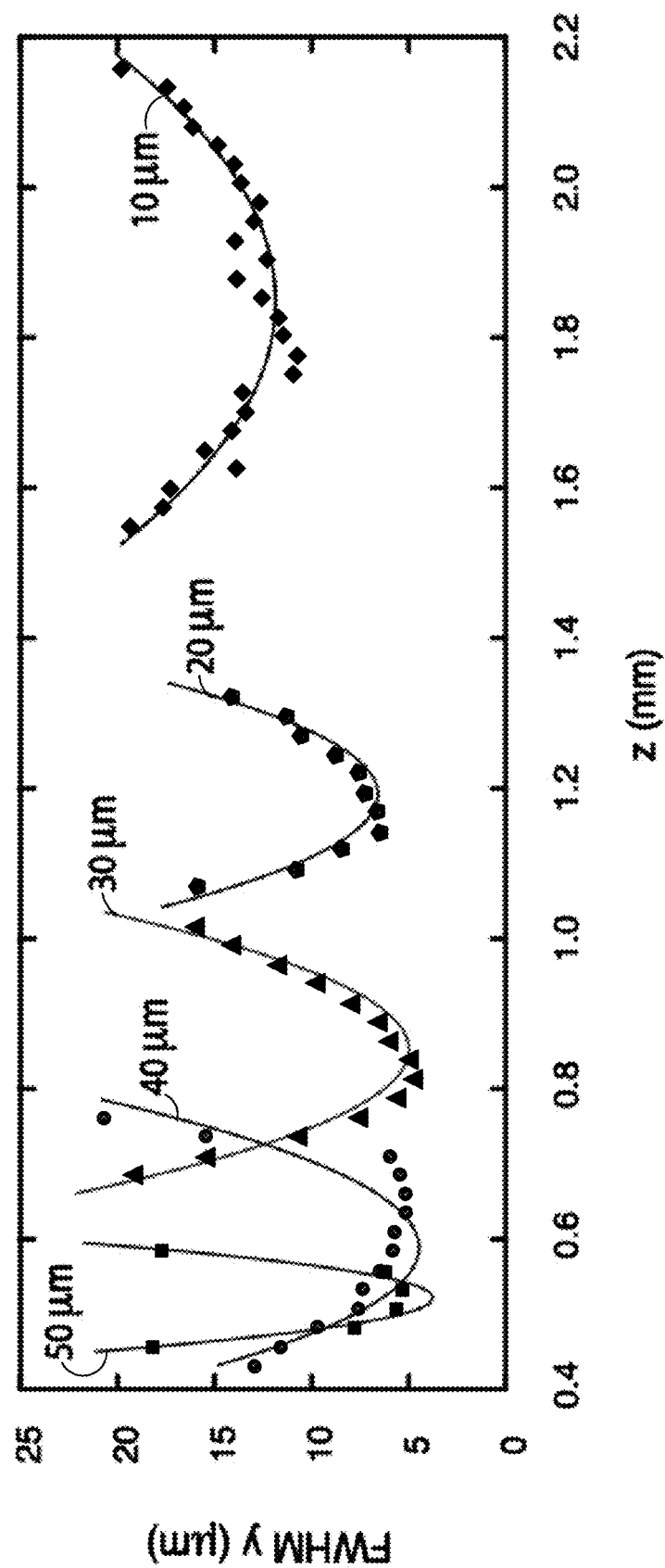

The focal distance of the Alvarez lens is measured for displacements of 2 µm to 50 µm in steps of 2 µm. For each displacement, the microscope is translated along the z axis, imaging intensity profiles in steps of 25.4 µm. Due to the sensitivity of the focal length to small misalignments, all data was taken consecutively from one displacement to the next with one alignment at the beginning of the measurement. Measurements for five displacement values showing the microscope moving into and out of the focal plane are shown in FIG. 14C, 14D. The alignment of the two metasurfaces is done one at a time by first imaging the first metasurface on the CCD and marking a single corner with a marker. The microscope is then translated backwards along the optical axis to allow us to bring the second metasurface into focus and translate its corner to the same marker. Finally, the two metasurfaces are translated along the optical axis to minimize their separation by eye. In order to minimize the separation between the two elements, both Alvarez lenses were mounted on stages free to move along the optical axis. The distance between the two was determined using the microscope by focusing on each element separately and recording their positions. The two elements were then brought together to their final separation of less than 0.3 mm. We did not bring the elements closer because of the possibility of scratching the elements.

Figures 18A, 18B, 18C:
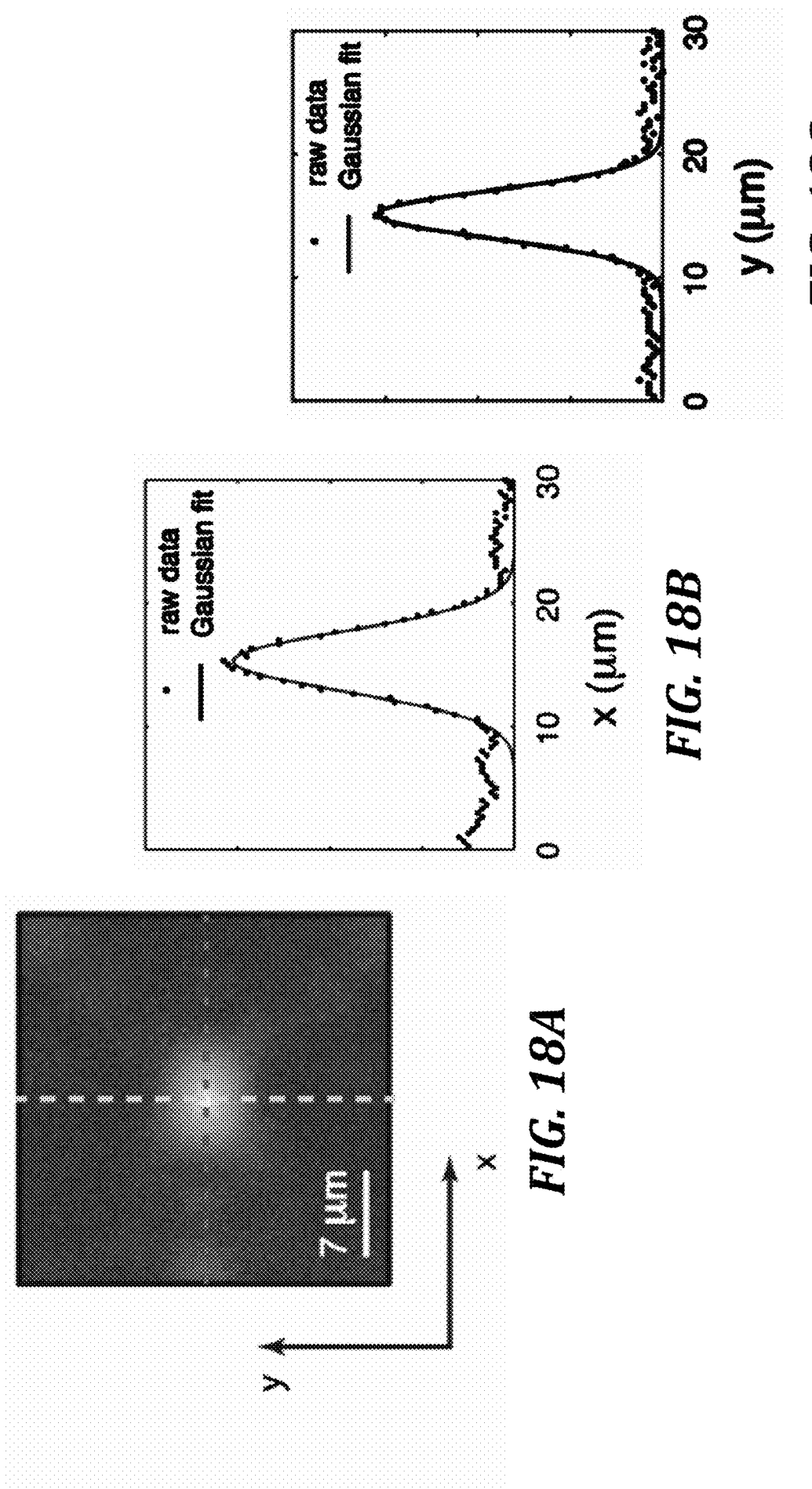
FIGS. 18A-18C: Characterizing full width half maximum: (A) an example of an experimental focal spot for an Alvarez lens with 30 µm lateral displacement. A Gaussian fit is used along the x (B) and y (C) axes to estimate the focal spot size.
Figures 19A, 19B:
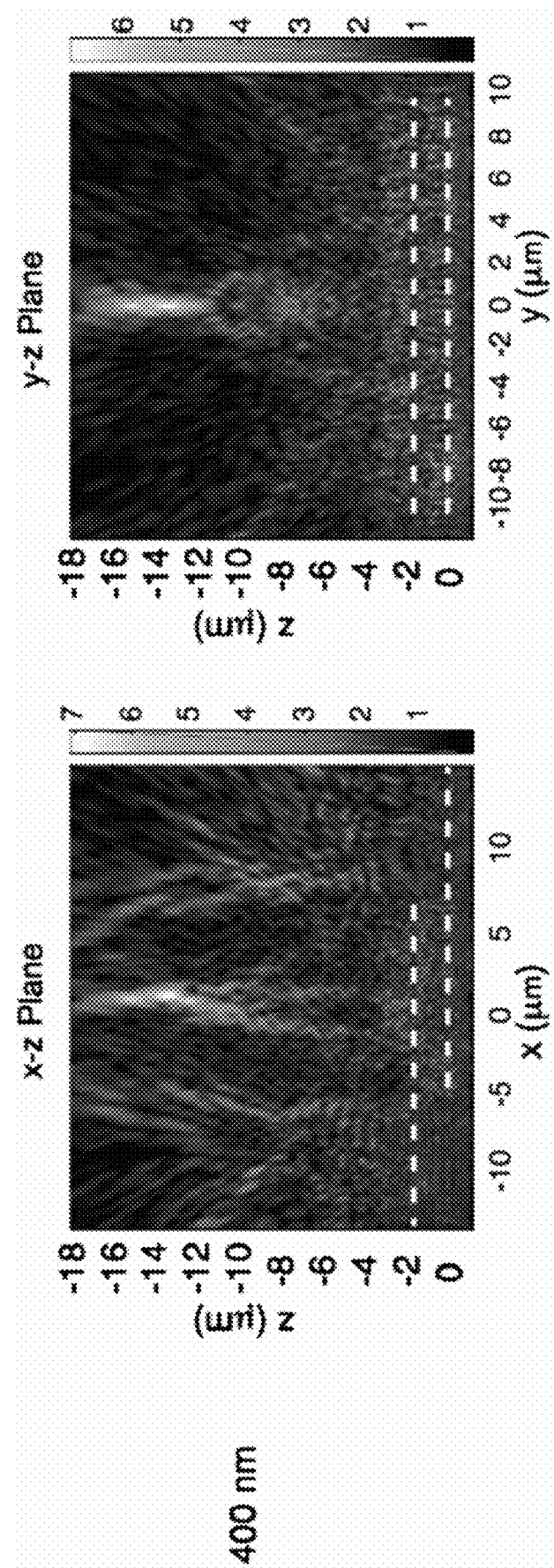
FIGS. 19A-19N: Chromatic behavior of the Alvarez lens. The electric field intensity profiles in the x-z and y-z planes are plotted, centered at the optical axis for illumination wavelengths covering the visible spectrum in steps of 50 nm. The lens begins to form a distinct focal spot for 550 nm in both the x-z and y-z planes. The white dashed lines indicate the locations of the two metasurfaces comprising the Alvarez lens.
Figures 19C, 19D:
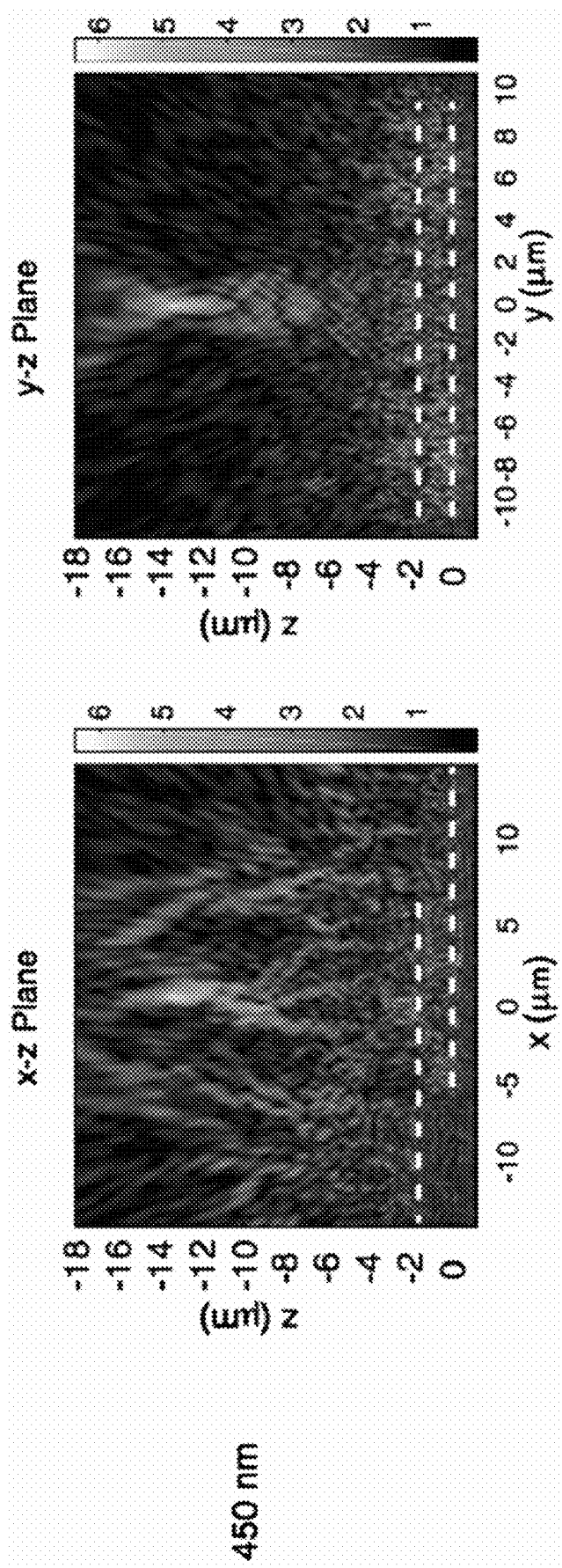
Figures 19E, 19F:
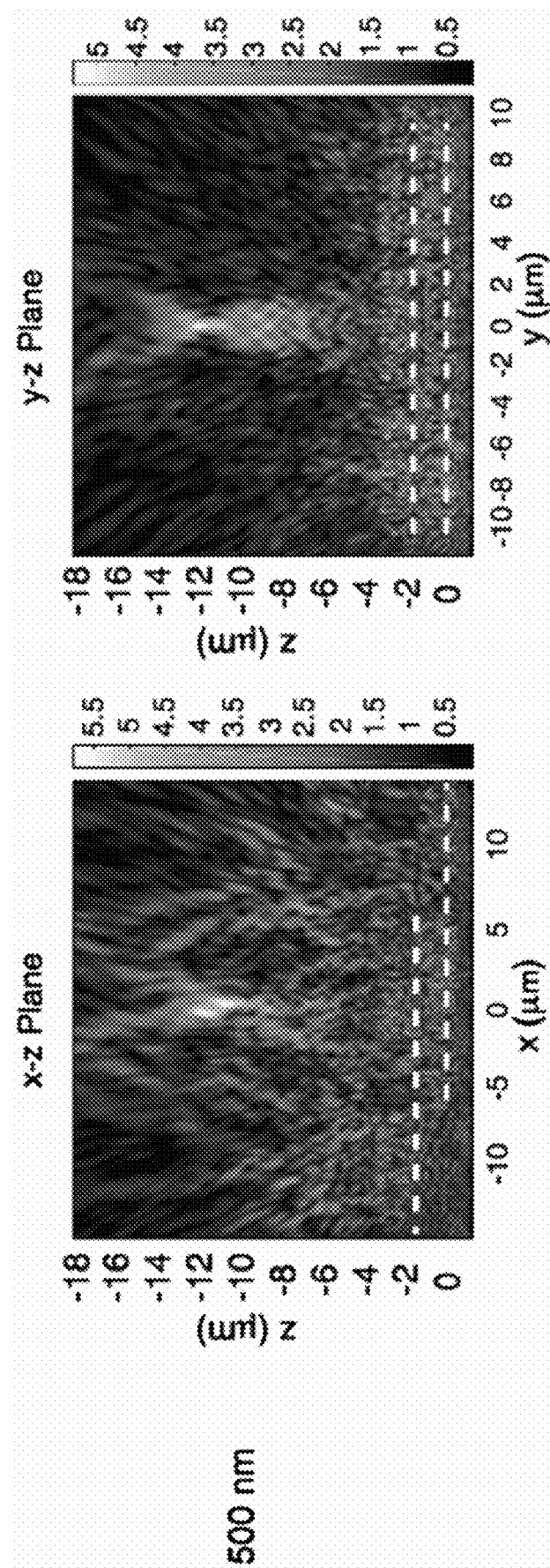
Figures 19G, 19H:
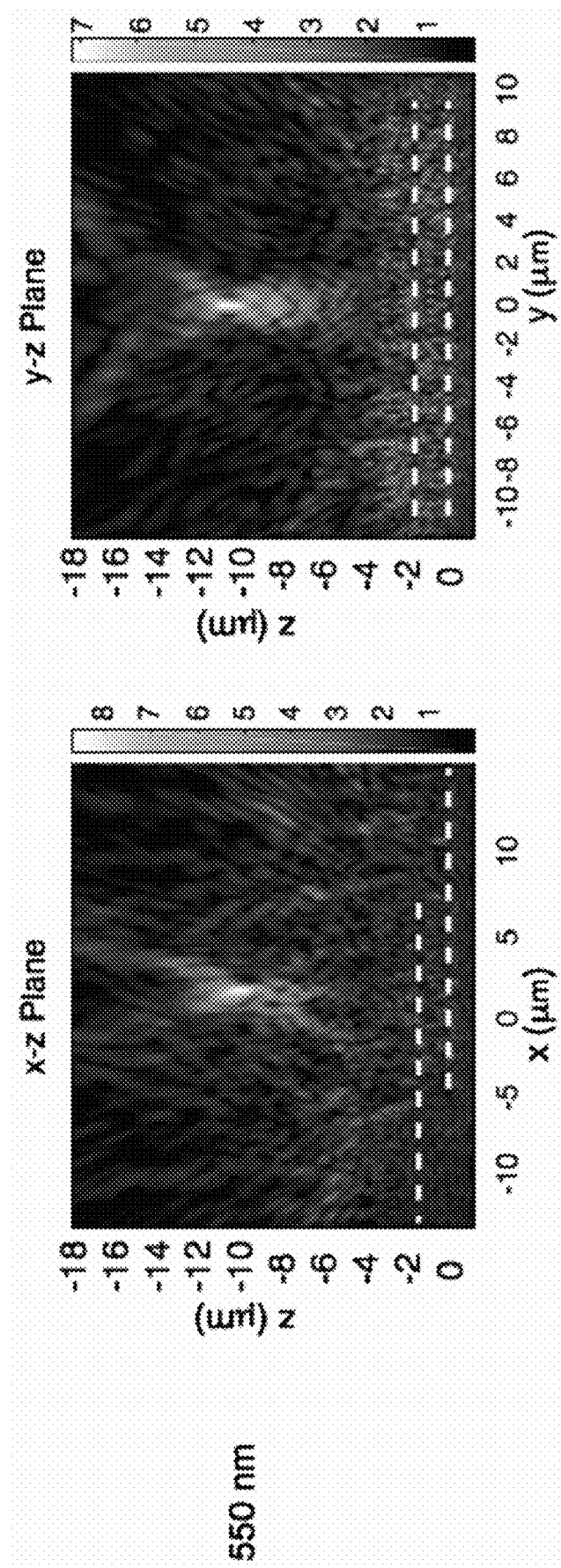
Figures 19I, 19J:
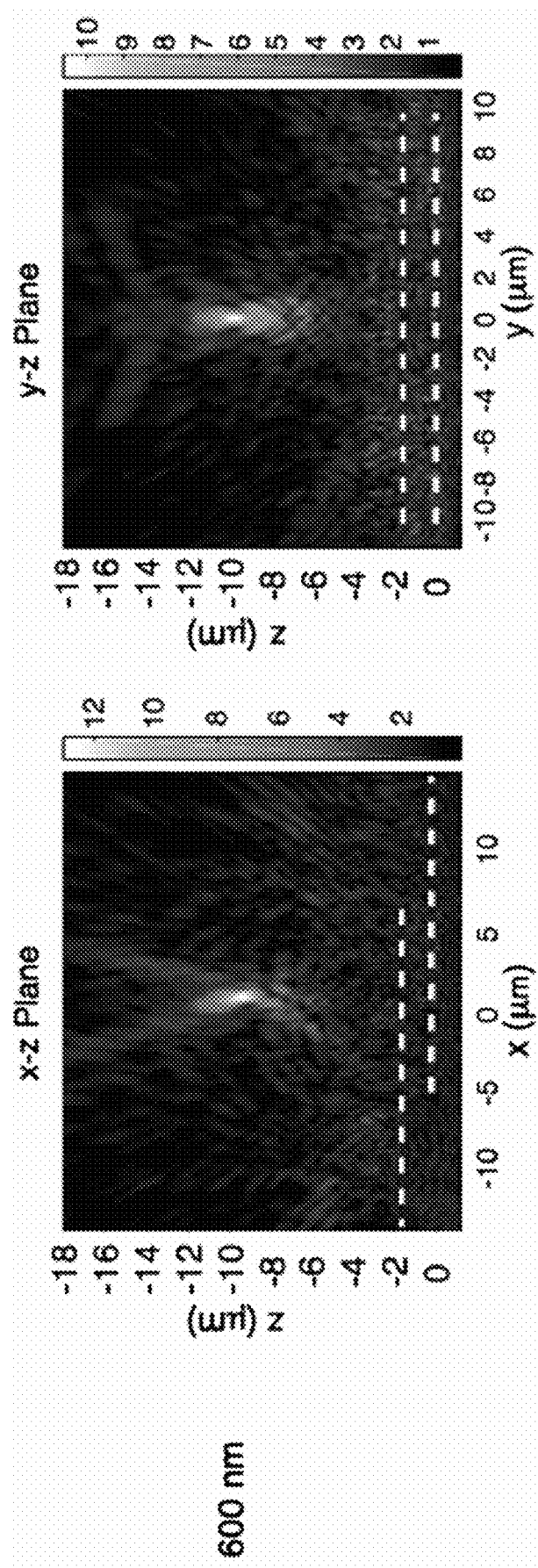
Figures 19K, 19L:
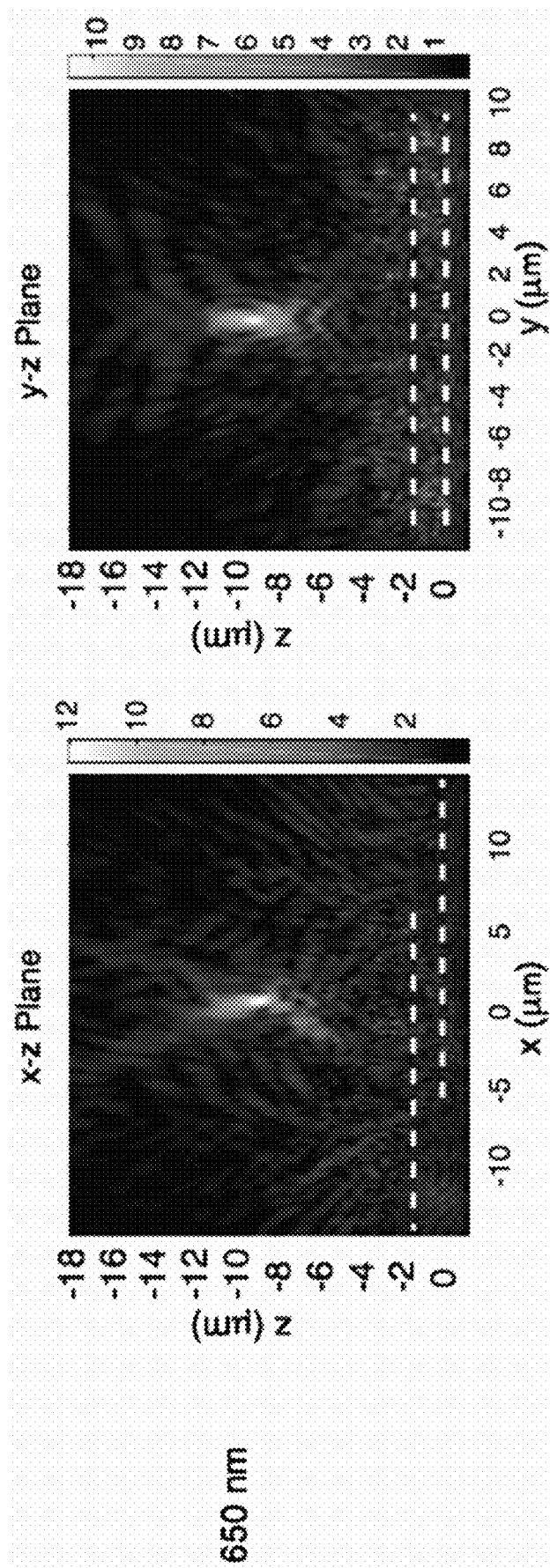
Figures 19M, 19N:
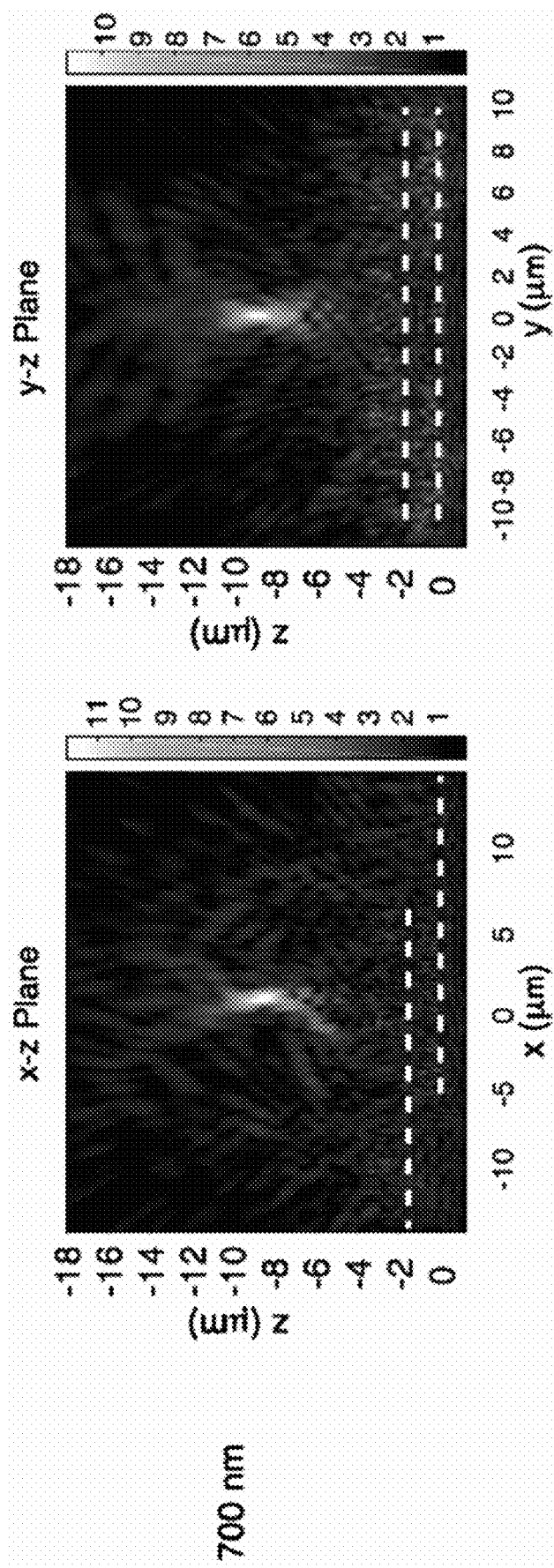

The FWHM of the focal spot for each x displacement is determined by taking the minimum FWHM from a Gaussian fit to a 1-D slice of the intensity data for each z displacement as described in in relation to FIGS. 18A-18C. The focal distance is then determined by taking the z displacement value of the minimum FWHM. The FWHM is measured for both the x and y directions. The diffraction-limited spot FWHM is obtained from a Gaussian fit to a lens with the same diameter and the measured focal length for that displacement.

Simulation Results

We performed finite-difference time-domain (FDTD) simulations of the metasurface-based Alvarez lens to understand the effect of discretization of the phase profile. We find the change in the focal length qualitatively matches the theoretical predictions assuming a continuous phase profile, but the numerically calculated focal lengths do not quantitatively match well with the theoretical equation derived for a continuous phase profile. In particular, the focal lengths deviate significantly at small displacement, as we also observed in our experiment. Additionally, we find the focal spot size is larger in the x direction than in the y direction, also in accordance with experiment. In calculating the diffraction limit for the x direction, we account for an increase in the physical lens size due to the displacement along that axis. This accounts for the differences in diffraction limits shown in FIG. 15C for the x and y directions.

Alvarez Focal Length Formula Derivation:

The central concept of the Alvarez lens is the dependence of the focal length on the lateral displacement of the two phase plates, the Alvarez phase plate obeying:

$$\varphi_{Alv}(x, y) = A\left(\frac{1}{3}x^3 + xy^2\right), \tag{11}$$

and the inverse phase plate obeying its negative:

$$\varphi_{Inv}(x, y) = -A\left(\frac{1}{3}x^3 + xy^2\right), \tag{12}$$

such that $\varphi_{Inv}(x,y)+\varphi_{Alv}(x,y)=0$ for aligned phase plates. For a displacement d along the x axis, the addition of the two surfaces produces a quadratic phase profile plus a constant phase offset:

$$\varphi_{Sum}(d) = \varphi_{Alv}(x+d, y) + \varphi_{Inv}(x-d, y) = 2Ad(x^2+y^2) + \frac{2}{3}d^3, \tag{13}$$

neglecting the constant phase offset, and setting $r^2=(x^2+y^2)$, we recognize the expression for a lens under the paraxial approximation:

$$\varphi_{Lens}(d) = 2Adr^2 = \frac{r^2}{2f}, \tag{14}$$

with focal length as a function of displacement:

$$f(d) = \frac{1}{4Ad}, \tag{15}$$

Setups

The experimental setups are shown in FIGS. 16 and 17.

Measurement and Diffraction Limit

Figure 15A:
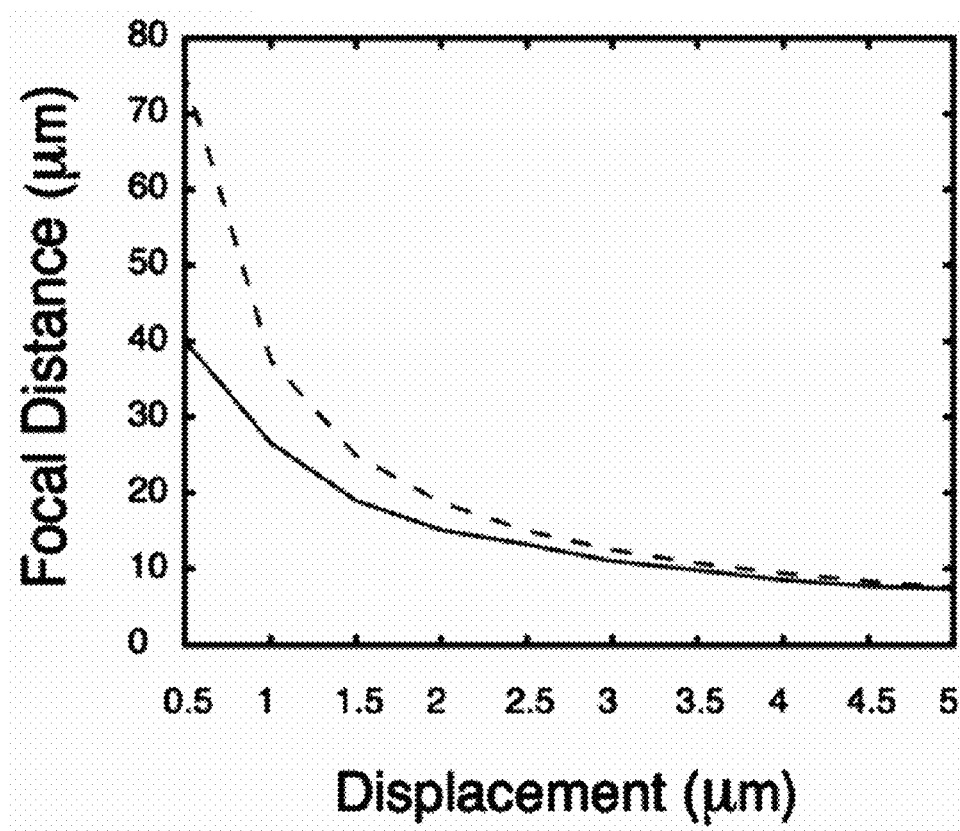
FIGS. 15A-15C: FDTD simulation results for an Alvarez lens. (A) the measured focal length plotted against lateral displacement. The simulation data is shown as the solid line, and the theoretical focal length range (assuming a continuous phase profile) is shown as the dotted line. Displacements are made in steps of 0.5 µm. (B) an example of a simulated focal spot for a 0.5 µm displacement. (C) The numerically estimated FWHM for each displacement step of µm. The x and y FWHM are plotted as points. The calculated diffraction limit corresponding to the x and y geometric parameters of that lens are shown as solid lines. Parameters for simulation are A=6.67×10$^9$ m$^{-2}$, and the phase plates are 10 µm×10 µm.
Figure 15B:
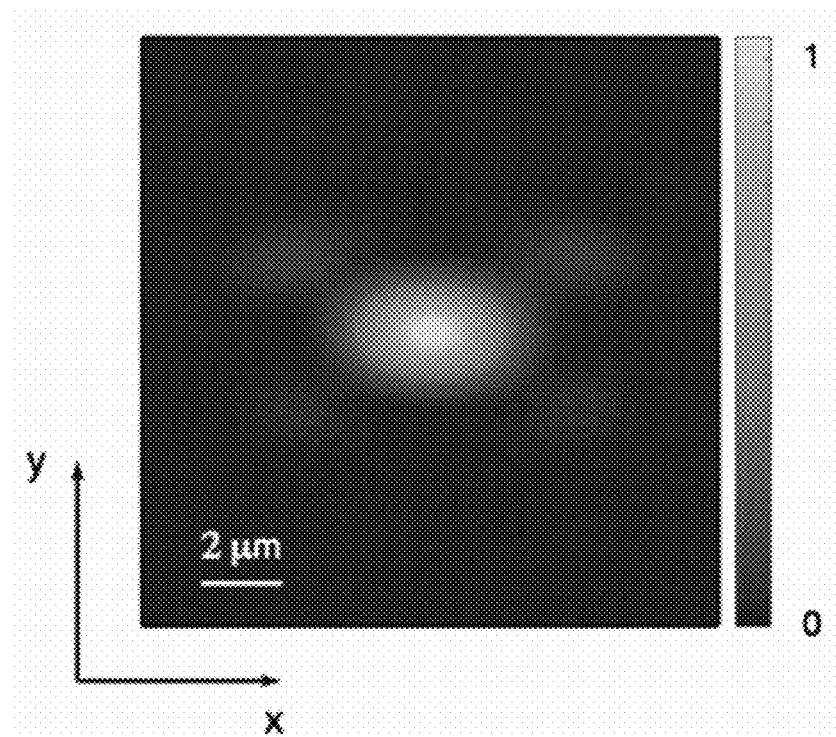
Figure 15C:
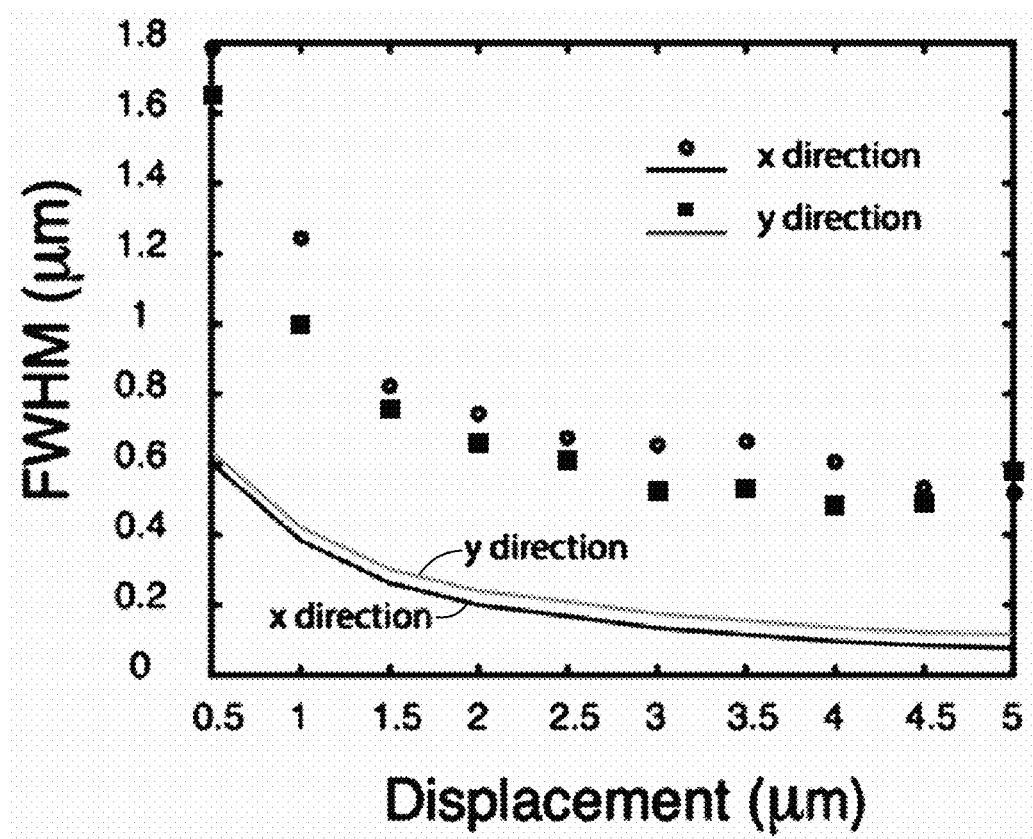

The experimentally measured focal spot from the Alvarez lens shows different FWHM along x and y direction, which is consistent with the numerical FDTD simulations (FIGS. 15A-15C). Here we present our criterion for characterizing the focusing performances of a lens based on its FWHM. An ideal lens with focal length f and radius d will have an Airy disk intensity profile given by:

$$I(\theta) = I_o\left(\frac{2J_1(kd\sin\theta)}{kd\sin\theta}\right)^2 \tag{16}$$

where $I_o$ is the central peak intensity, $J_1(x)$ is the first order Bessel function of the first kind, k is the free space wave vector of the illuminating light, d is the lens radius, and θ is the angular position. The diffraction-limited FWHM for a particular lens with geometric parameters f and d is obtained by a Gaussian fit to the Airy disk intensity profile.

Fundamental Limitations

In designing metasurface-based freeform optics, there are limitations on the kinds of phase functions that can actually be implemented. One of the fundamental limitations concerns how the continuously-defined phase function is spatially sampled by the metasurface's subwavelength lattice points. The Nyquist-Shannon sampling theorem requires that the function be bandlimited and that the sampling frequency $f_s$ be related to the maximum frequency component, as below, in order to prevent aliasing:

$$f_s = \frac{1}{\Lambda_s} > 2f_{max}, \tag{17}$$

The highest frequency component can be related to the instantaneous frequency as below:

$$f_{max} = \frac{|\nabla\varphi(x, y)|_{max}}{2\pi}, \tag{18}$$

Solving for the sampling period gives:

$$\Lambda_s < \frac{\pi}{|\nabla\varphi(x, y)|_{max}}, \tag{19}$$

Using (19) with a given metasurface periodicity which sets $\Lambda_s$, arbitrary phase functions can be tested and it can be determined whether or not it is possible to implement them. For example, in the case of freeform optics with phase functions consisting of higher order polynomials, there will be restrictions on the extent and functional form of φ(x,y). Here we analyze two specific cases of φ(x,y) to show the limitations of the metasurface optics.

For a parabolic lens with a phase profile given by (20), the spatial extent of the lens is limited to a maximum radius of $r_{max}$, and using (19) the restriction on $\Lambda_s$ is given by (21):

$$\varphi(r) = \frac{\pi r^2}{\lambda f}, \tag{20}$$

$$\Lambda_s < \frac{\lambda f}{2r_{max}}, \tag{21}$$

Using (21) and setting $D=r_{max}$, the D/f ratio can be determined to find the limitation on the NA given in (22):

$$NA < \sin\left[\arctan\left(\frac{\lambda}{2\Lambda_s}\right)\right], \tag{22}$$

For a cubic profile given by (23), the restriction on $\Lambda_s$ is given in (24) where it is assumed the maximum value for both x and y is L/2:

$$\varphi(x, y) = \frac{\alpha}{L^3}(x^3 + y^3), \quad (23)$$

$$\Lambda_s < \frac{2\sqrt{2}\,\pi L}{3\alpha}, \quad (24)$$

This shows that for a given periodicity, we cannot have arbitrarily large a, which dictates the depth of focus. This methodology is applicable to any arbitrary phase functions and can provide a baseline check for implementation feasibility for metasurface-based freeform optics.

Alvarez Chromatic Behavior

The same lens as disclosed in relation to FIGS. 15A-15C was simulated at a displacement of 4 μm for wavelengths between 400 and 700 nm in steps of 50 nm. The electric field intensities in the x-z and y-z planes centered on the optical axis are plotted in FIG. 20 for the range of simulated wavelengths. We find that the Alvarez lens fails to focus adequately at wavelengths below 550 nm, and displays expected chromatic aberrations in the wavelength range of 550 nm to 700 nm. At 400 and 450 nm, the wavelength is less than and approaching the periodicity respectively, so we do not expect the Alvarez lens to perform well in that regime. For wavelengths larger than the design, we expect the lens to perform adequately, although with the usual chromatic dispersion of diffractive optics.

Alvarez Axial Separation Behavior

We investigated the dependence of the focusing behavior of the Alvarez lens on axial separation between the two metasurfaces via both FDTD simulations and experiment. Two Alvarez plates can be understood as generating Airy beams accelerating along a parabolic path on the axis of displacement (x for our design). As the axial separation between the metasurfaces increases, the initial Airy beam generated by the first metasurface begins to diverge from the second plate, which has finite extent, causing degradation of the focal spot.

Figure 20A:
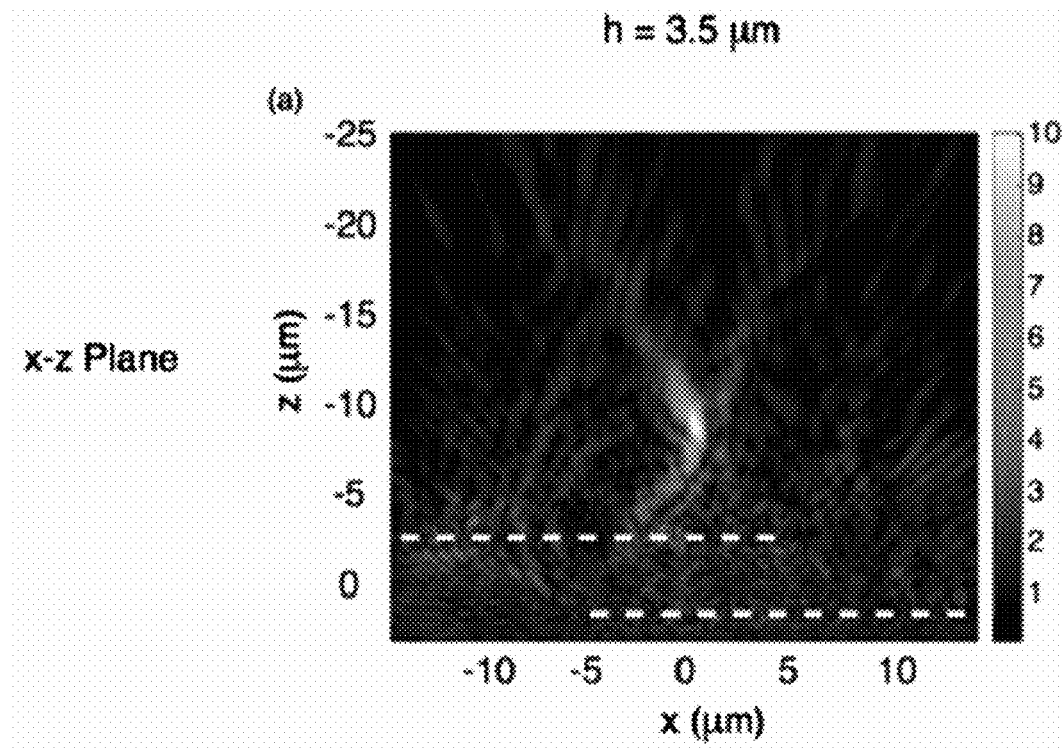
FIGS. 20A-20D: Simulated Alvarez lens performance for separations along the optical axis. The electric field intensities are plotted. As the separation increases, the x-z plane focal spot deforms, elongating, and also decreasing in intensity (a)-(d). However, the focal spot remains near −10 µm, indicating the focal length does not change significantly with the axial separations. In the y-z plane, the focal spot remains near 10 µm and retains its shape, but decreases rapidly in intensity (e)-(h). The spot near −10 µm is the actual focal length, while the bright spot at the bottom half of the image is just the outline of the first metasurface. The simulated design is the same as previously disclosed, and has an in plane displacement of 4 µm. The axial separation is represented by the variable h, and the dashed white lines represent the locations of the two metasurfaces comprising the Alvarez lens.
Figure 20B:
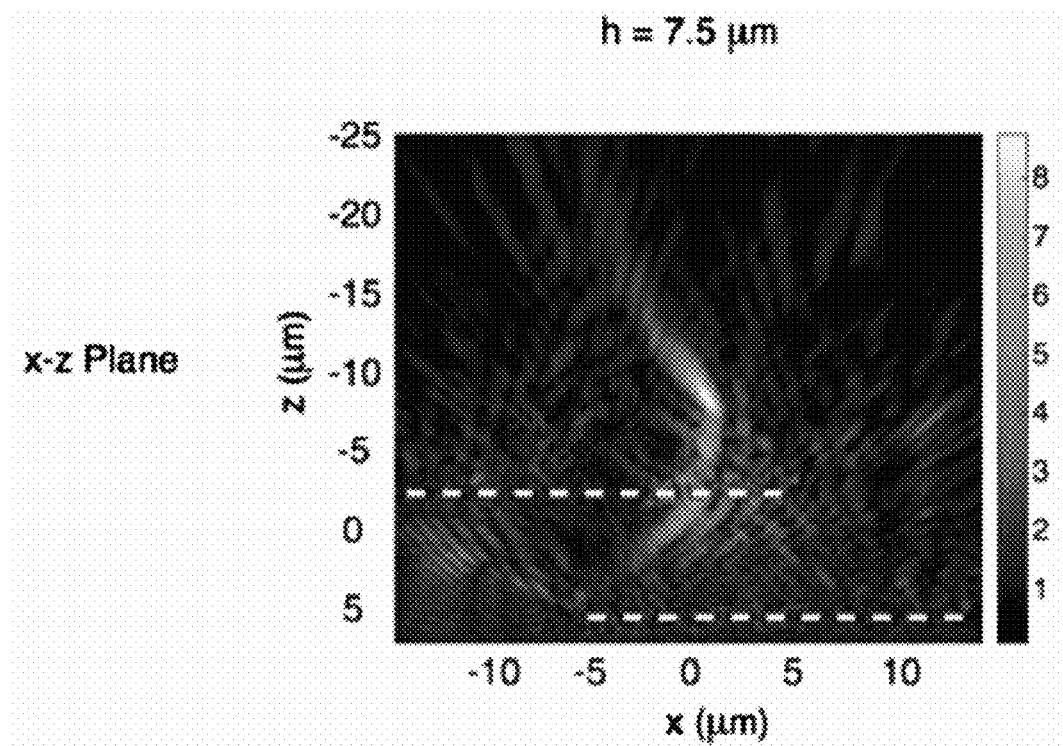
Figure 20C:
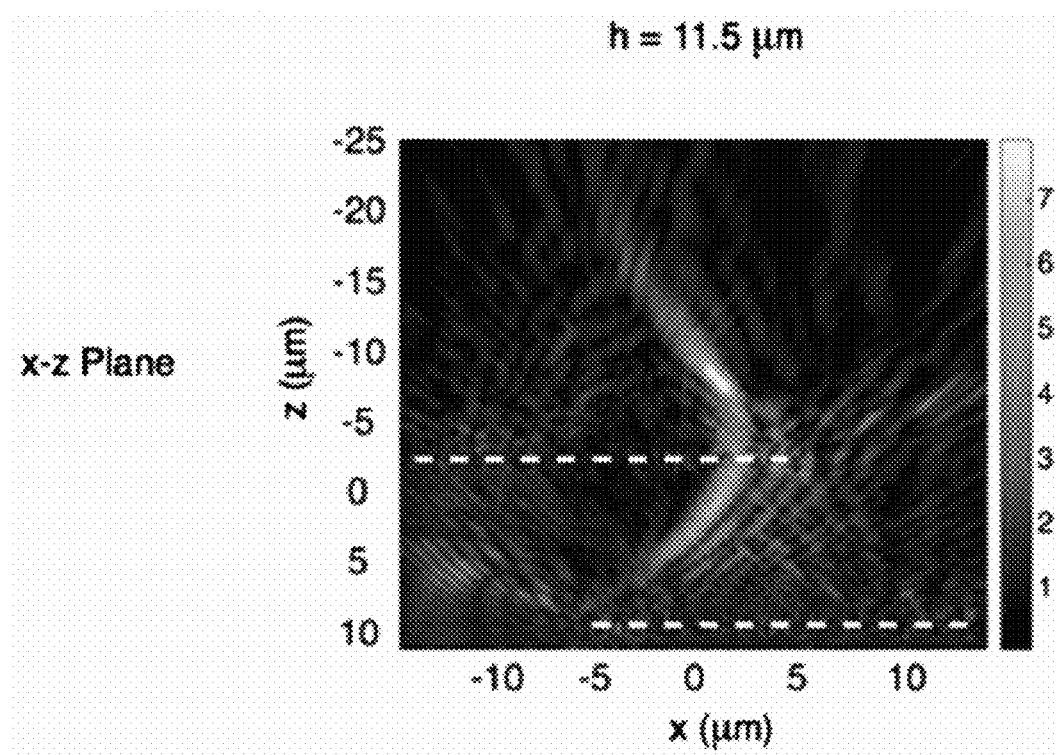
Figure 20D:
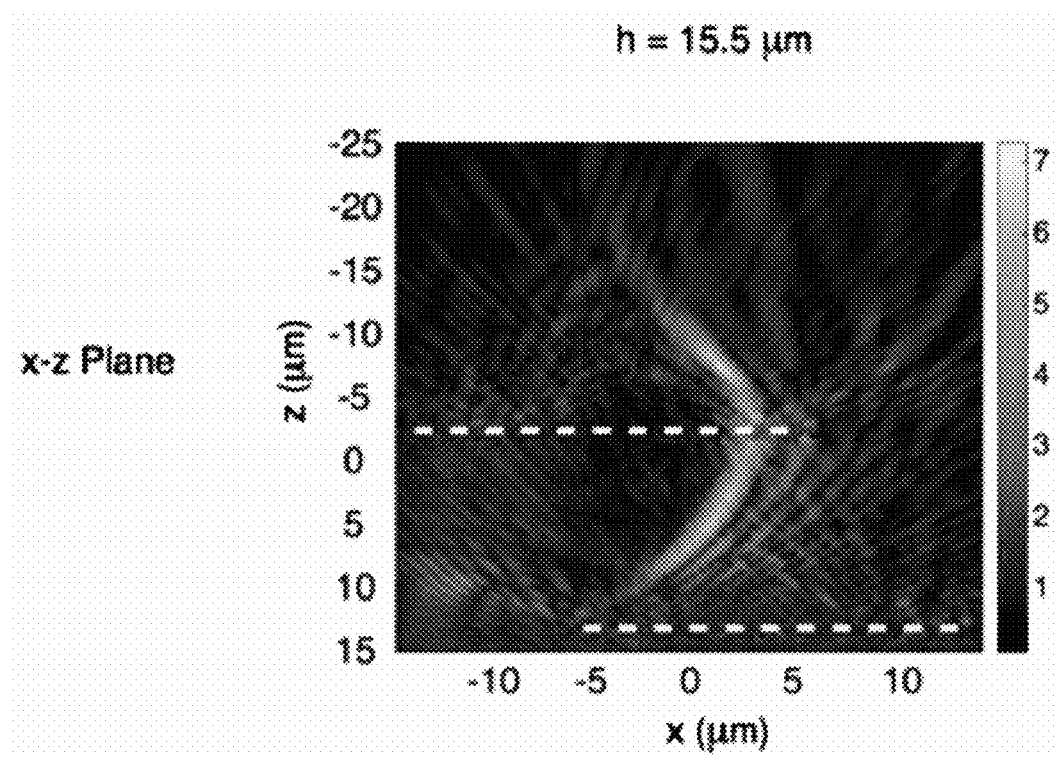
Figure 21A:
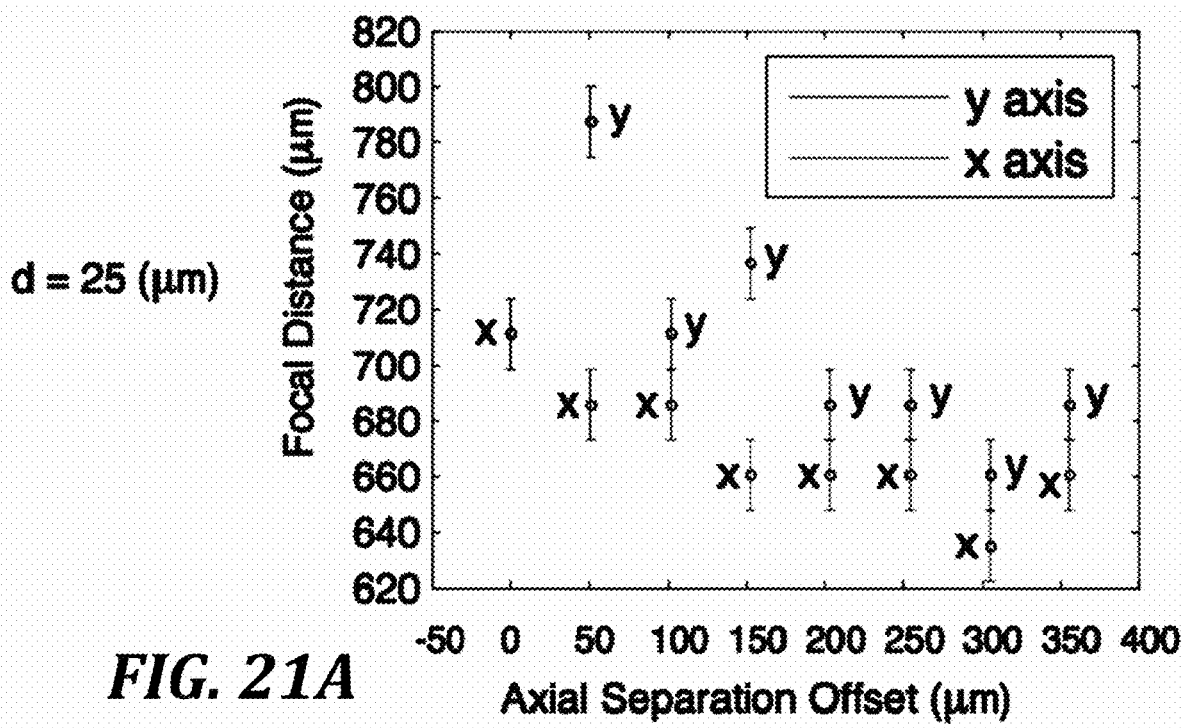
FIGS. 21A-21D: Experimental Alvarez lens performance for separations along the optical axis. (A), (C) focal distances for an Alvarez lens with 25 and 30 µm of transverse displacement d respectively. As the axial separation increases, the lenses in both cases displayed a slight decrease in focal length. The axial displacement is not absolute, and can be thought of as an offset of some finite distance, as we cannot measure the actual distance with high accuracy. (B), (D) show the effect of the axial separation on the focal length of the Alvarez lens for 25 and 30 µm of transverse displacement respectively. Data taken from the y and x axes are presented. Error bars represent the mechanical error associated with our translation stage.
Figure 21B:
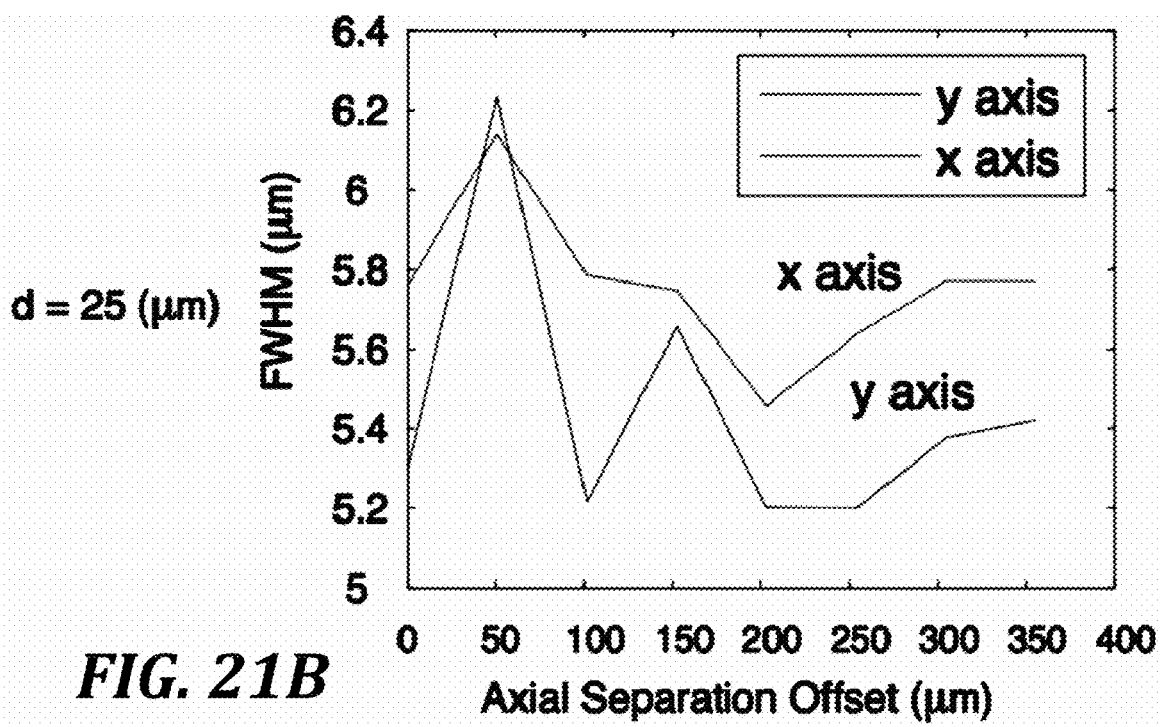
Figure 21C:
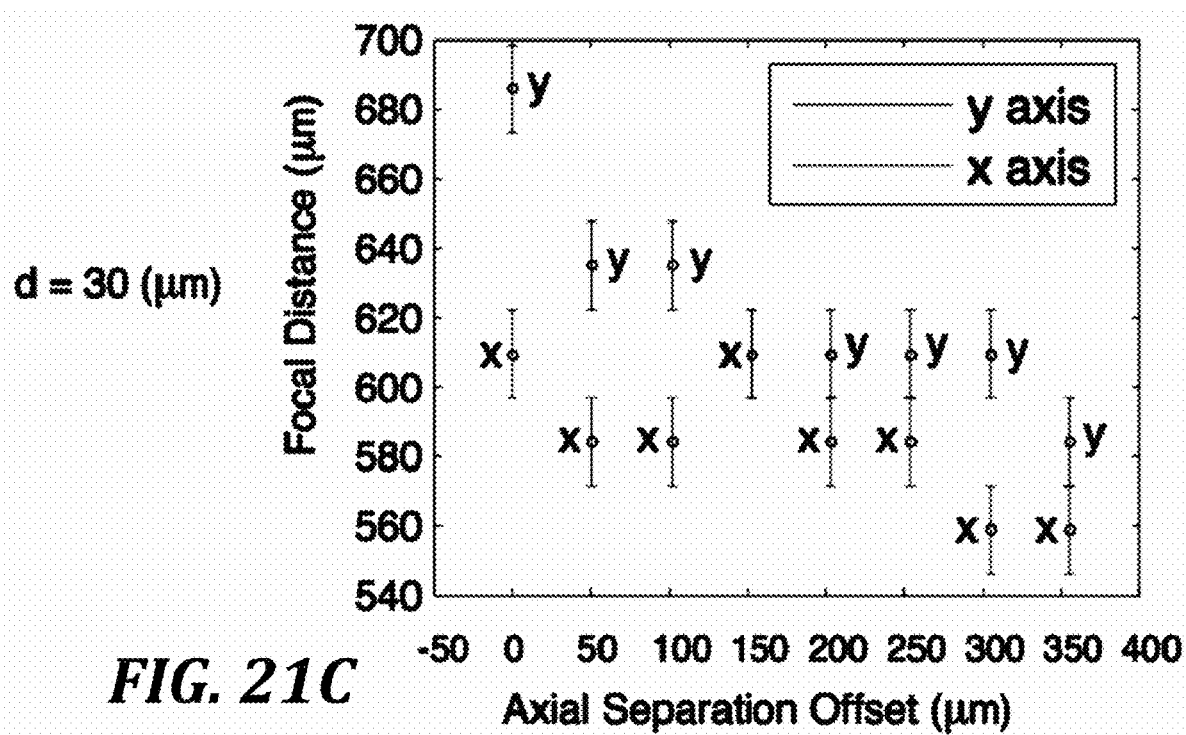
Figure 21D:
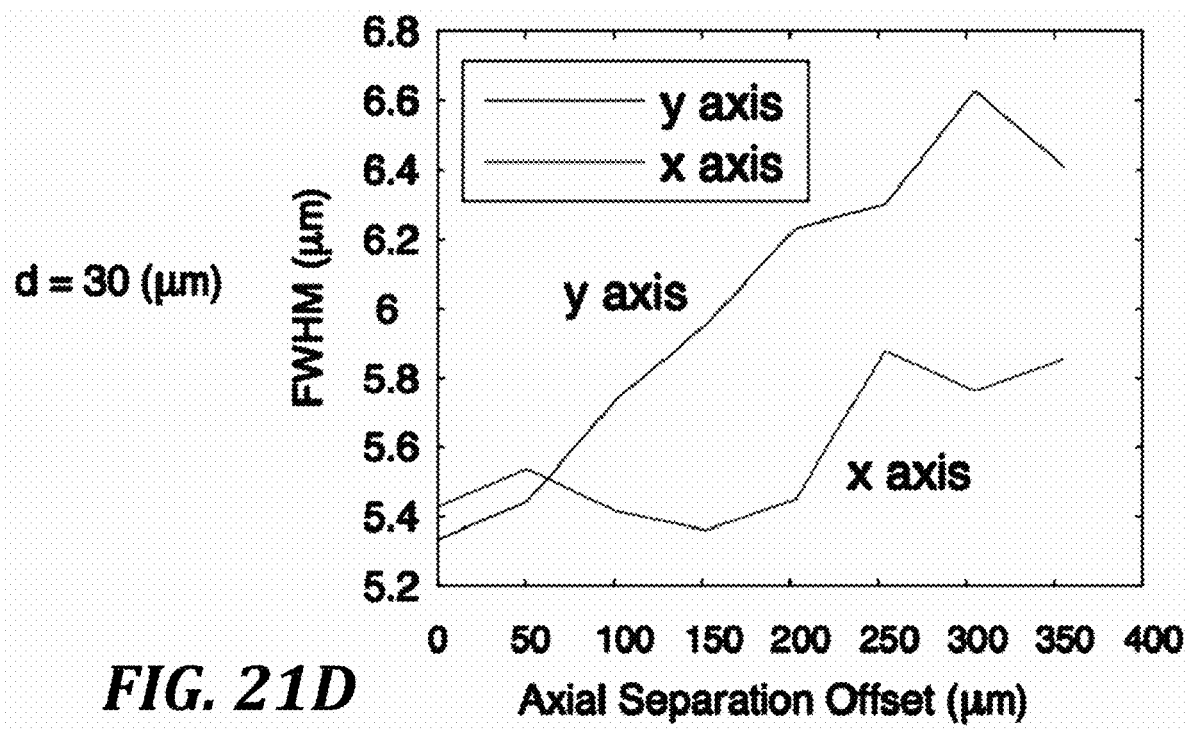
Figure 22A:
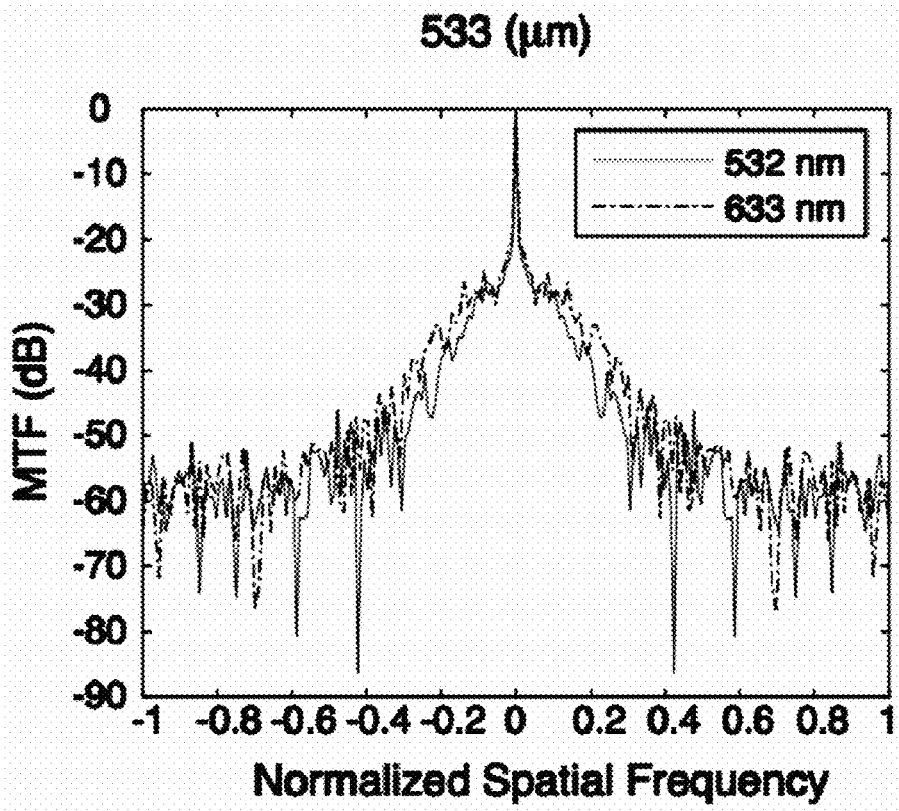
FIGS. 22A-22F: Modulation transfer functions of the cubic element. (A)-(F) show 1D slices of the MTF of the cubic element for a range of over 300 µm plotted against normalized spatial frequency for both red and green illumination. The MTFs for green (532 nm; solid line) and red (633 nm; dashed line) are shown.
Figure 22B:
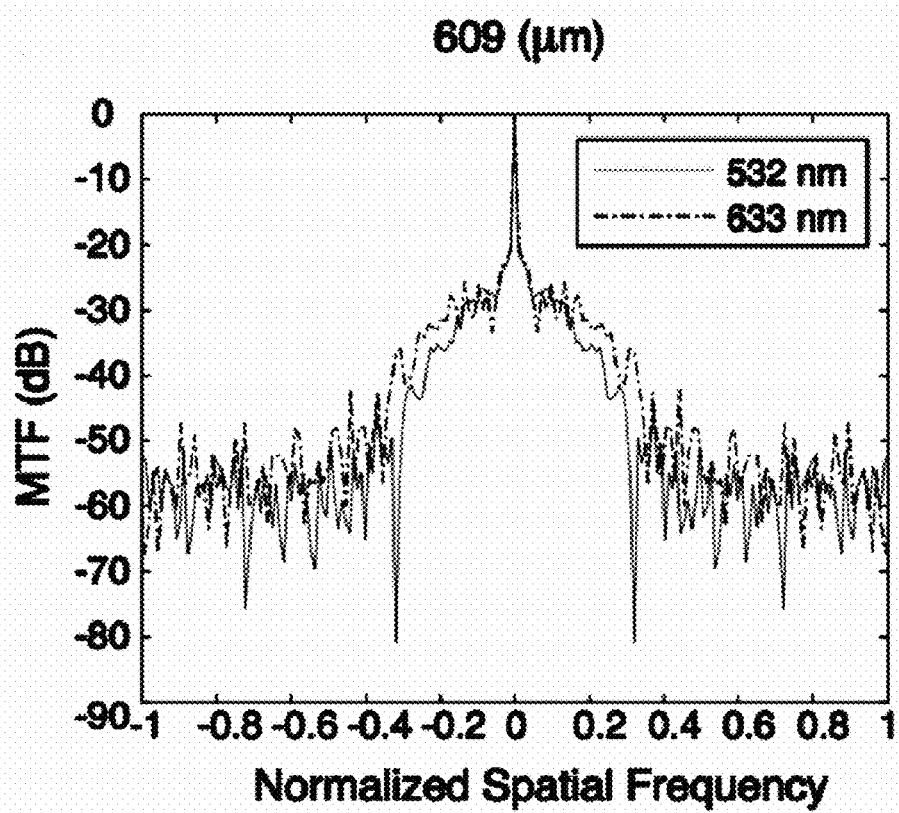
Figure 22C:
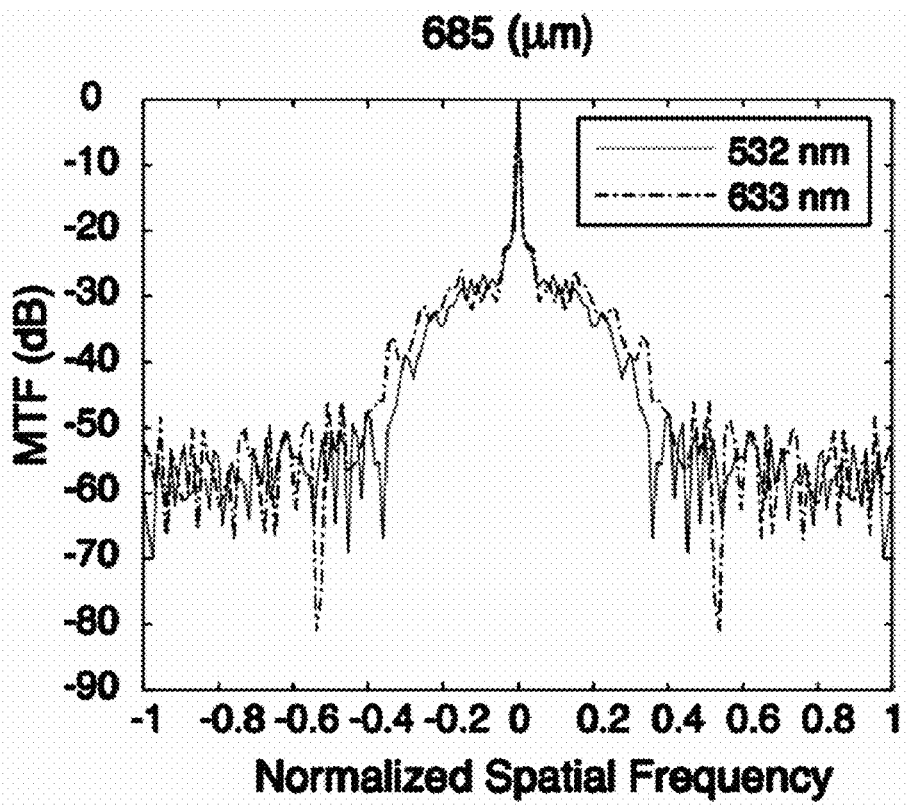
Figure 22D:
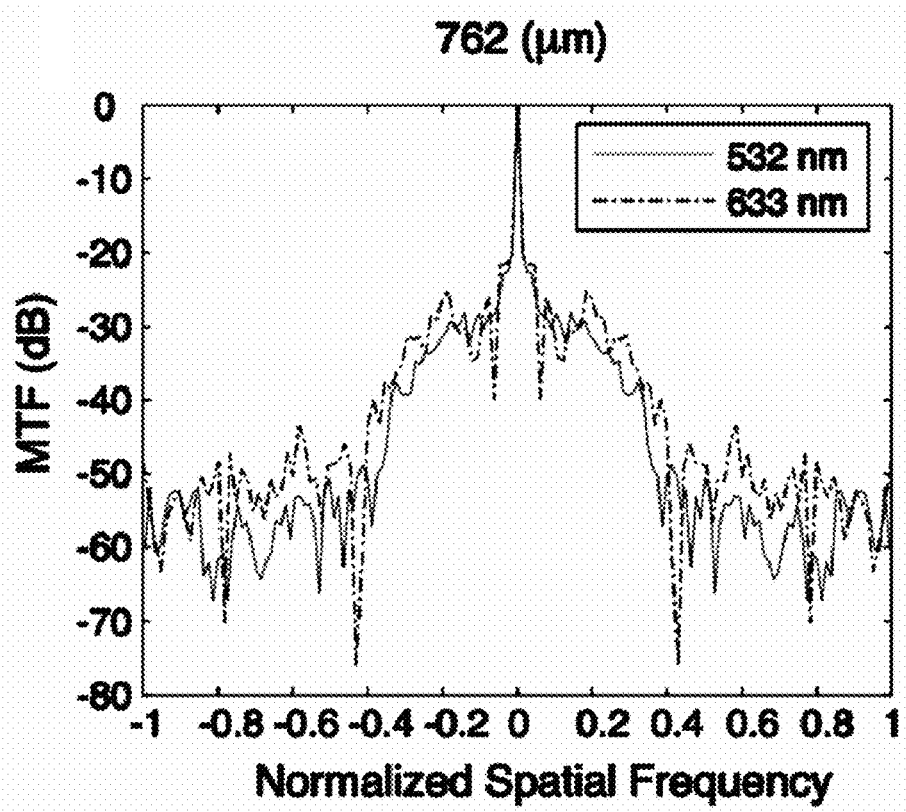
Figure 22E:
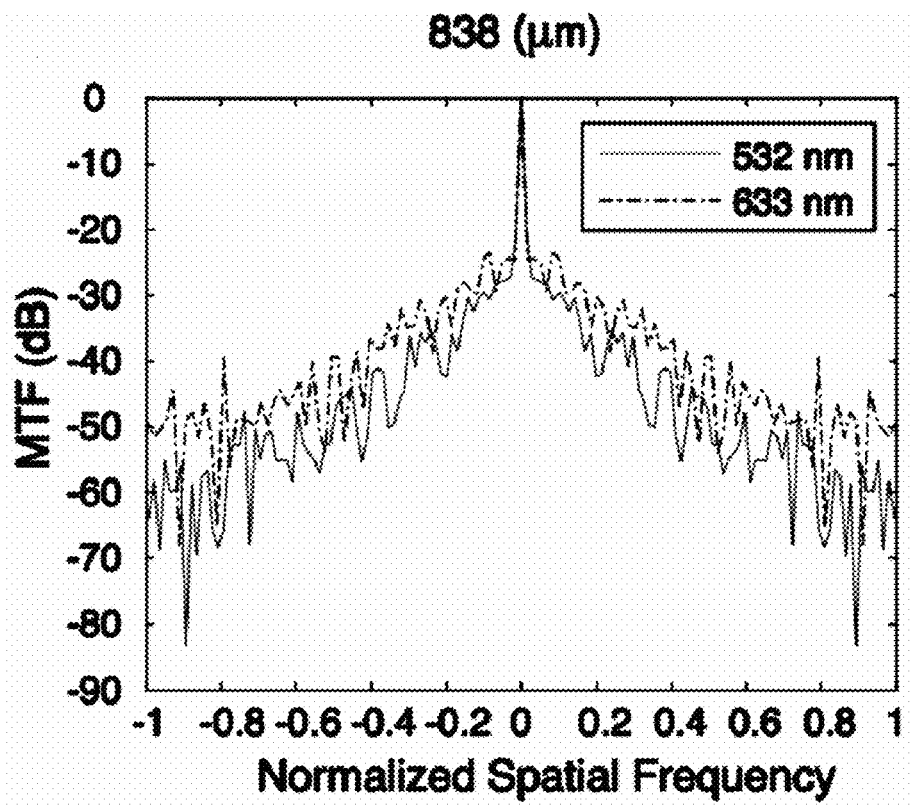
Figure 22F:
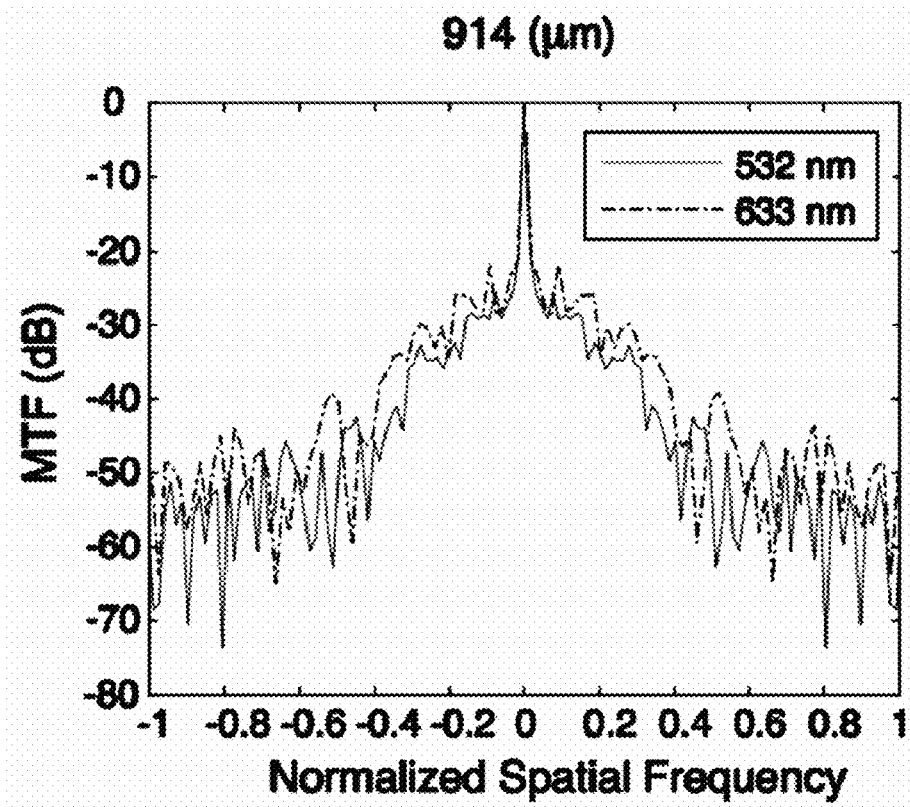
Figure 23A:
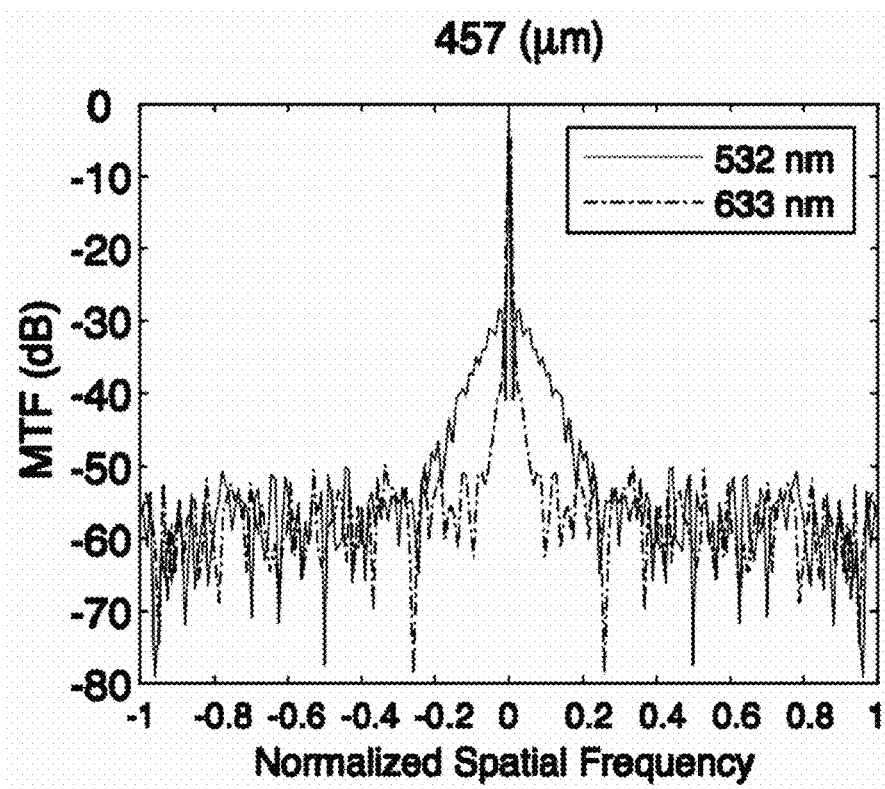
FIGS. 23A-23D: Modulation transfer function of the 500 µm quadratic metasurface lens. (A)-(D) show 1D slices of the MTF of the quadratic element for a range of 150 µm plotted against normalized spatial frequency for both red and green illumination. The MTFs for green (532 nm; solid line) and red (633 nm; dashed line) are shown.
Figure 23B:
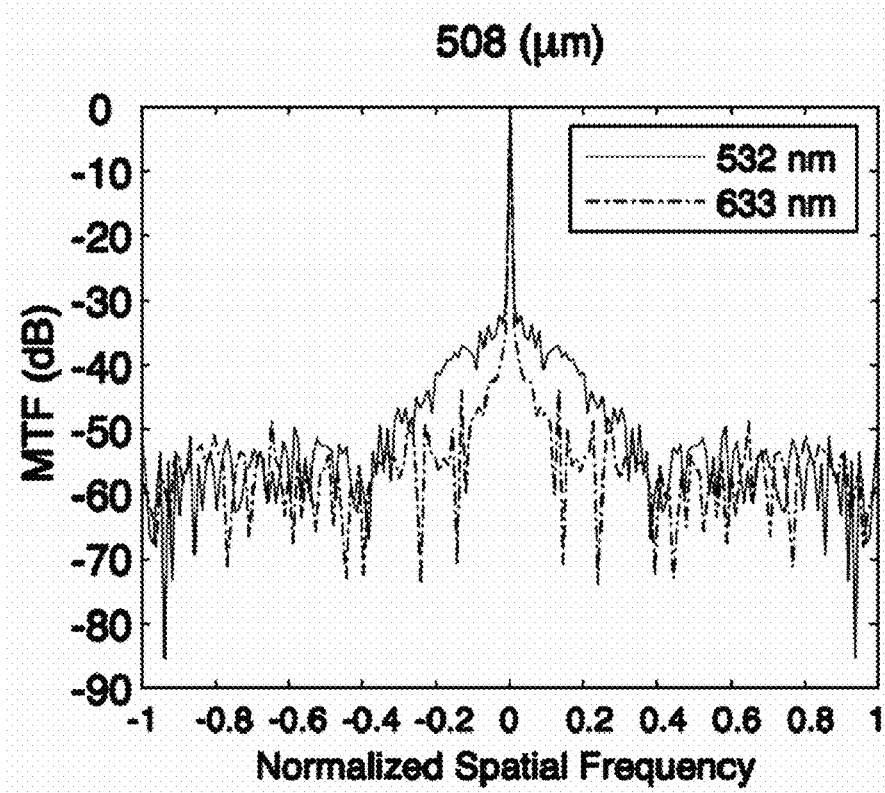
Figure 23C:
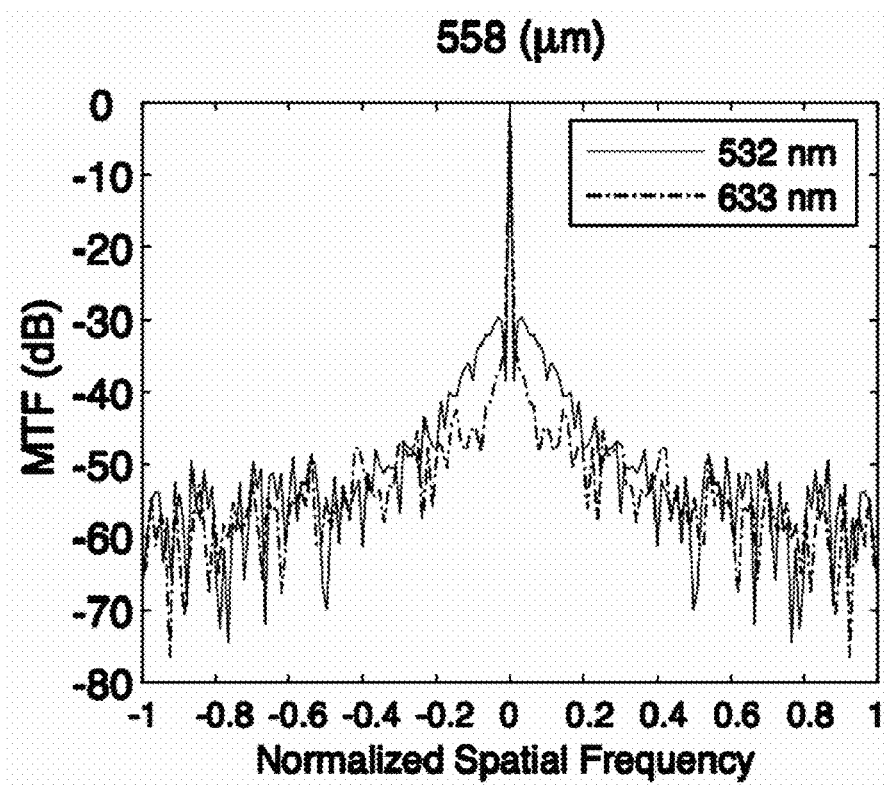
Figure 23D:
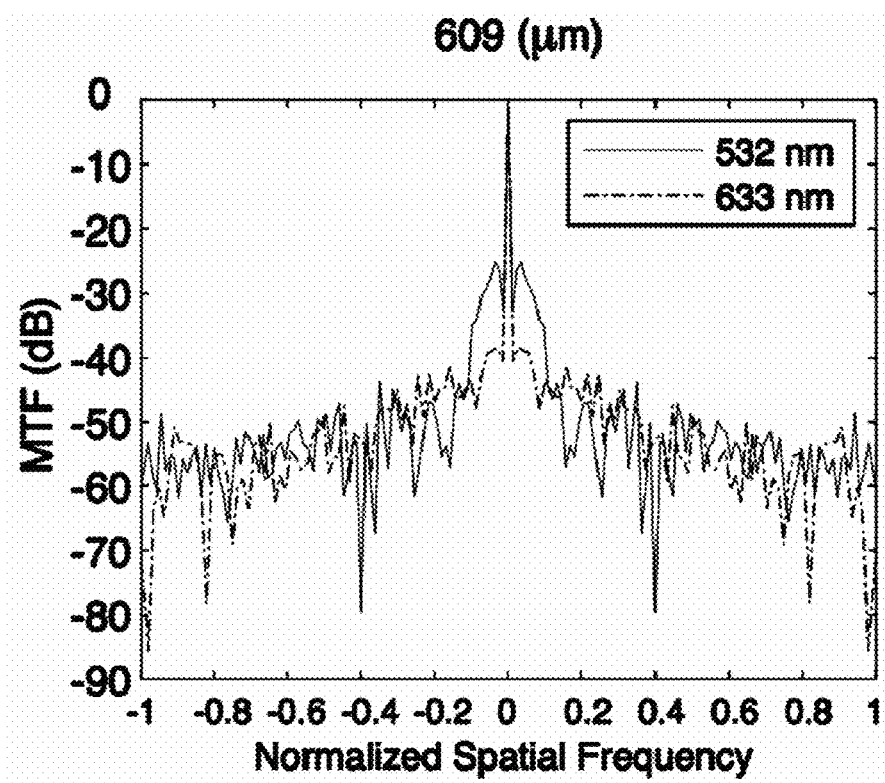

In simulation, as shown in FIGS. 20A-20D, axial separations have a large effect on the shape of the focal spot in the x-z plane, and also a large effect on the intensities of the focal spots for both planes. As seen in FIG. 20D, for large separations, the Airy beam generated by the first metasurface begins to clip the edge of the second.

In experiment, the metasurface near the objective remained stationary while the metasurface near the illumination source was translated backwards to increase the separation. The axial displacement slightly decreased the focal distance of the lens along both the x and y axes of the lens, but the shift is not appreciable, as seen in the theoretical analysis (FIGS. 21A-21D). However, the effect on the focal spot size was not deterministic, showing large spikes in one set of data and a gradual increase in the other.

Cubic Image Retrieval

In order for the cubic imaging system to provide useful images, the initial image must be post-processed by deconvolution of the cubic point spread function (PSF) from the initial image. In order for the cubic phase plate to be useful in controlling chromatic aberrations, the PSF must be invariant over the wavelength range of interest. This is not possible in general for highly chromatic optical elements such as metasurfaces, but the metasurface cubic phase plate does satisfy this criterion for 633 nm and 532 nm illumination.

We quantify this invariance by calculating the modulation transfer function (MTF) of our experimentally measured PSFs using a two dimensional Fourier transform, shown in FIGS. 22A-22F for the cubic elements and FIGS. 23A-23D for the quadratic elements. The MTF gives the magnitude response of the system found by taking the magnitude of the optical transfer function or the Fourier transform of the PSF. The figures are 1D slices of a corresponding 2D MTF, which we are justified in taking a 1D slice of due to the rectangular separability of the phase function. As shown in FIGS. 22A-22F and 23A-23D, the cubic phase plate under green and red illumination exhibits very similar MTFs for a range of positions along the optical axis while the quadratic lens fails to do so. Notably for the cubic MTFs, the positions of the peaks and troughs are similar for low frequency components while this is not the case for the quadratic elements. Using the knowledge of our experimental PSF and MTF, a frequency domain filter can be constructed using a least squares optimization routine.

While illustrative embodiments have been illustrated and described, it will be appreciated that various changes can be made therein without departing from the spirit and scope of the invention.

The invention claimed is:

1. A low-contrast metasurface having optical activity at a first wavelength, comprising:
    a plurality of cylindrical posts formed from a first material and arranged on a substrate in a square pattern, wherein the plurality of cylindrical post are formed of a material having a first refractive index of 2.1 or less;
    interstices between individual posts of the plurality of cylindrical post comprising an interstitial substance with a second refractive index that is 0.6 to 1.1 less than the first refractive index;
    wherein the individual posts of the plurality of cylindrical posts have a diameter in a range of ⅛ of the first wavelength to ⅔ of the first wavelength;
    wherein the plurality of cylindrical posts have a periodicity in a range of 0.4 times the first wavelength to 1.0 times the first wavelength; and
    wherein the plurality of cylindrical posts have a thickness in a range of 0.5 times the first wavelength to 1.0 times the first wavelength.

2. The low-contrast metasurface of claim 1, wherein the optical activity is selected from the group consisting of diffraction and reflection.

3. The low-contrast metasurface of claim 1, wherein the first material is silicon nitride.

4. The low-contrast metasurface of claim 1, wherein interstitial substance is selected from the group consisting of a gas or a solid.

5. The low-contrast metasurface of claim 1, wherein interstitial substance is air or a polymer.

6. The low-contrast metasurface of claim 1, wherein at least a portion of the low-contrast metasurface defines an optical element comprising a first metasurface portion having a first optical activity and a second metasurface portion having a second optical activity, different than the first optical activity.

7. The low-contrast metasurface of claim 6, wherein the optical element is a lens defined by patterning the first metasurface portion and the second metasurface portion to be shaped so as to produce a lens effect based on a difference in diffraction at the first wavelength between the first metasurface portion and the second metasurface portion.

8. The low-contrast metasurface of claim 7, wherein the lens has a numerical aperture of 0.1 to 0.7.

9. The low-contrast metasurface of claim 7, wherein the lens has a transmission efficiency of at least 90% as measured for a light source with a bandwidth of 25 nm centered at 625 nm.

10. The low-contrast metasurface of claim 7, wherein the lens has a focusing efficiency of at least 40% as measured for a light source with a bandwidth of 25 nm centered at 625 nm.

11. The low-contrast metasurface of claim 7, wherein the lens has a transmission efficiency of 90% and a focusing efficiency of 30% within at the first wavelength and an NA of 0.7.

12. The low-contrast metasurface of claim 7, wherein the lens has a transmission efficiency of 80% and a focusing efficiency of 10%.

13. The low-contrast metasurface of claim 6, wherein the optical element is a vortex beam generator defined by patterning and a difference in diffraction, at the first wavelength, between the first metasurface portion and the second metasurface portion.

14. The low-contrast metasurface of claim 6, wherein the optical element is a cubic phase plate defined by patterning and a difference in diffraction, at the first wavelength, between the first metasurface portion and the second metasurface portion.

15. The low-contrast metasurface of claim 1, wherein low-contrast metasurface defines a freeform optical element.

16. The low-contrast metasurface of claim 1, wherein the substrate is substantially flat.

* * * * *